(12) United States Patent
Trebesch et al.

(10) Patent No.: US 7,120,348 B2
(45) Date of Patent: Oct. 10, 2006

(54) CABLE MANAGEMENT PANEL WITH SLIDING DRAWER

(75) Inventors: Steven P. Trebesch, Eagan, MN (US); Thomas C. Tinucci, Eden Paririe, MN (US); Joel B. Douglas, Hutchinson, MN (US); John C. Holman, Coon Rapids, MN (US); Trevor D. Smith, St. Louis Park, MN (US); Paul C. Lance, Brooklyn Park, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 10/894,898

(22) Filed: Jul. 20, 2004

(65) Prior Publication Data

US 2004/0258384 A1   Dec. 23, 2004

Related U.S. Application Data

(63) Continuation of application No. 10/306,816, filed on Nov. 26, 2002, now Pat. No. 6,968,111, which is a continuation of application No. 09/649,398, filed on Aug. 28, 2000, now Pat. No. 6,504,988, which is a continuation-in-part of application No. 09/490,379, filed on Jan. 24, 2000, now Pat. No. 6,438,310.

(51) Int. Cl.
*G02B 6/00* (2006.01)

(52) U.S. Cl. ................................... 385/135
(58) Field of Classification Search ............. 385/135
See application file for complete search history.

(56) References Cited

U.S. PATENT DOCUMENTS

| | | | |
|---|---|---|---|
| 2,864,656 A | | 12/1958 | Yorinks |
| 5,024,498 A | | 6/1991 | Becker et al. |
| 5,066,149 A | * | 11/1991 | Wheeler et al. ............ 385/135 |
| 5,071,211 A | * | 12/1991 | Debortoli et al. ............ 385/76 |
| 5,142,606 A | * | 8/1992 | Carney et al. ............ 385/134 |
| 5,167,001 A | * | 11/1992 | Debortoli et al. ........... 385/135 |
| 5,316,243 A | * | 5/1994 | Henneberger .............. 248/68.1 |
| 5,339,379 A | | 8/1994 | Kutsch et al. |
| 5,402,515 A | * | 3/1995 | Vidacovich et al. ........ 385/135 |
| 5,724,469 A | * | 3/1998 | Orlando ...................... 385/135 |
| 5,836,148 A | * | 11/1998 | Fukao ........................ 59/78.1 |
| 6,438,310 B1 | | 8/2002 | Lance et al. |
| 6,504,988 B1 | | 1/2003 | Trebesch et al. |

FOREIGN PATENT DOCUMENTS

| | | |
|---|---|---|
| EP | 0 464 570 A1 | 1/1992 |
| FR | 2 678 076 A1 | 12/1992 |

\* cited by examiner

*Primary Examiner*—Michelle Connelly-Cushwa
*Assistant Examiner*—Chris H. Chu
(74) *Attorney, Agent, or Firm*—Merchant & Gould P.C.

(57) ABSTRACT

An optical fiber cable management panel is provided with slideable drawers and structure within the drawers for cable management and/or connection to other devices. Tray inserts drop into the drawers to provide the appropriate management and connection devices. A movable take-up mechanism manages the cable entering and exiting the drawers at side openings. Stackable pivoting storage trays on the tray insert include a detent arrangement for holding each tray in a pivoted access position. The tray inserts further include a front key, and a back tab mounting arrangement for mounting the tray inserts to the drawers, and side radius limiters including notches for extending over raised portions of the drawer. The take-up mechanism includes a U-shaped trough section and cable retention tabs. A control mechanism is provided for controlling movement of the take-up mechanism relative to the drawer.

11 Claims, 62 Drawing Sheets

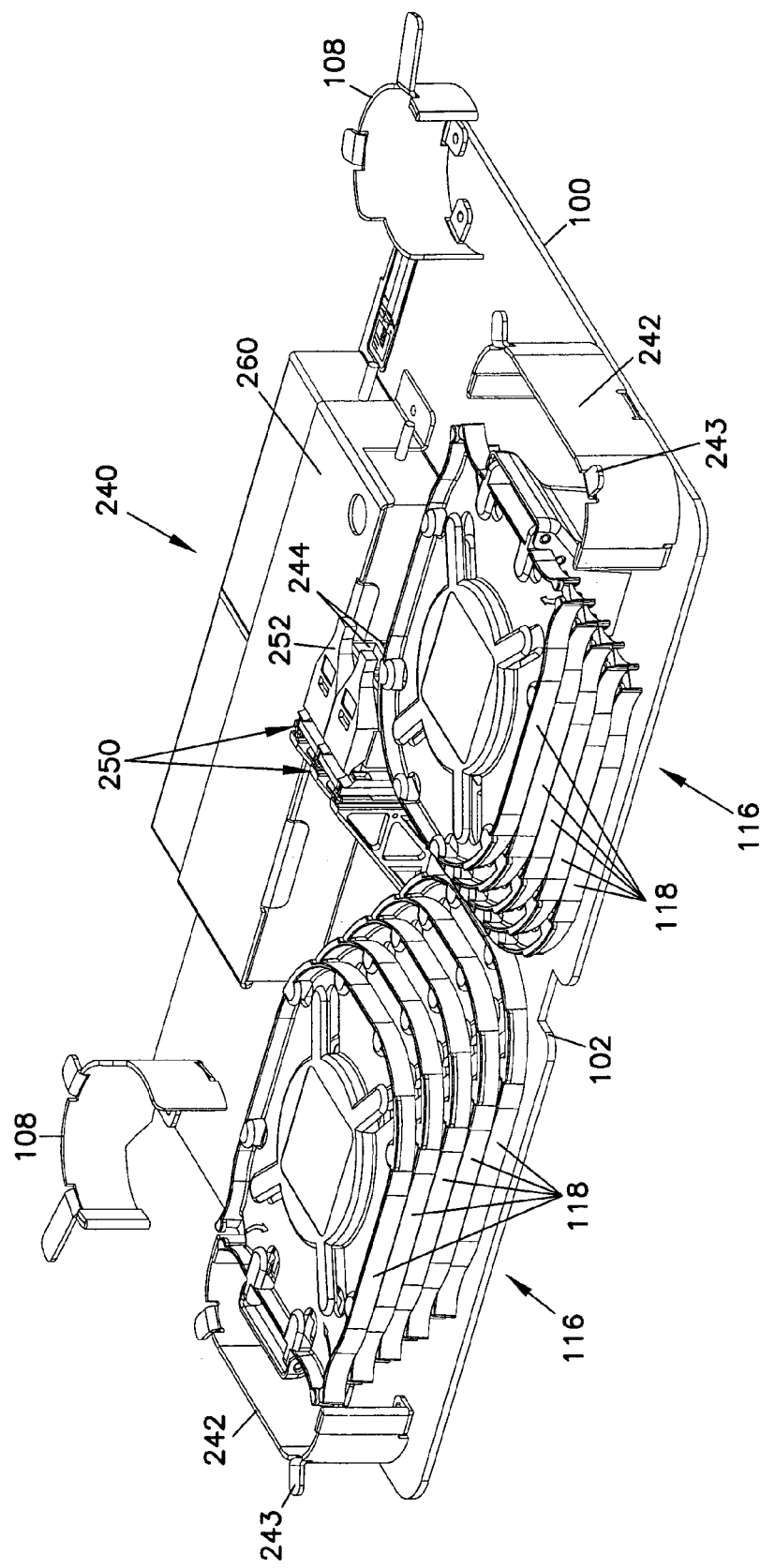

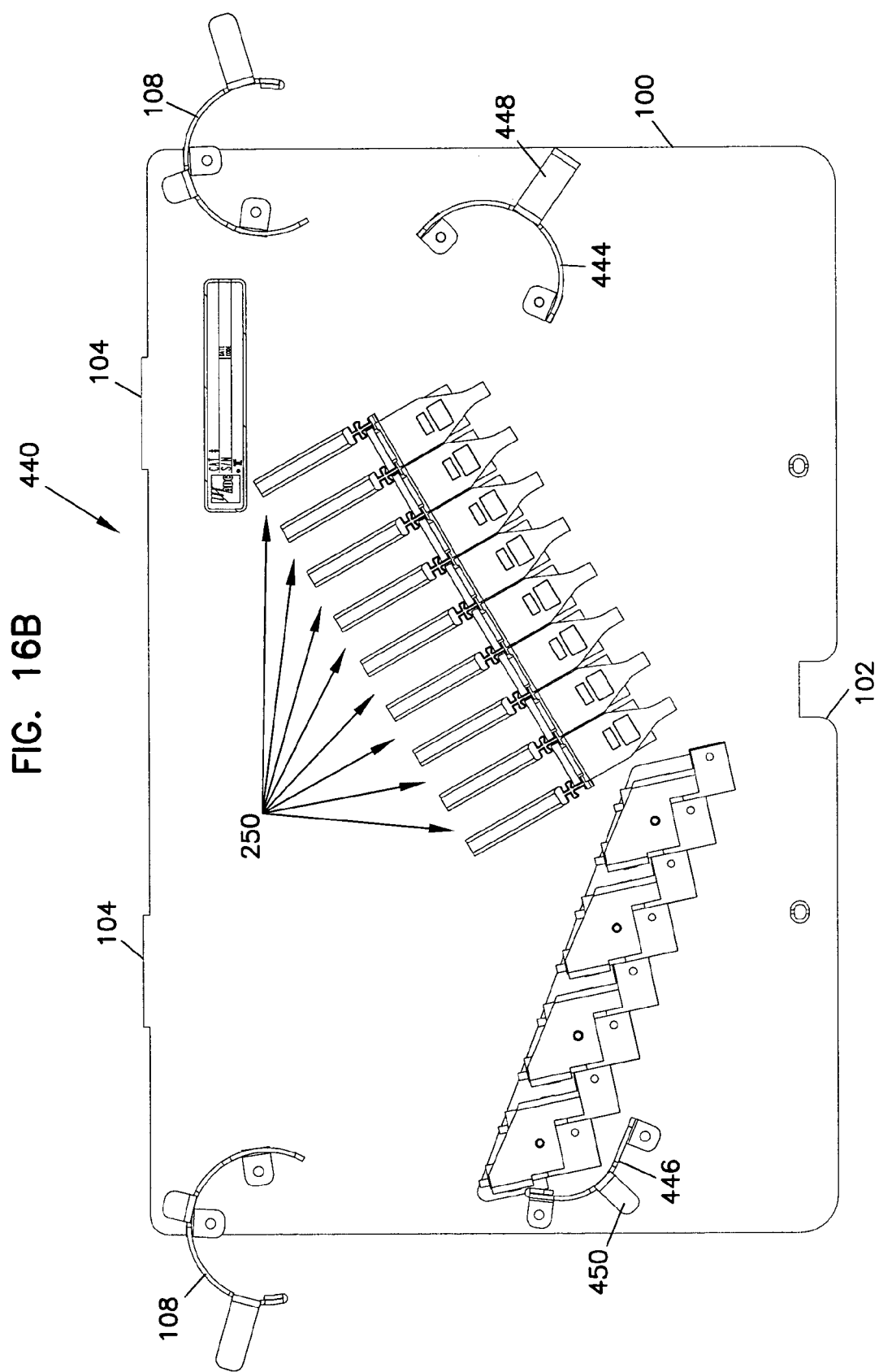

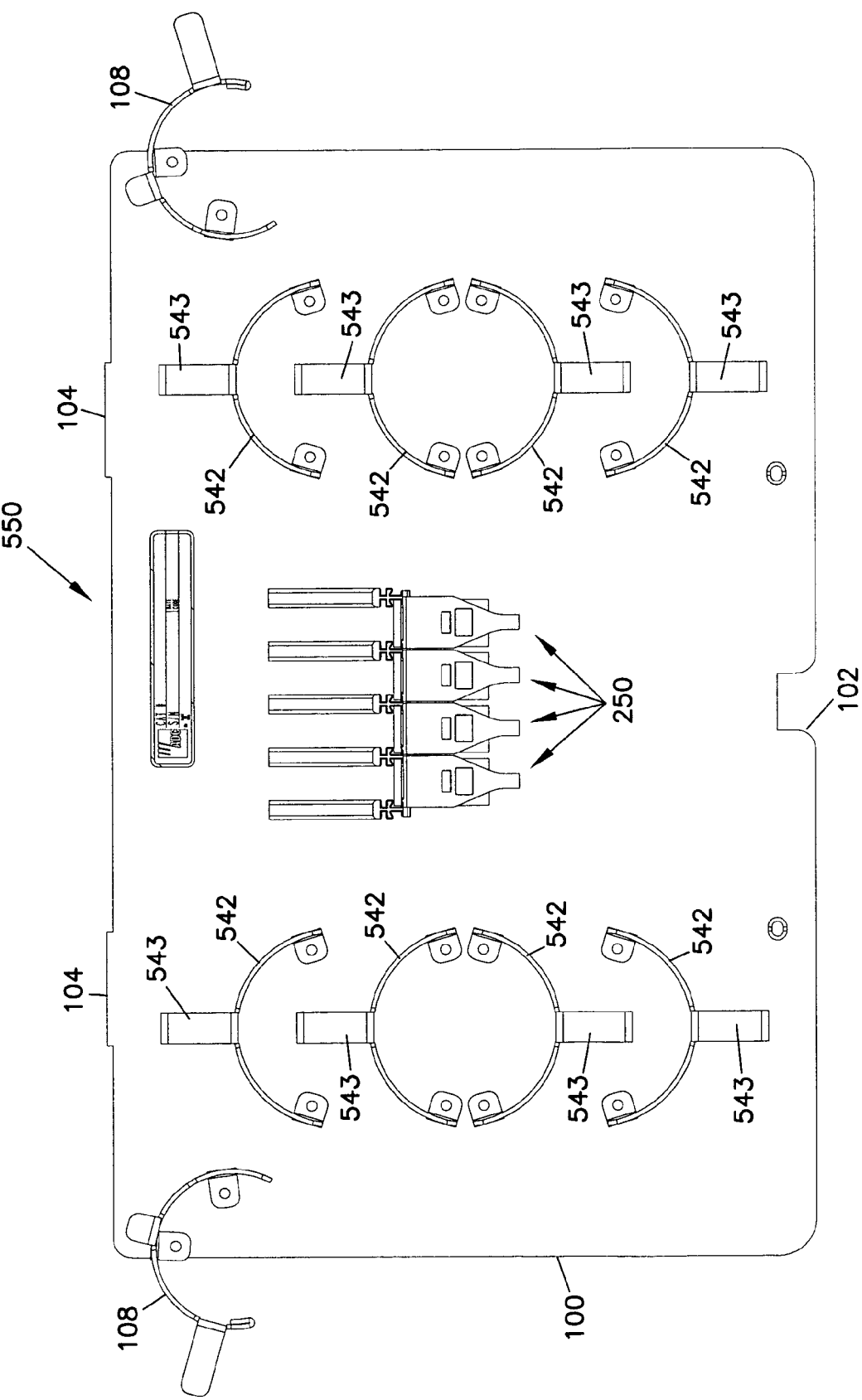

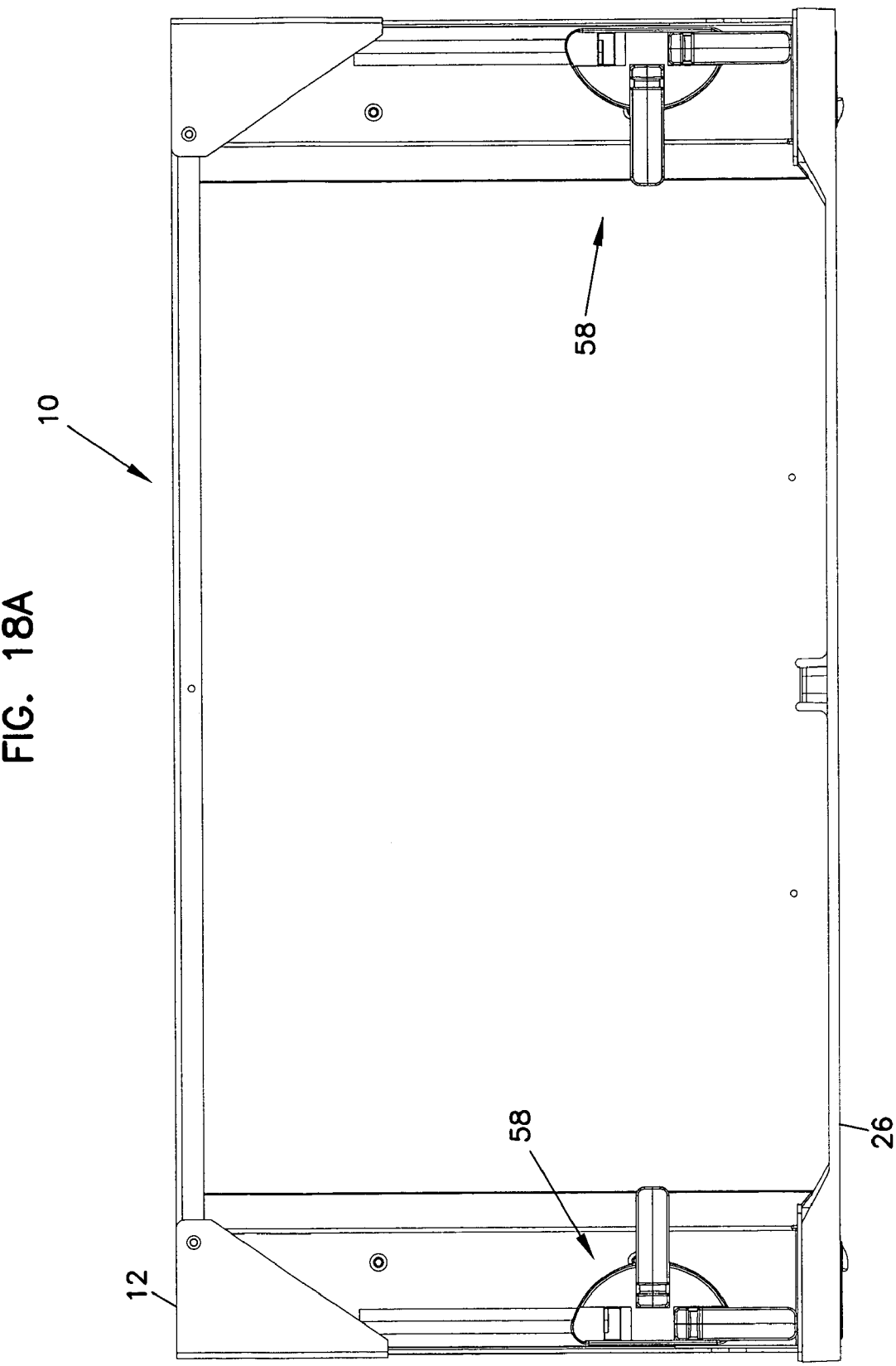

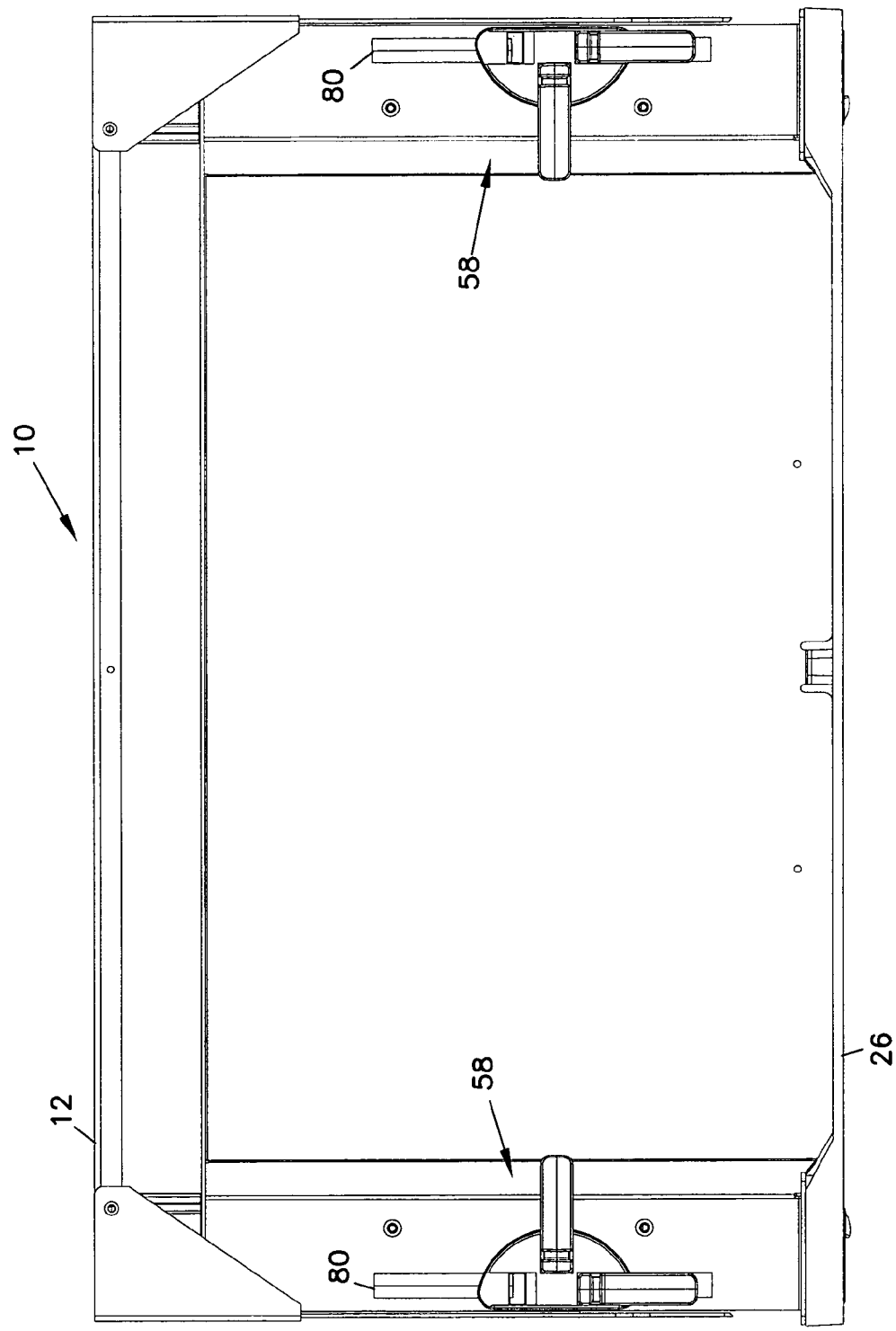

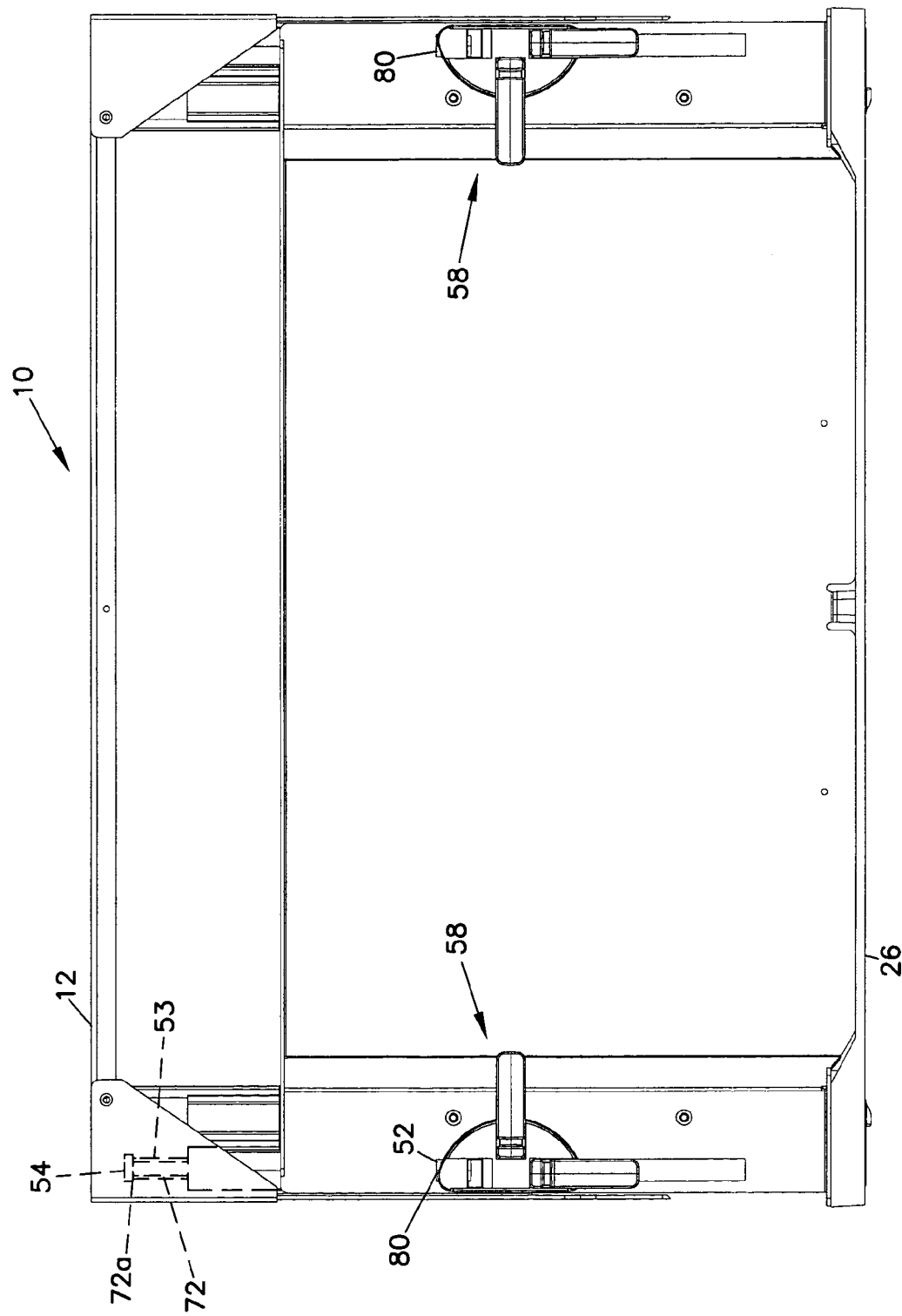

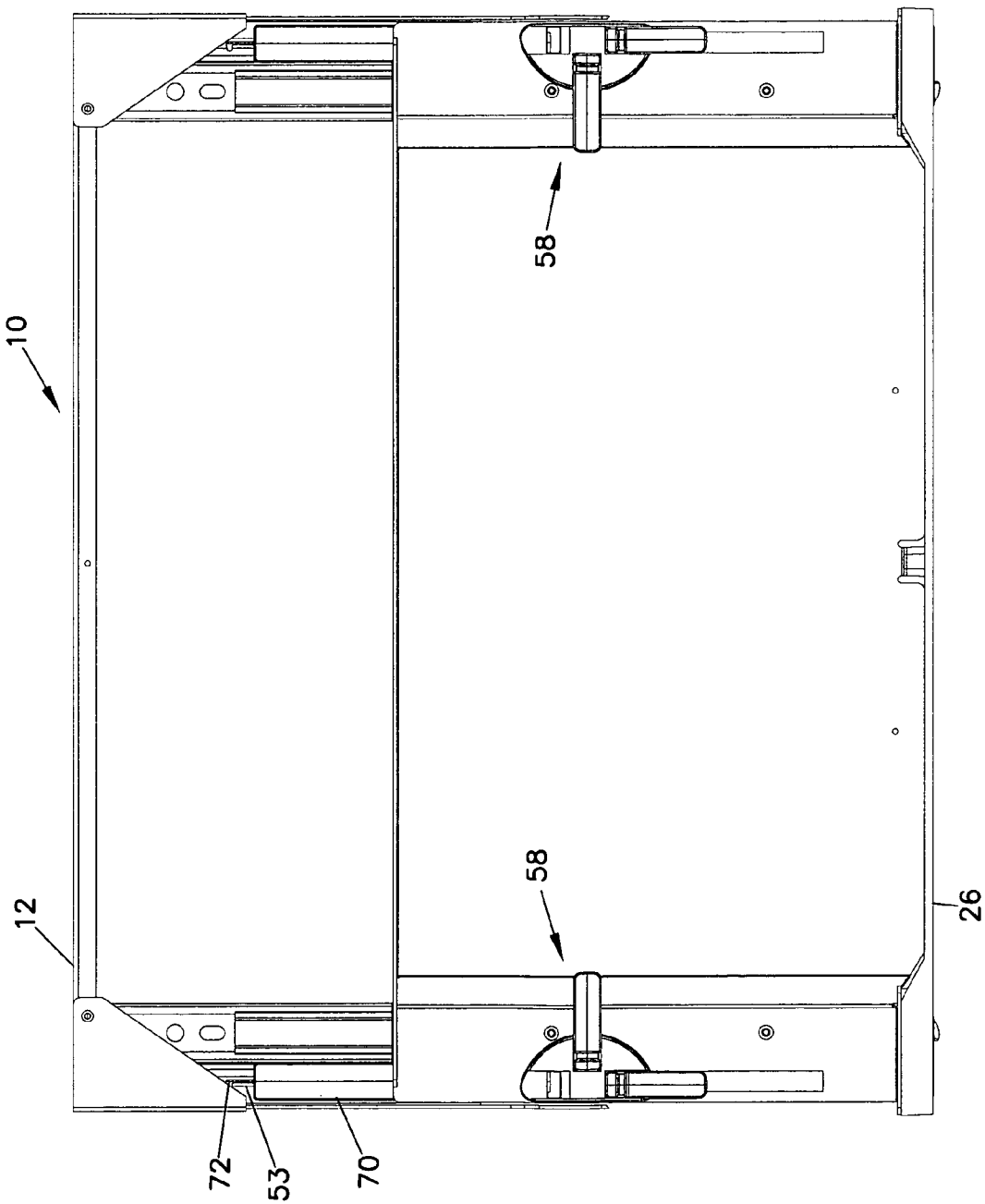

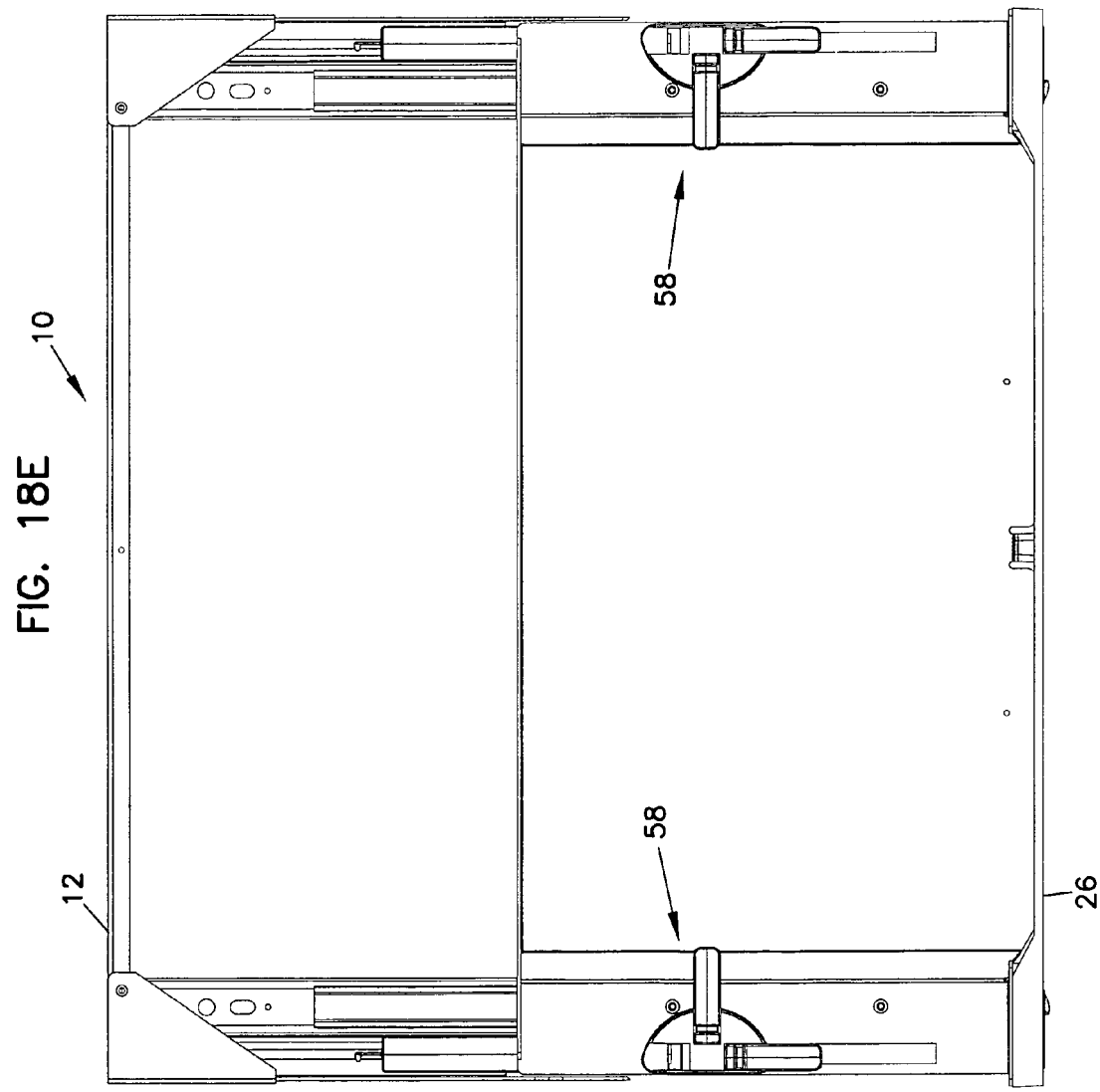

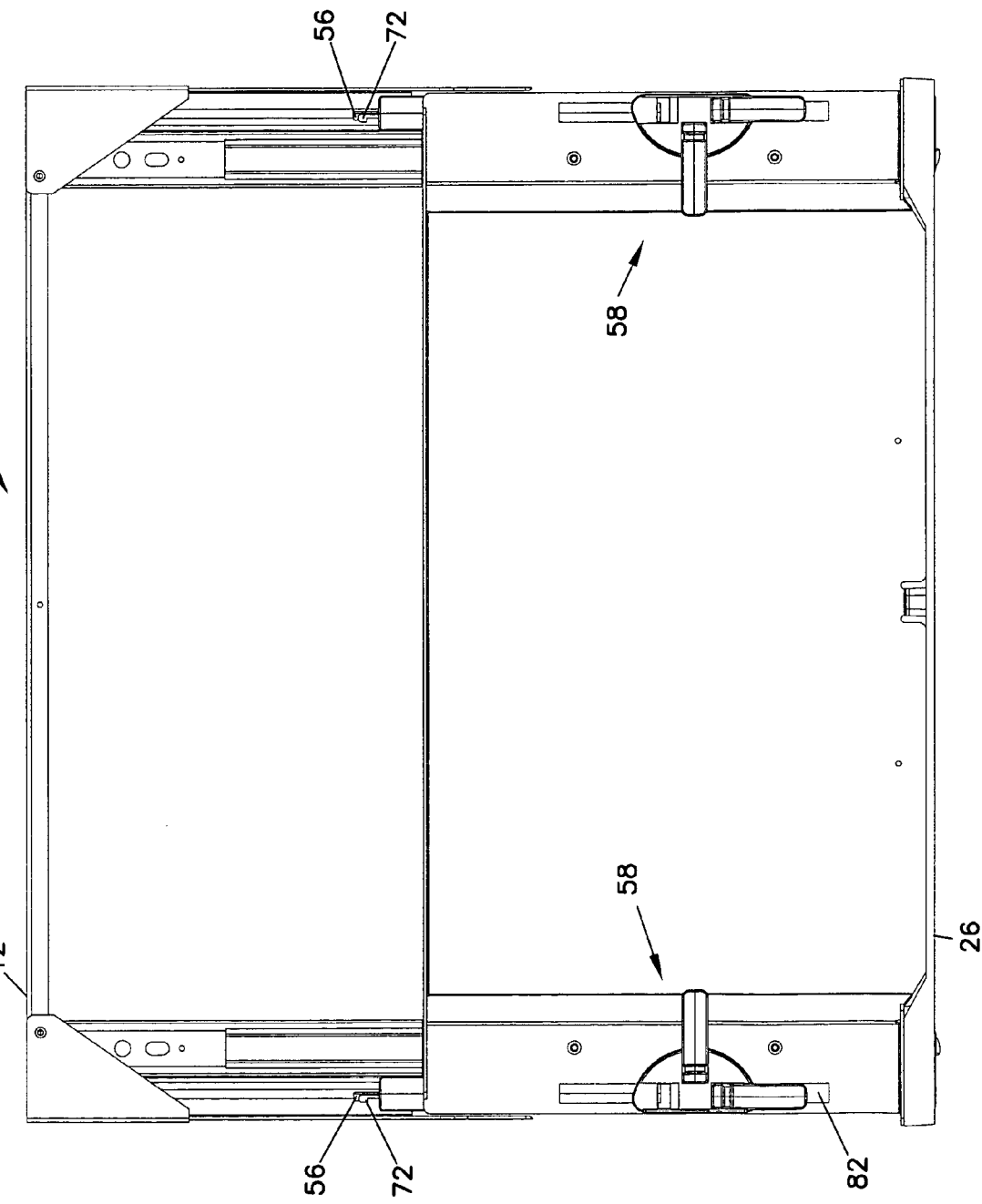

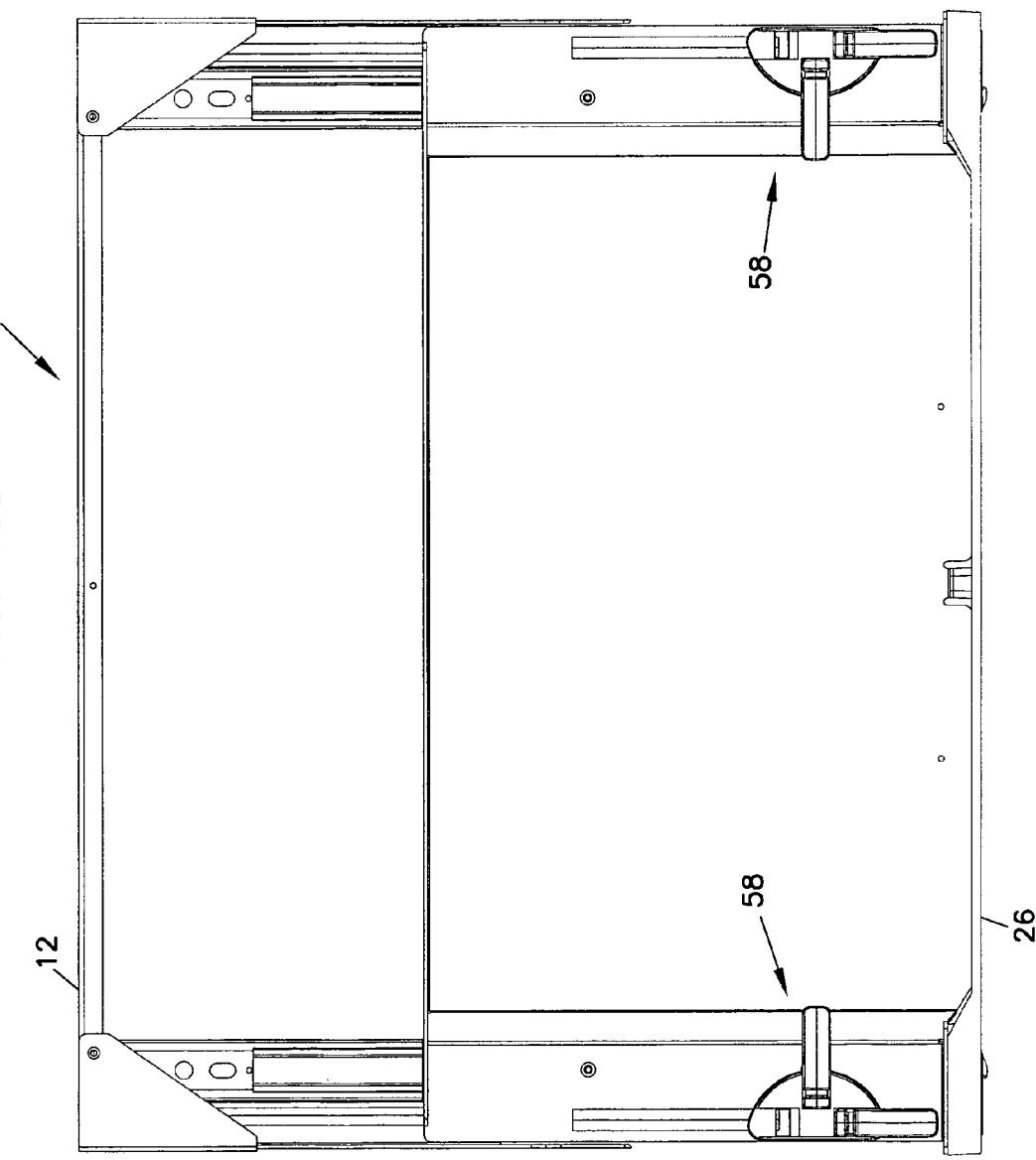

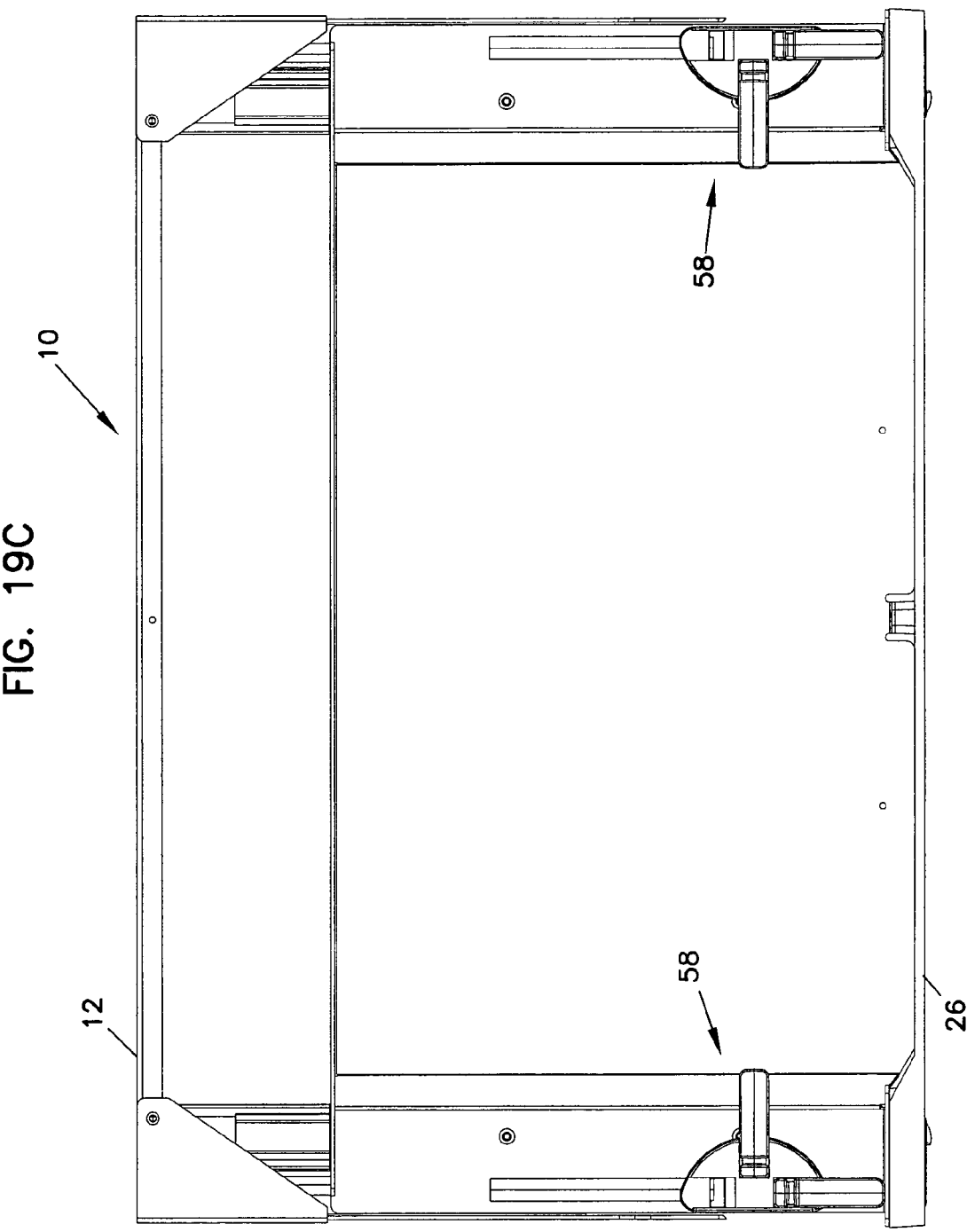

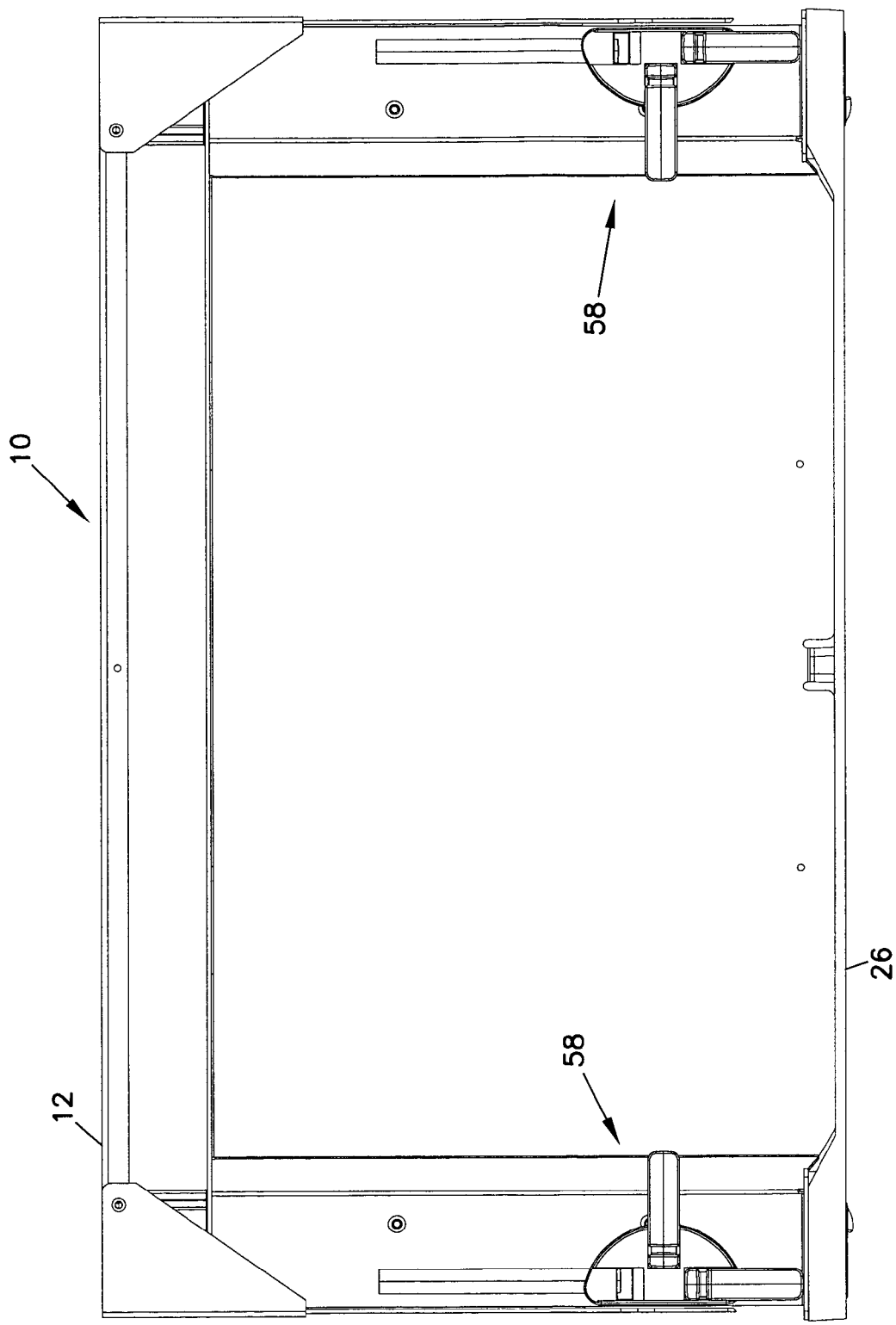

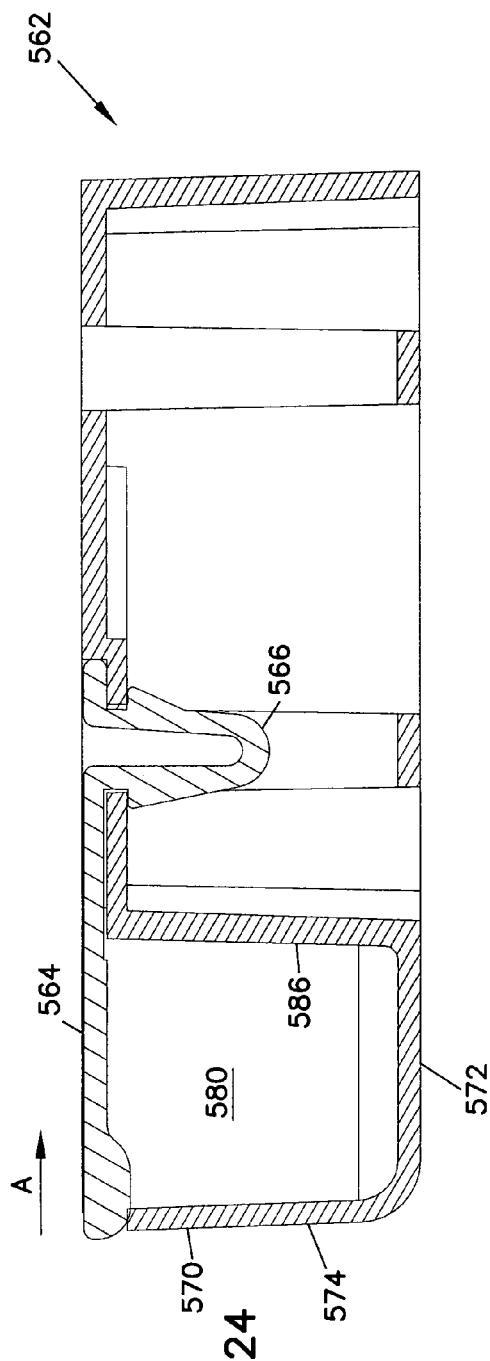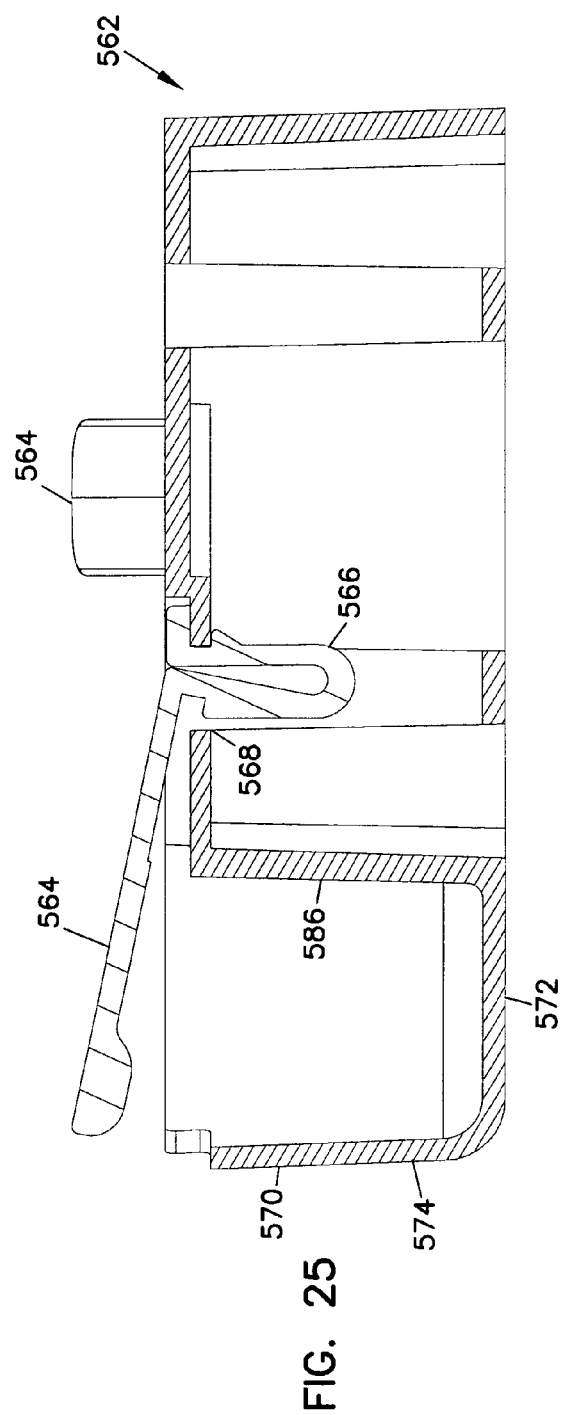

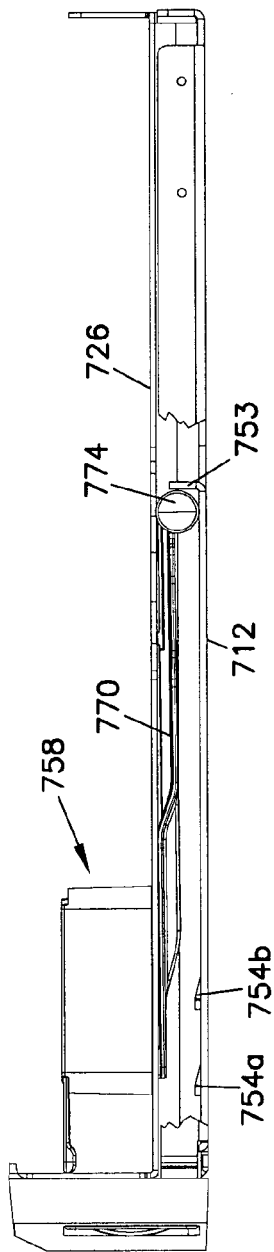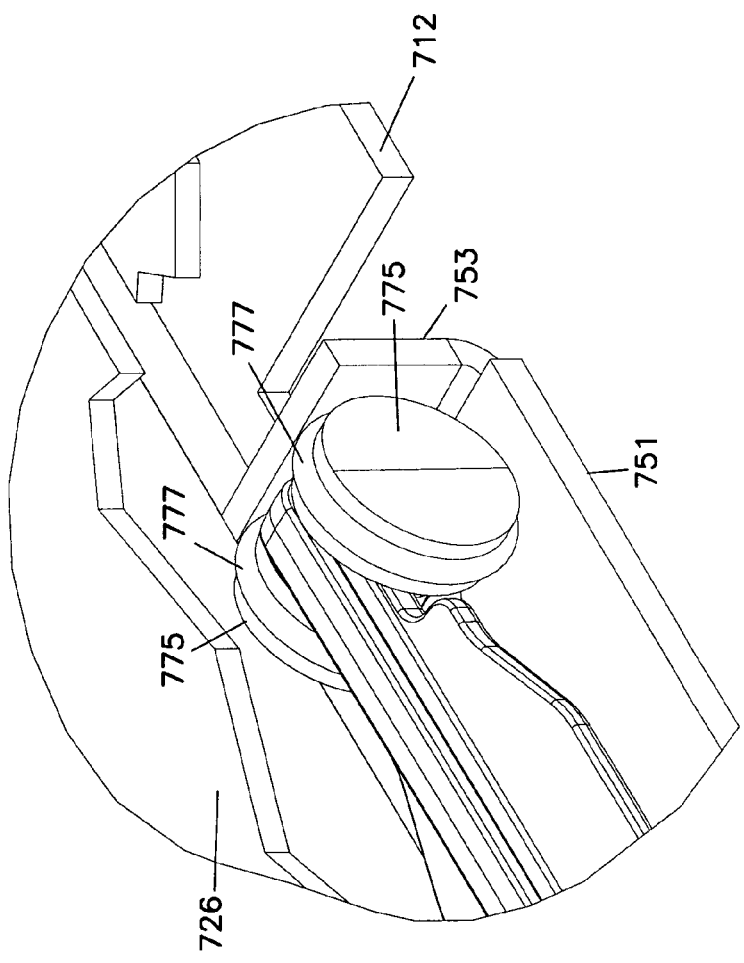

CABLE MANAGEMENT PANEL WITH SLIDING DRAWER

RELATED APPLICATION

This application is a continuation of application Ser. No. 10/306,816, filed Nov. 26, 2002, now U.S. Pat. No. 6,968, 111, issued Nov. 22, 2005. Application Ser. No. 10/306,816 is a continuation of application Ser. No. 09/649,398, filed Aug. 28, 2000, now U.S. Pat. No. 6,504,988, issued Jan. 7, 2003. Application Ser. No. 09/649,398 is a continuation-in-part of application Ser. No. 09/490,379, filed Jan. 24, 2000, now U.S. Pat. No. 6,438,310, issued Aug. 20, 2002. Application Ser. Nos. 10/306,816, 09/649,398, and 09/490,379 are incorporated herein by reference.

FIELD OF THE INVENTION

The present invention is concerned with management of optical fiber cables. The management device of the present invention has particular application in the telecommunications industry with respect to storage and/or connection of optical fiber cables with other cables and devices.

BACKGROUND OF THE INVENTION

Cable termination, splice and storage devices are known including, for example, devices shown in U.S. Pat. Nos. 4,792,203 and 5,946,440, both issued to ADC Telecommunications, Inc. Both of these patents concern devices with moveable trays for storage and management of the optical fiber cables. U.S. Pat. No. 5,066,149, also issued to ADC Telecommunications, Inc., concerns a cable management device including slideable drawers each including a cable slack take-up mechanism.

When moving the trays or drawers, unnecessary or excessive displacement of the optical fiber cables is undesirable. As the optical fiber cables are displaced, they are subject to bending and other forces. Bending of the fibers can cause attenuation and loss of signal strength. As a fiber bends, the fiber can also break, resulting in a loss of transmission through the fiber.

There is a continued need in the art for further cable management devices which address such concerns in the telecommunications industry as ease of use, size, reliability, cost, and protection of the fibers.

SUMMARY OF THE INVENTION

A cable management panel includes a chassis, and at least one drawer slideably mounted within the chassis. The drawer is slideable between a first position with the drawer fully inserted within the chassis and a second position with the drawer extended from the interior of the chassis. An access location allows entry and exit of optical fiber cables into a side of the chassis and the drawer. One aspect of the present invention includes a fiber take-up mechanism including a push member slideably mounted on the drawer and further slideably mounted relative to the chassis. The push member is moveable from a first position on the drawer toward a second position on the drawer which is forward of the first position as the drawer is moved from the second position to the first position.

One aspect of the push member includes a trough section or retaining optical fiber cables. The trough section may include a flared end for further cable protection. The push member may include a cover over a portion of the trough section for further retaining optical fiber cables. Preferably the push member including the trough section includes a curved shape.

A further aspect of the push member preferably includes an upper retention member for retaining optical fiber cables with the push member during use. Preferably the retention member includes a projecting tab.

The drawer preferably receives a drop-in plate including cable storage or cable connection structure for cables entering the panel. In one embodiment, the drop-in plates latch to the drawer.

Another aspect of the push member preferably includes a control mechanism for controlling movement of the push member between the first and second positions as the drawer is moved between the second and first positions. In one preferred embodiment, the control mechanism moves the push member in synchronized movement with movement of the drawer relative to the chassis.

BRIEF DESCRIPTION OF THE DRAWINGS

FIGS. 18A–E show the drawer in various positions during opening from the closed position of FIG. 18A through the nearly completely open position of FIG. 18E, the completely open position being shown in FIG. 2;

FIGS. 19A–D show the drawer in various positions during closing from the completely open position of FIG. 2 through the nearly completely closed position of FIG. 19D, just prior to being placed in the fully closed position of FIG. 18A;

Figure 20:
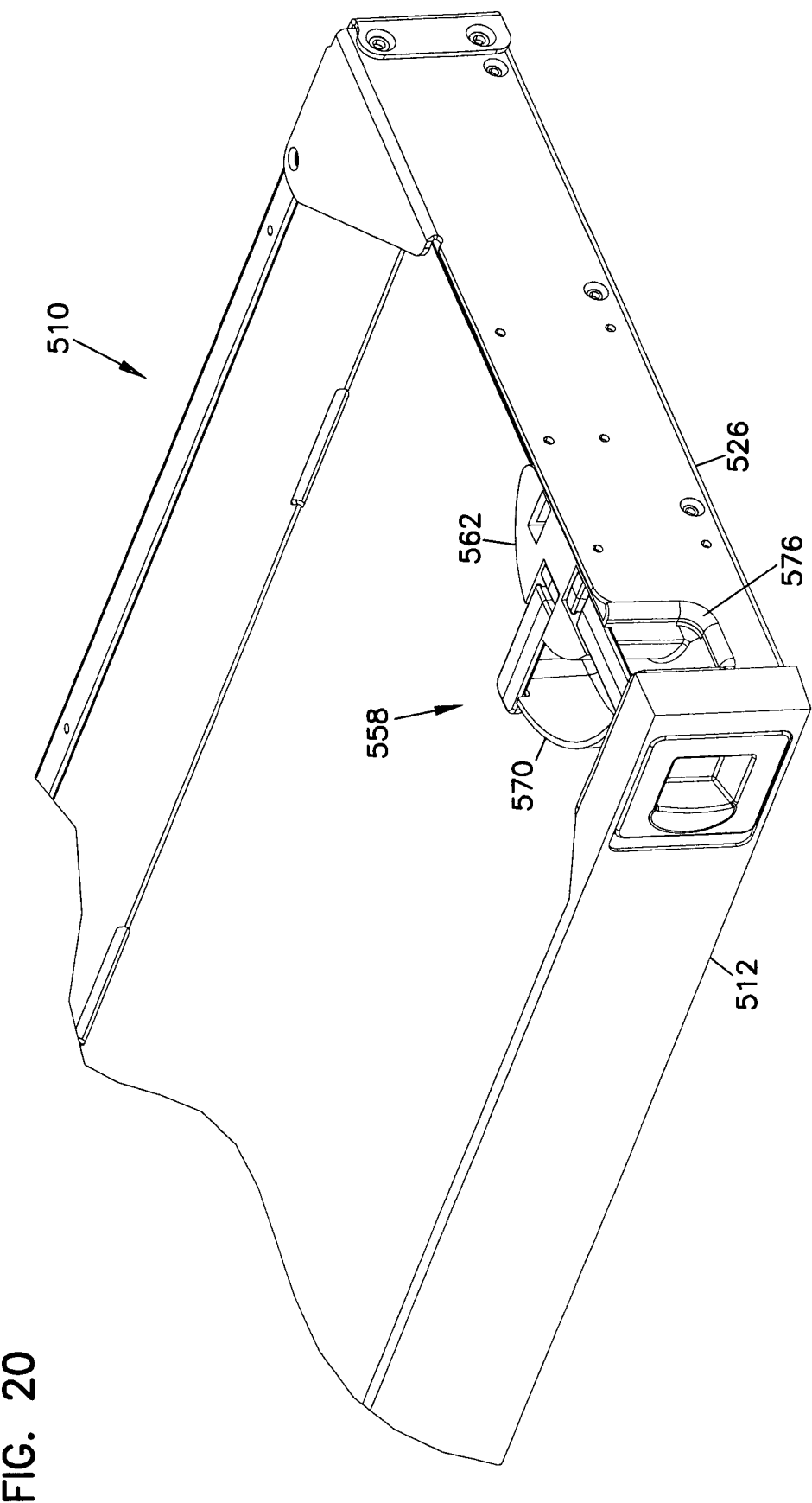
Figure 21:
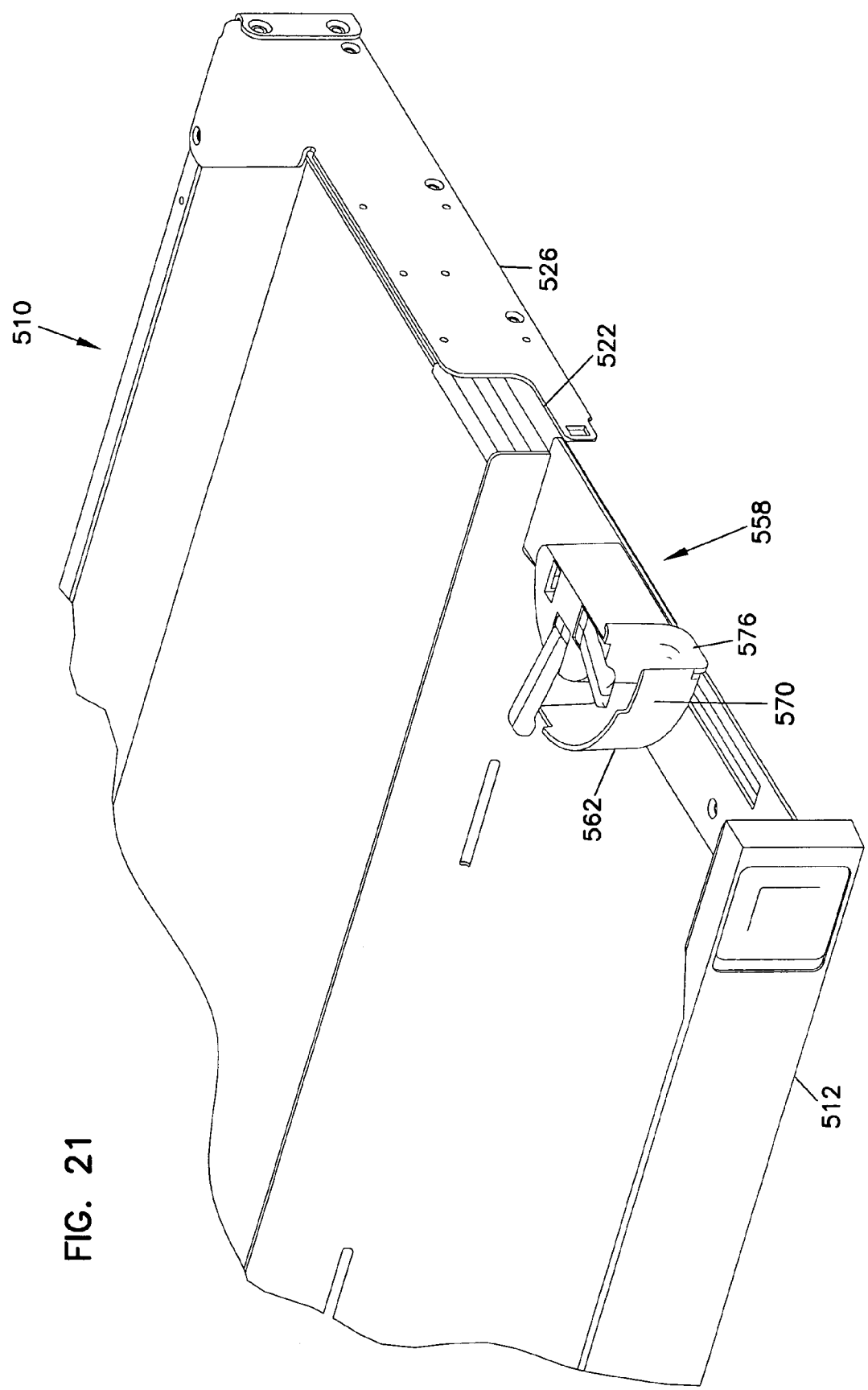
Figure 22:
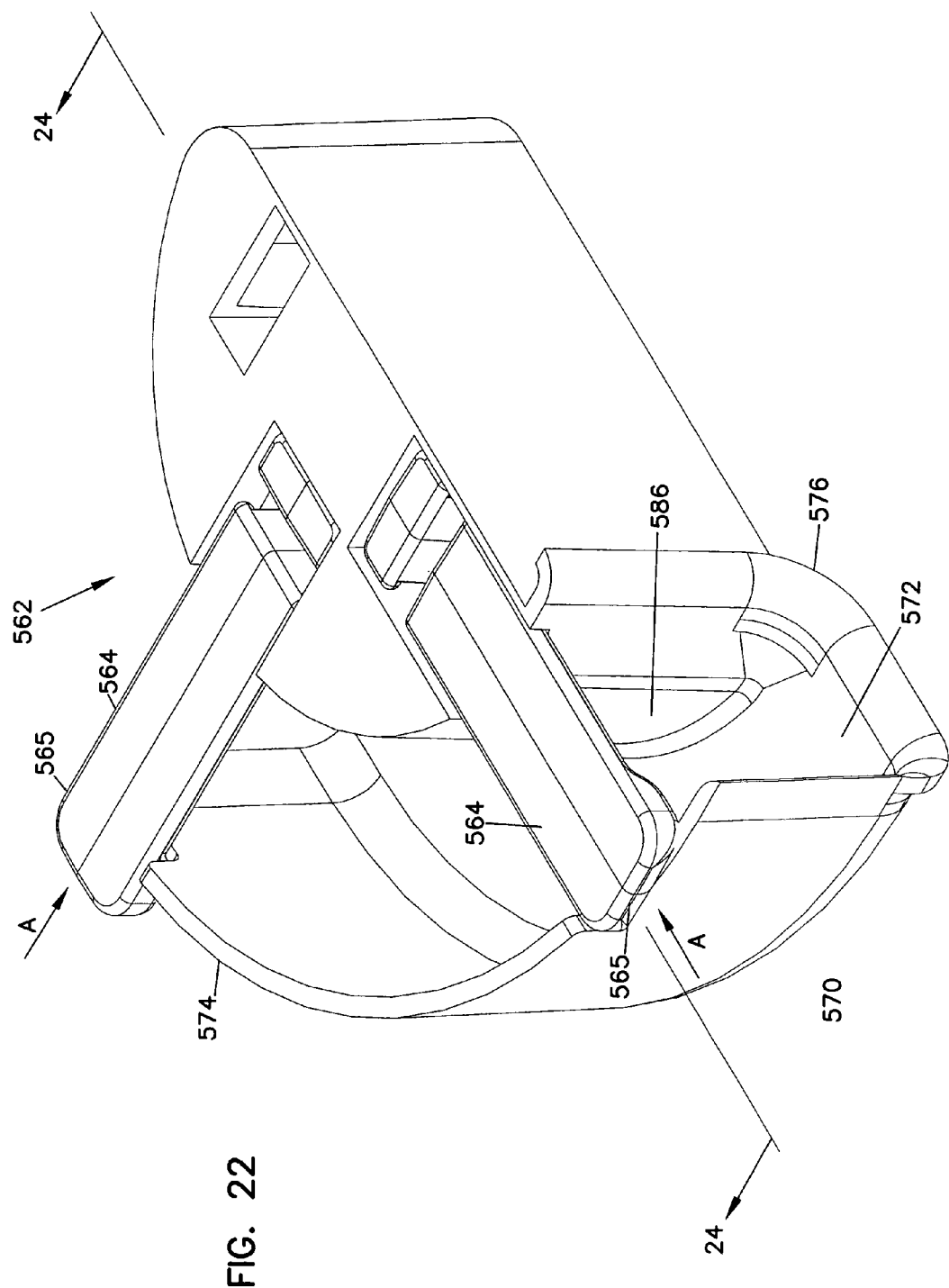
Figure 23:
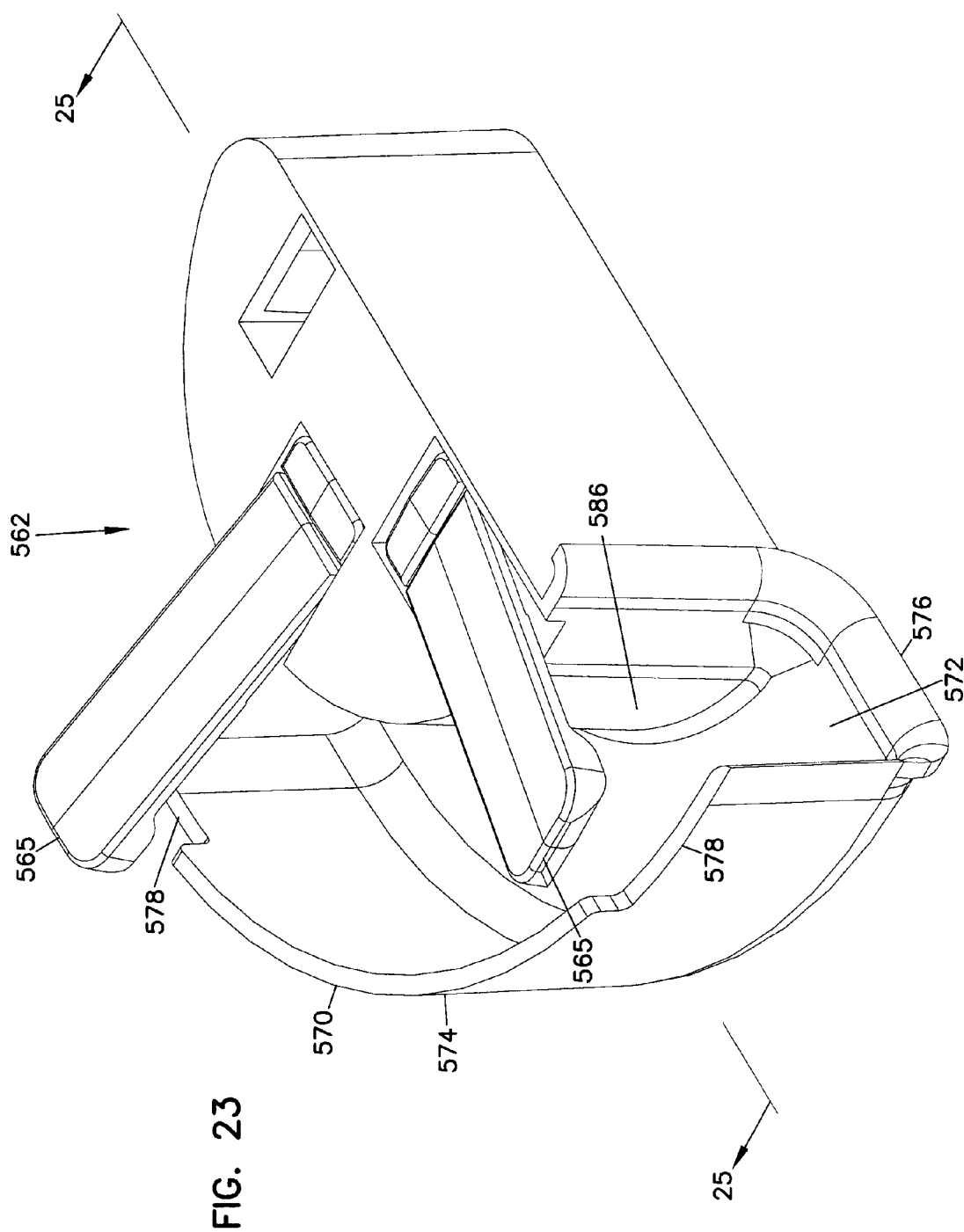
Figure 26:
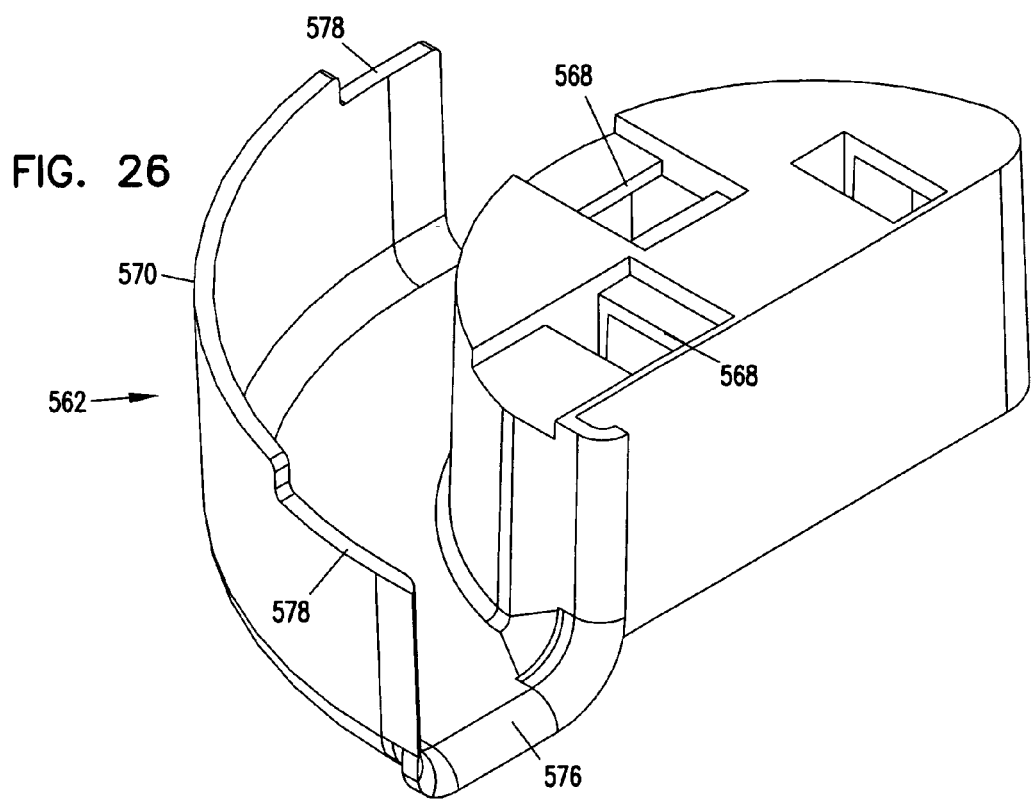
Figure 27:
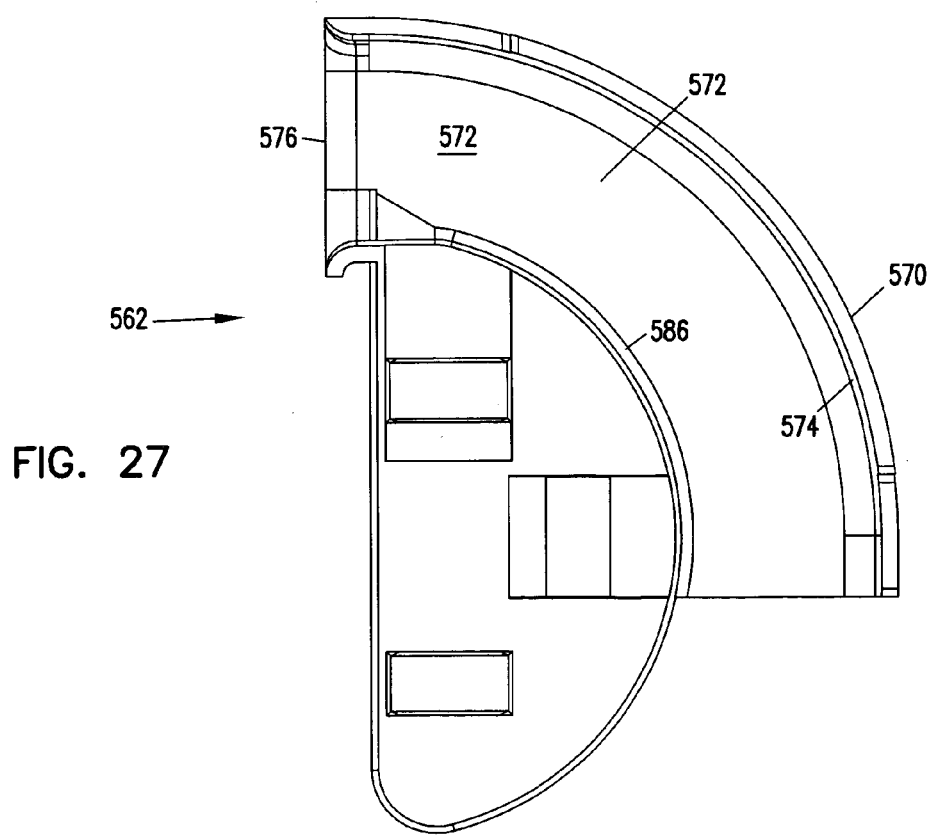
Figure 28:
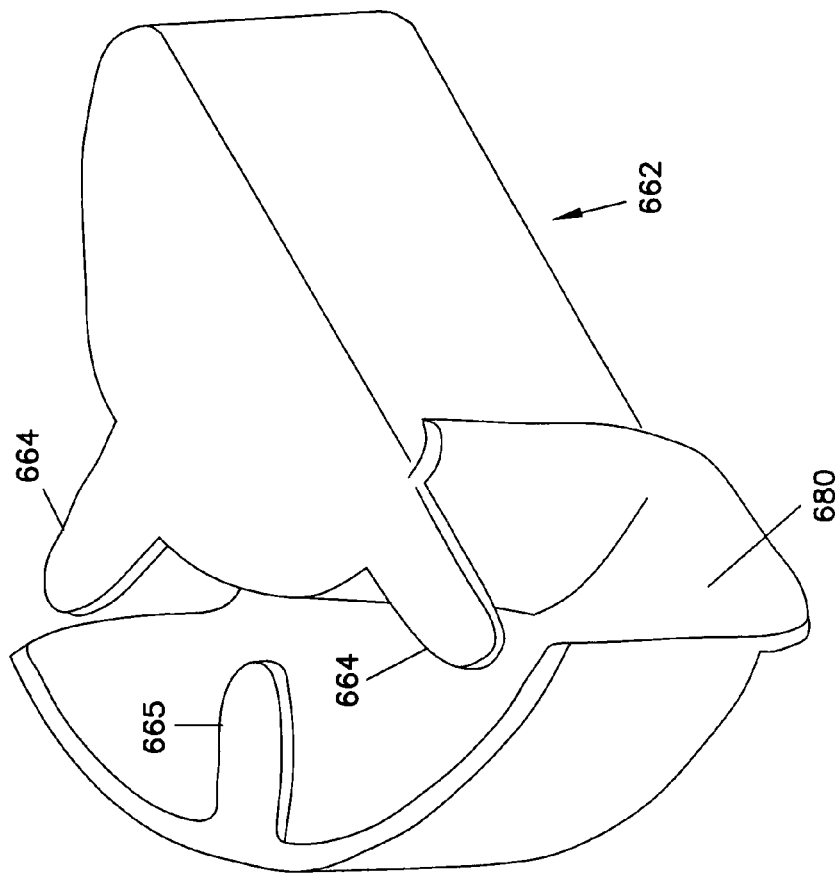
Figure 29:
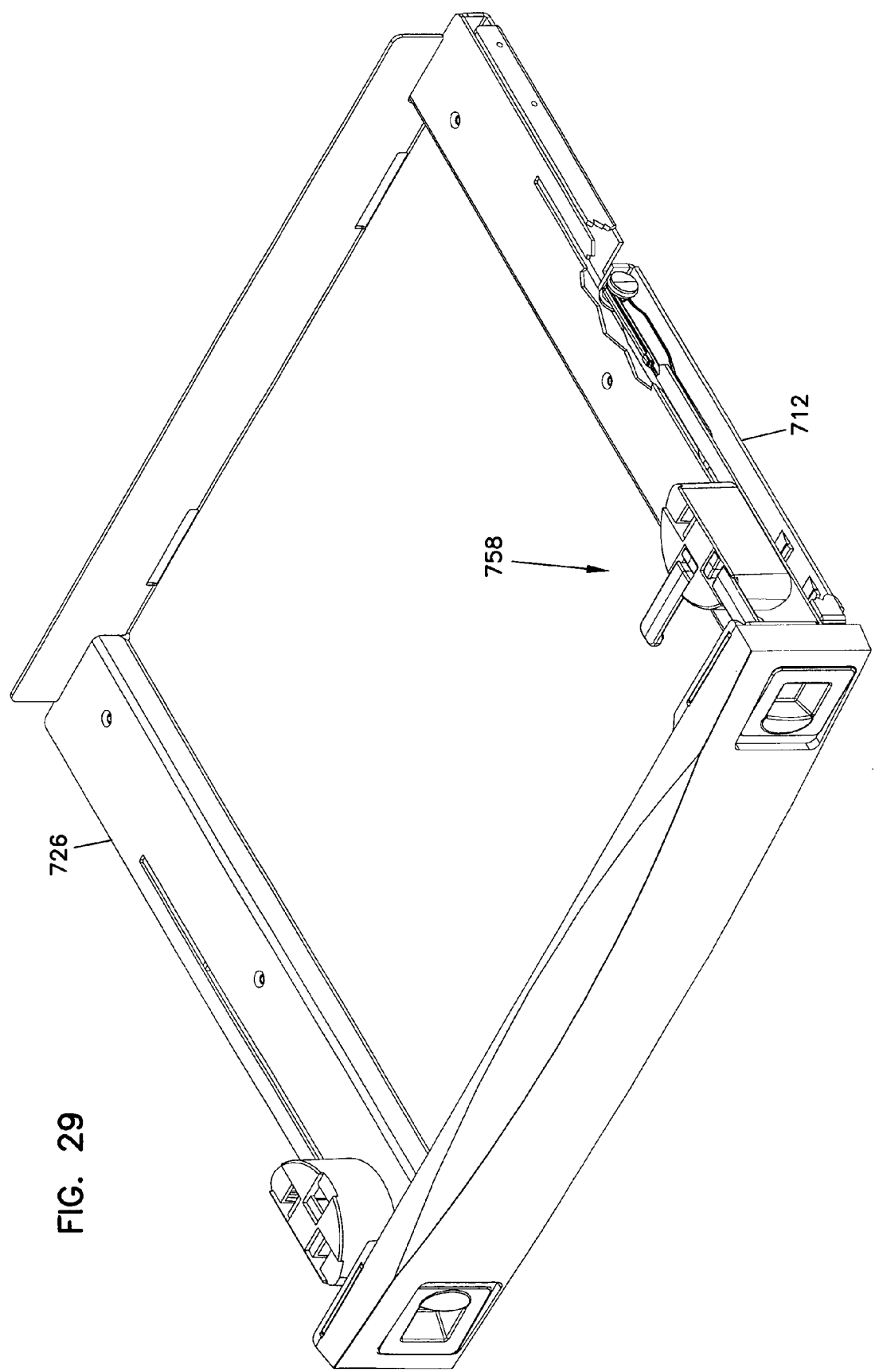
Figure 30:
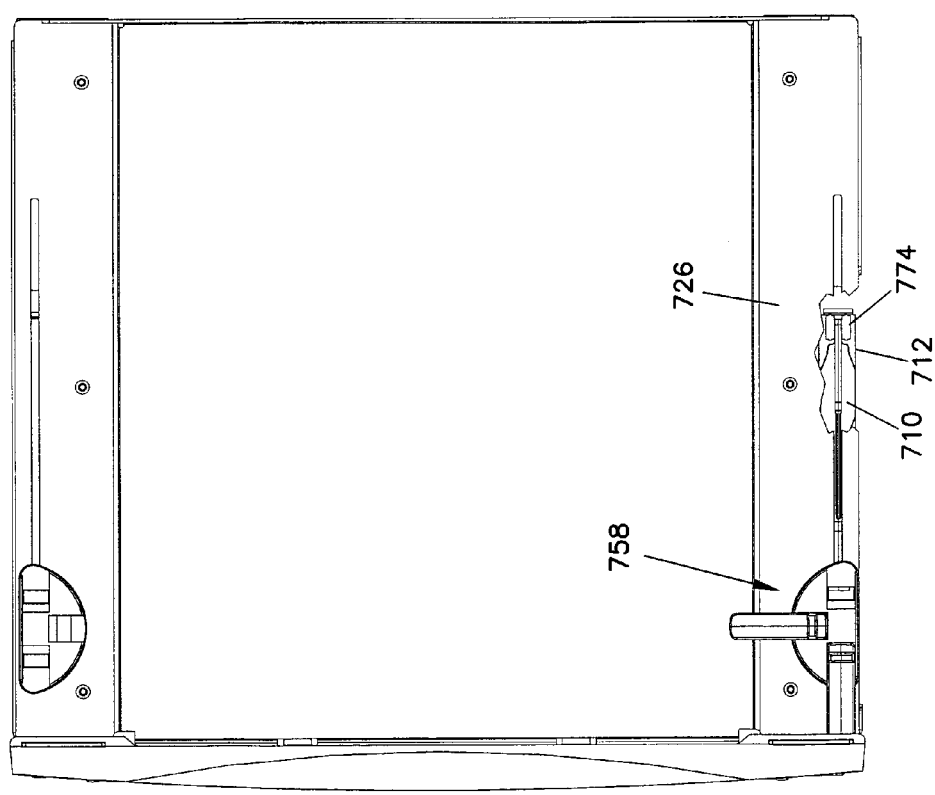
Figure 33:
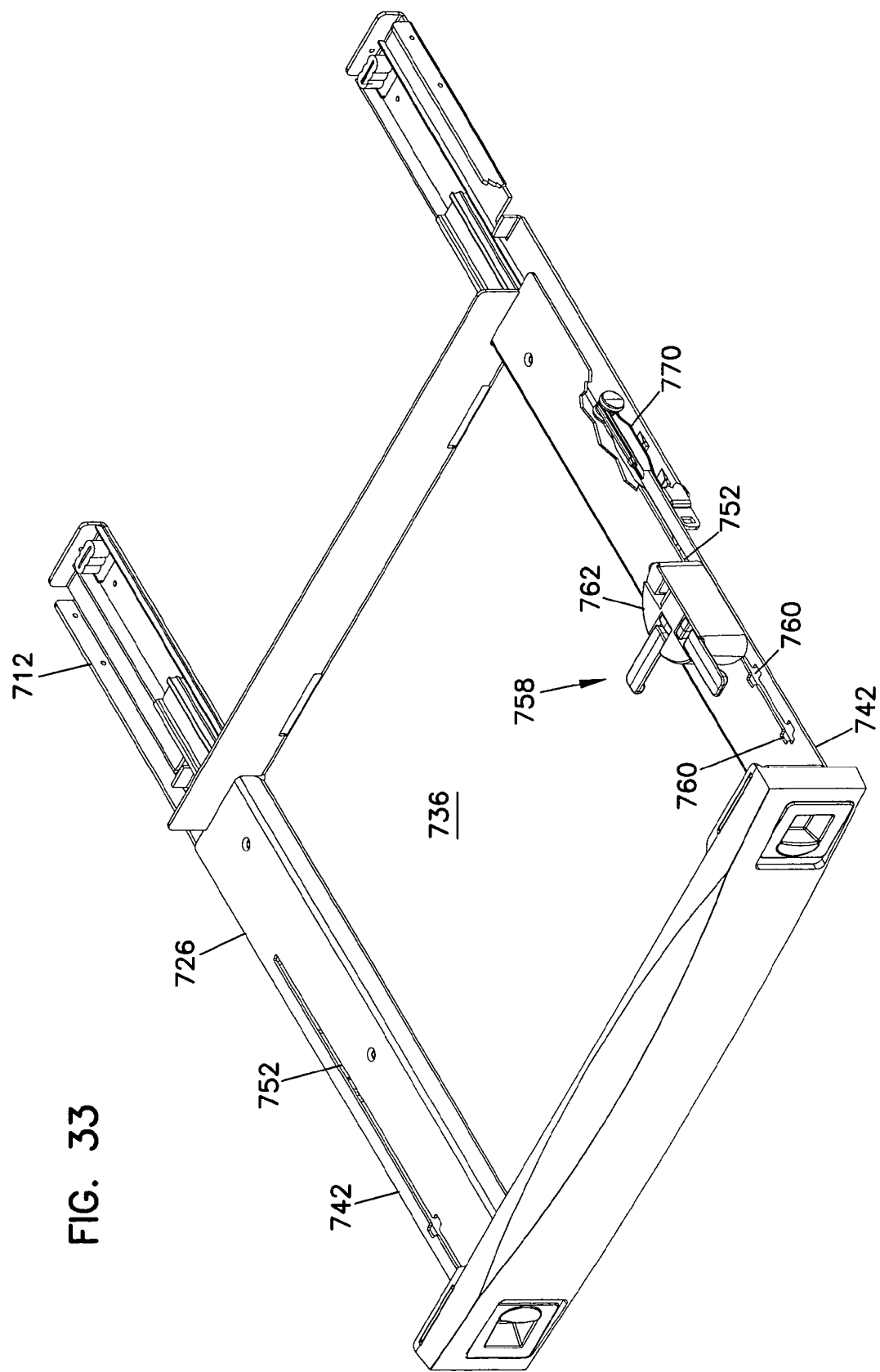
Figure 34:
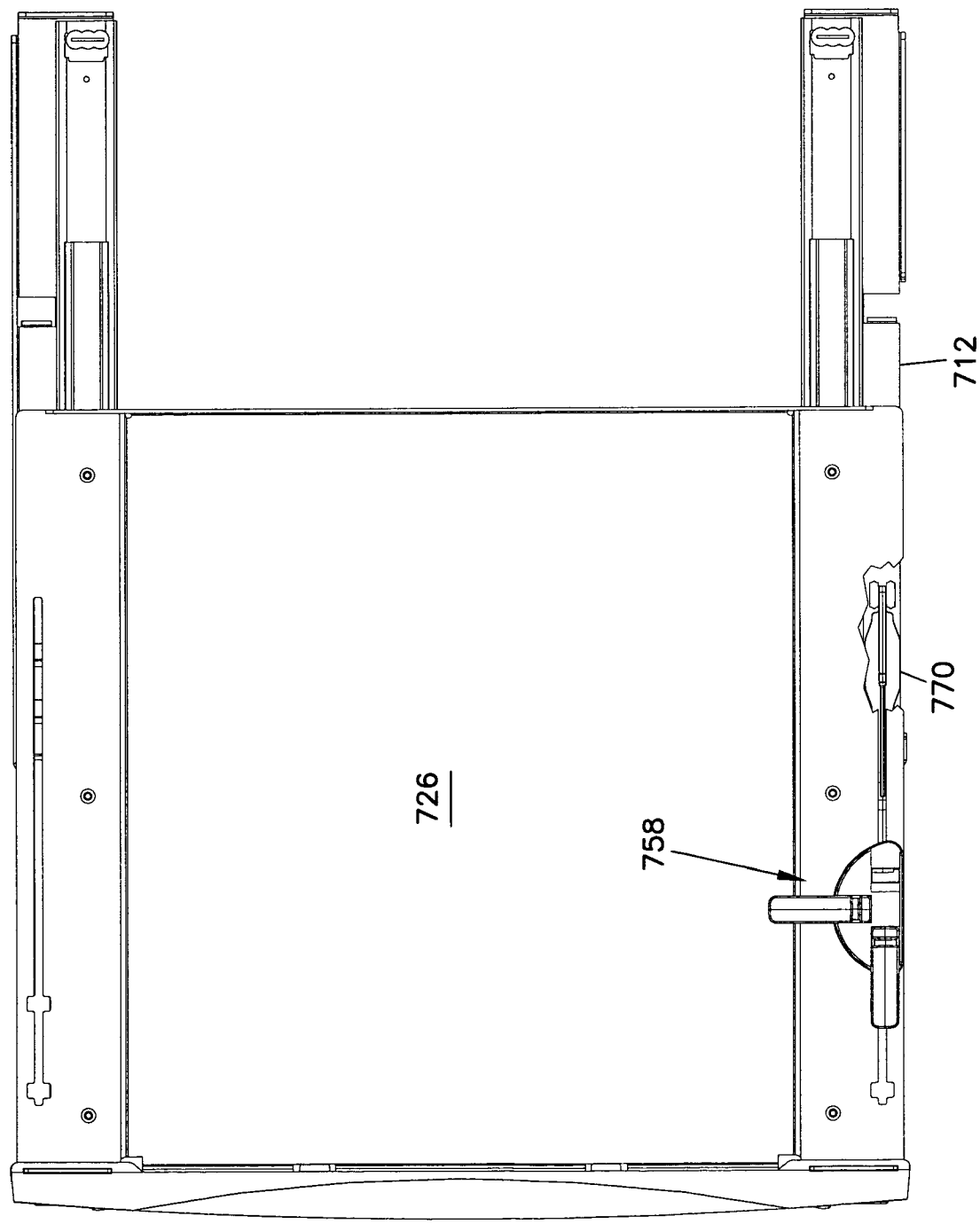
Figure 35:
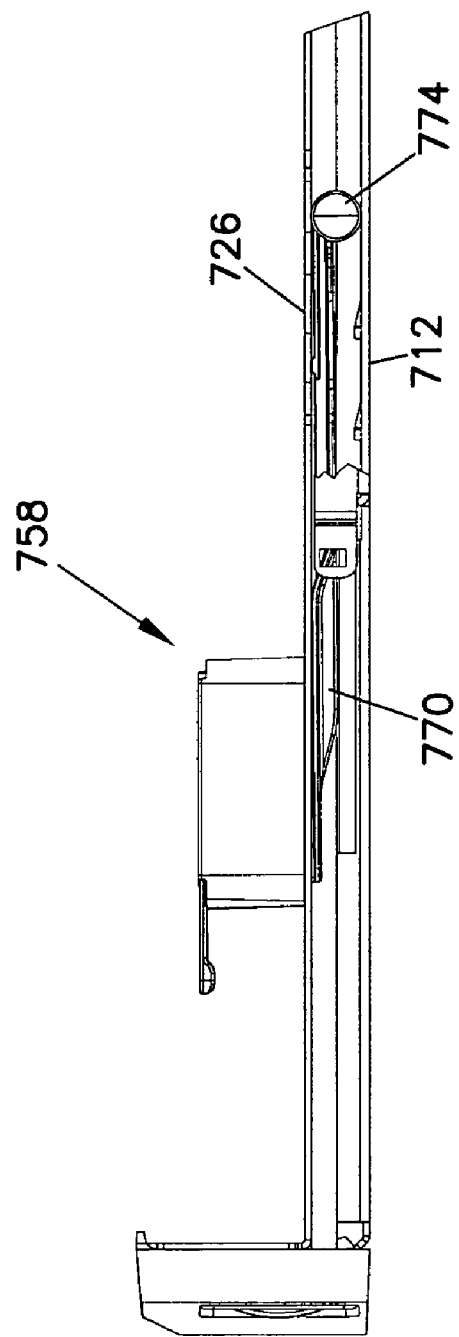
Figure 36:
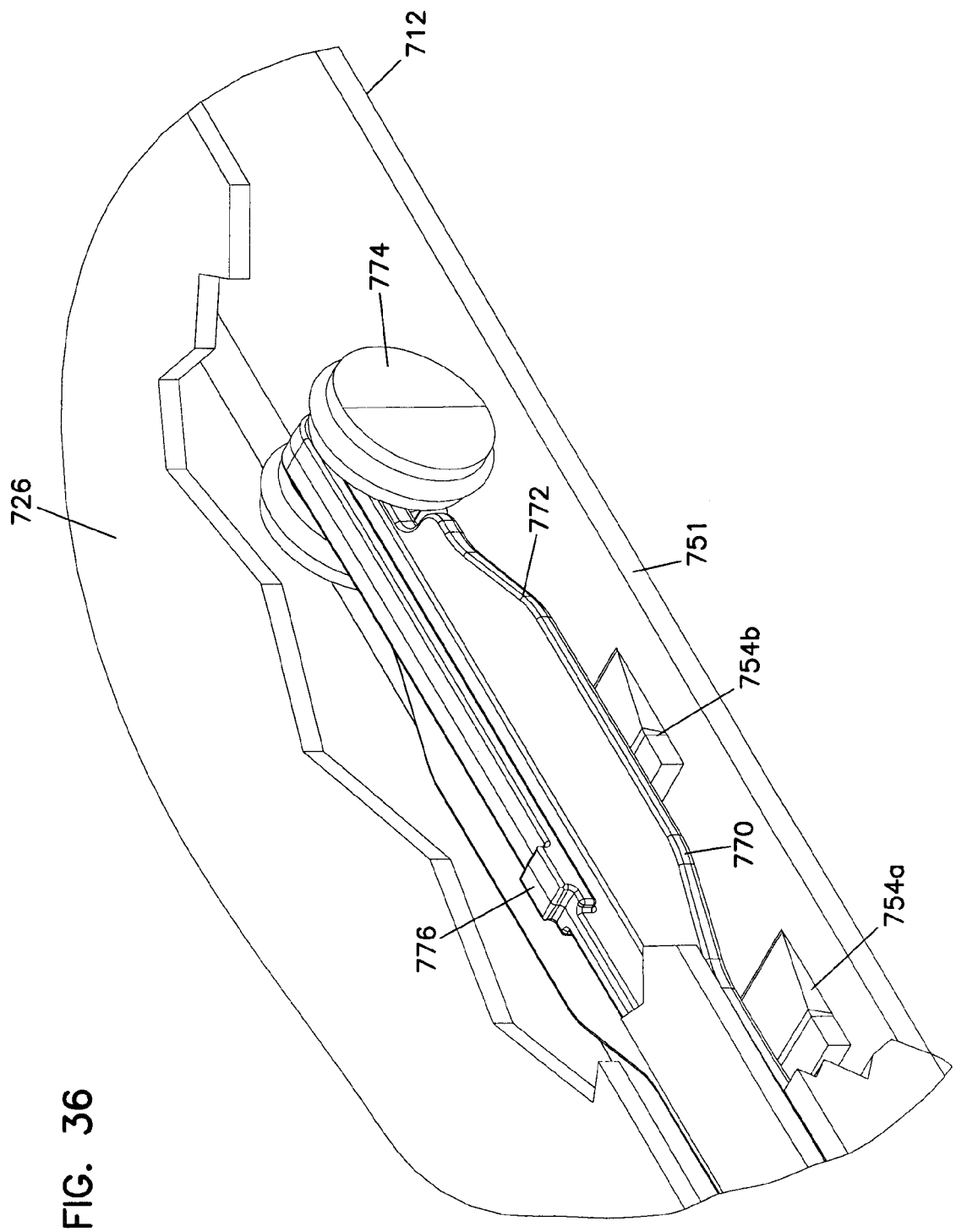
Figure 37:
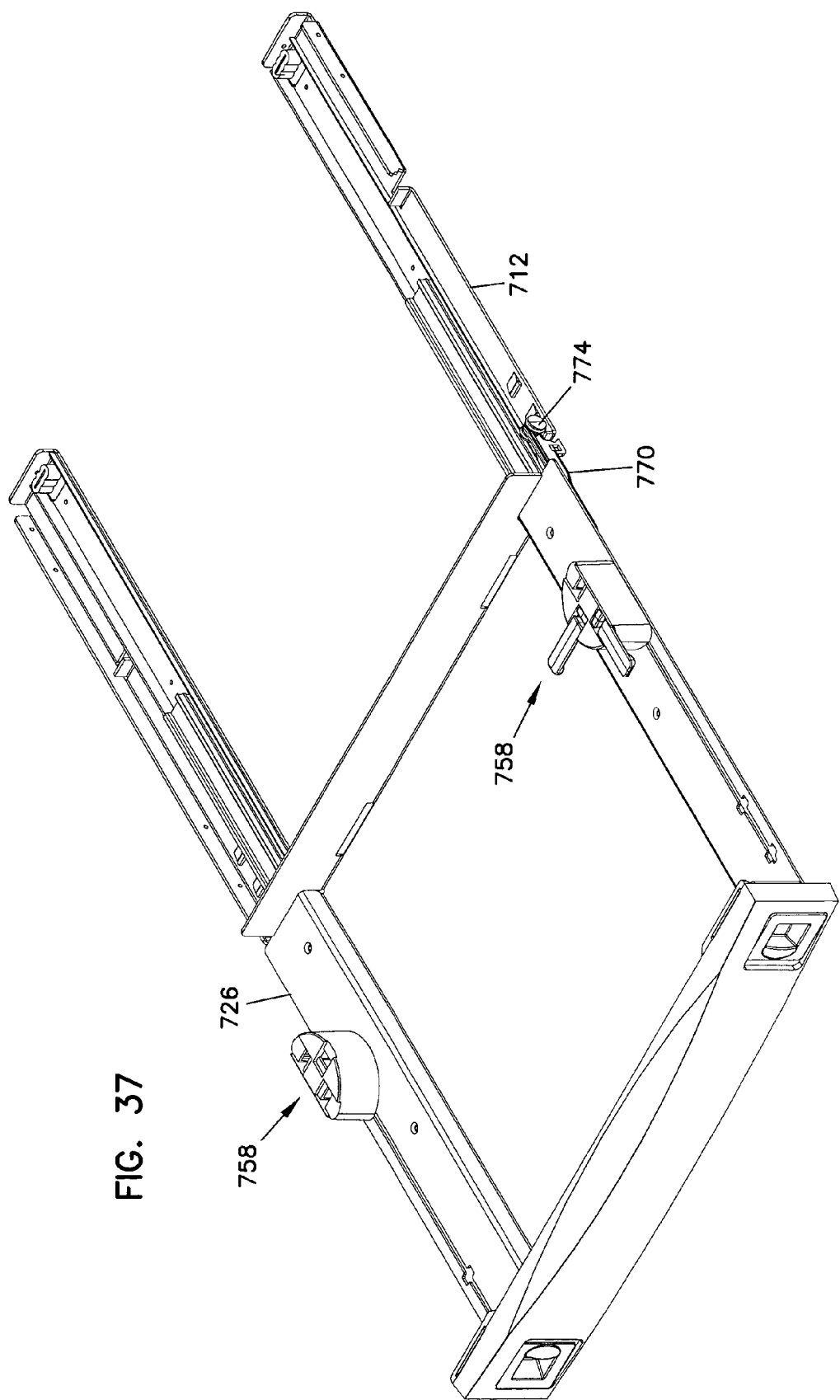
Figure 38:
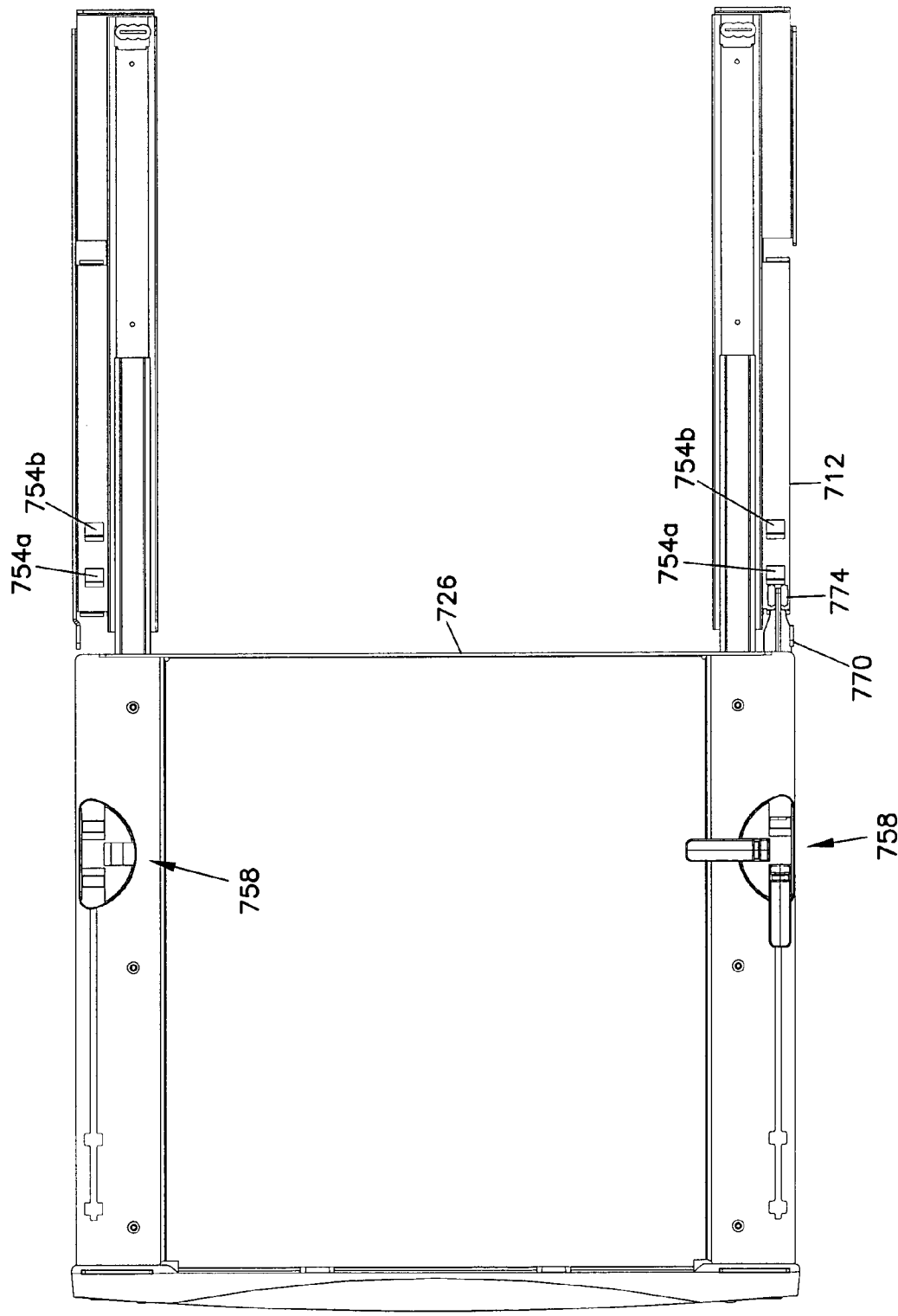
Figure 39:
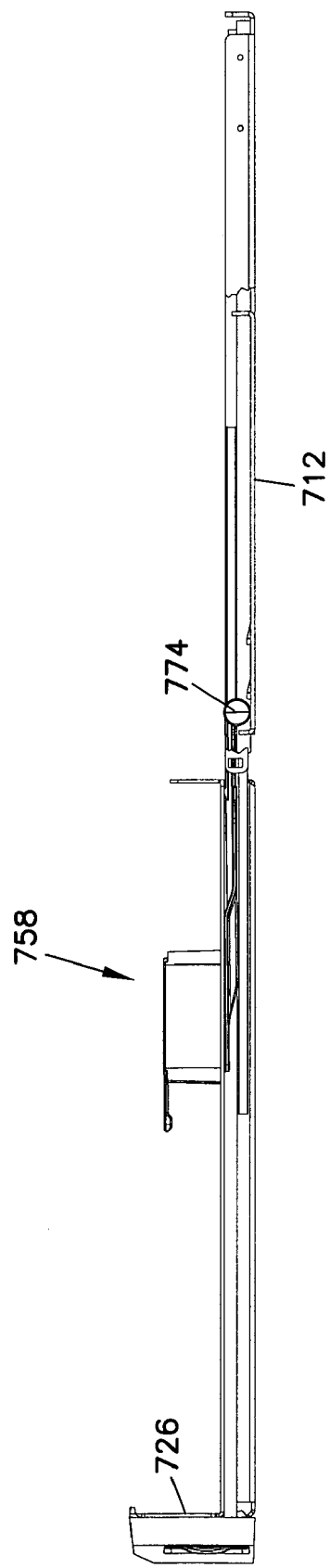
Figure 40:
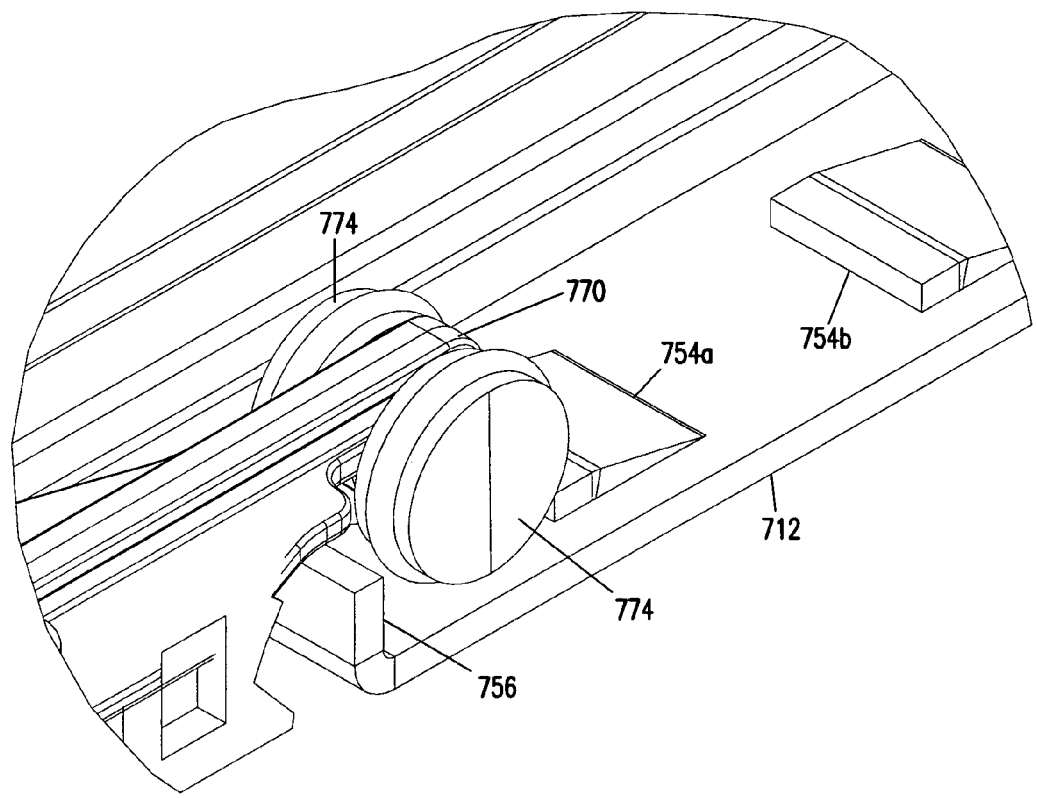
Figure 41:
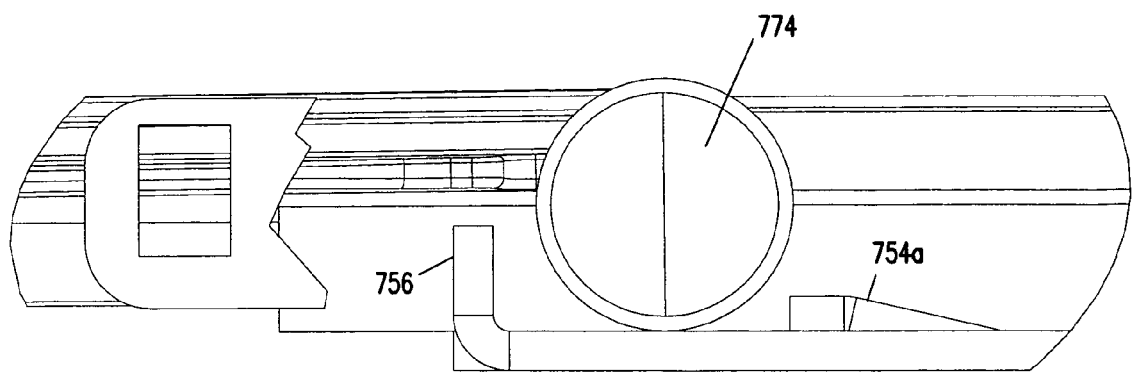
Figure 41A:
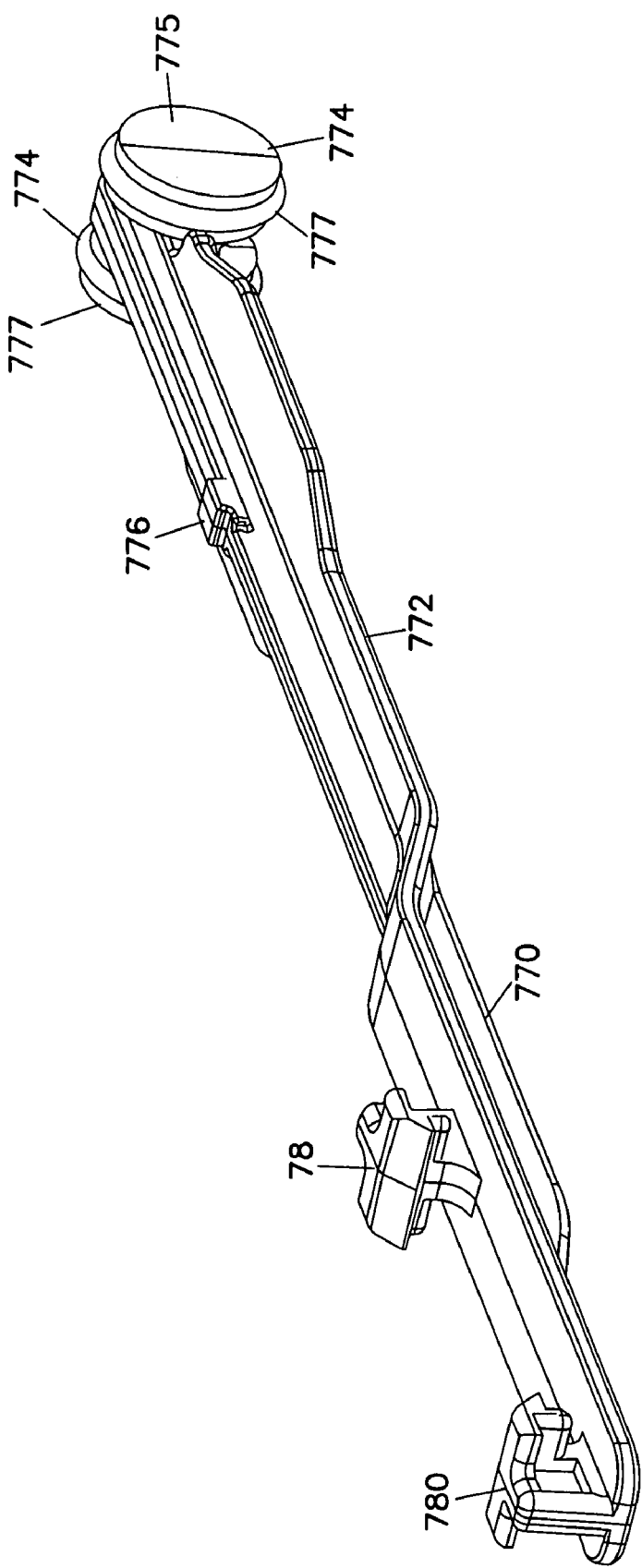
Figure 42:
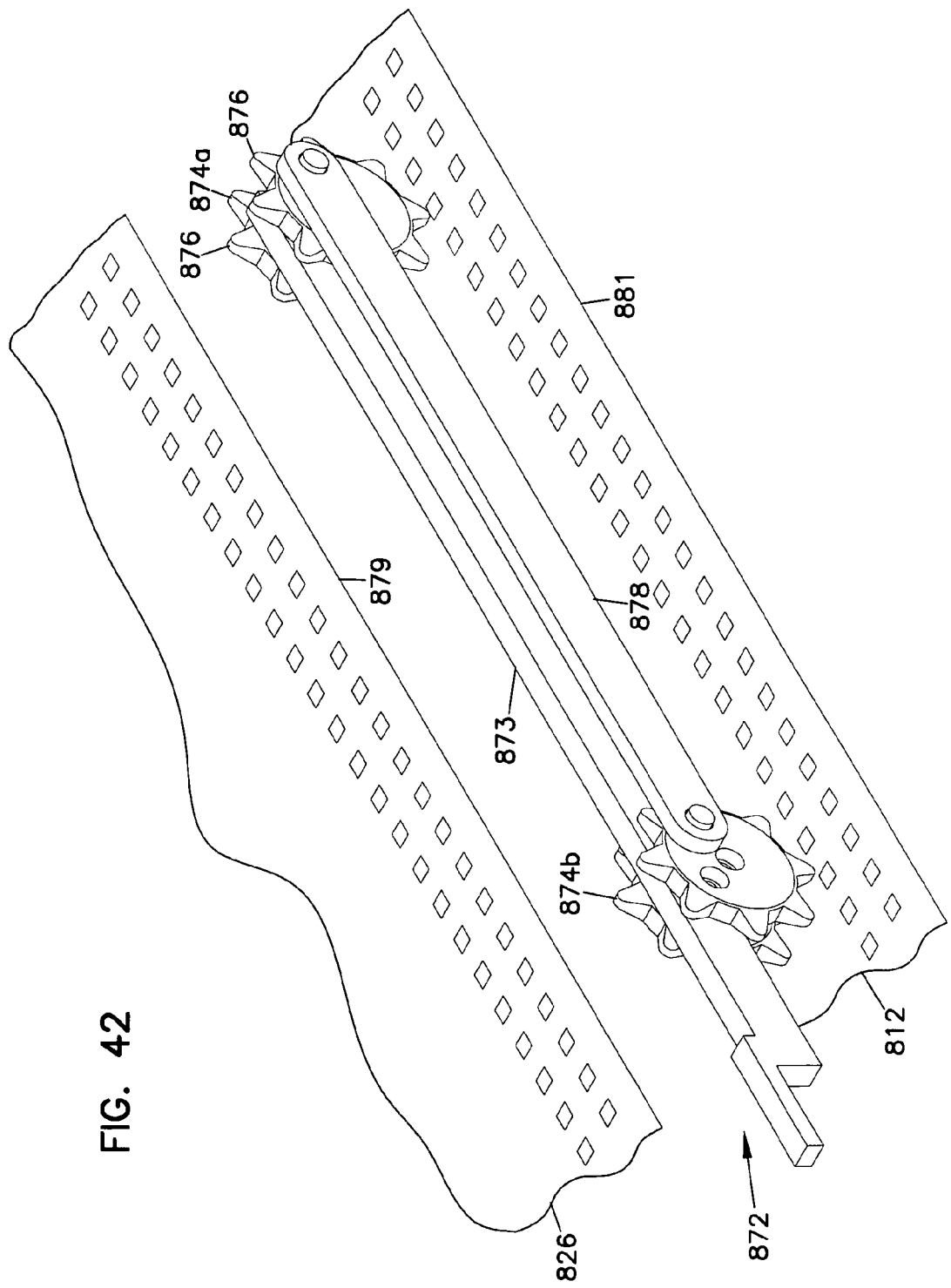
Figure 44:
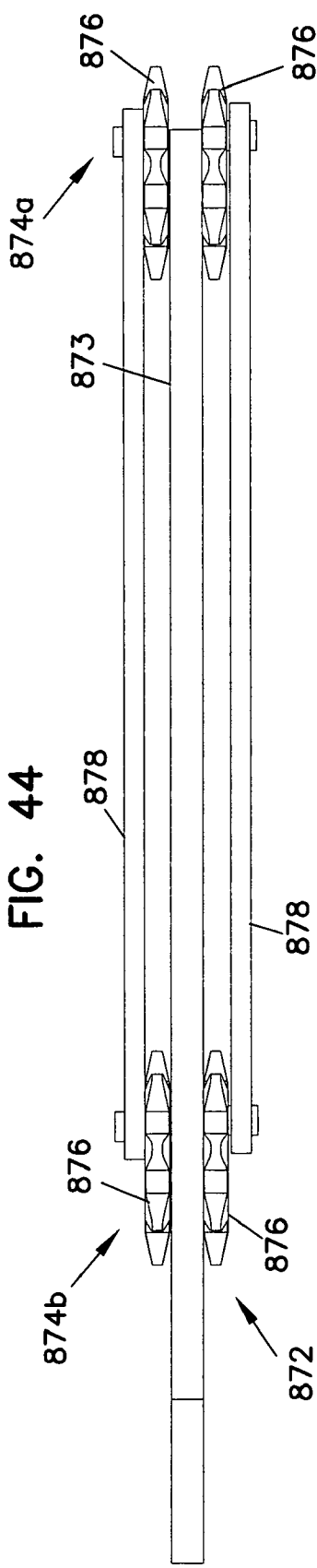
Figure 43:
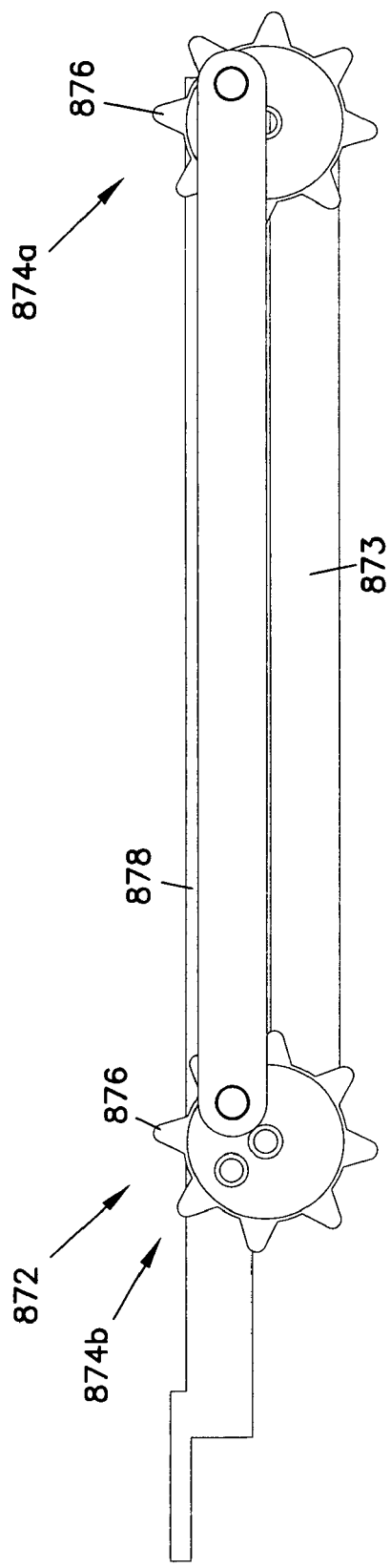
Figure 45:
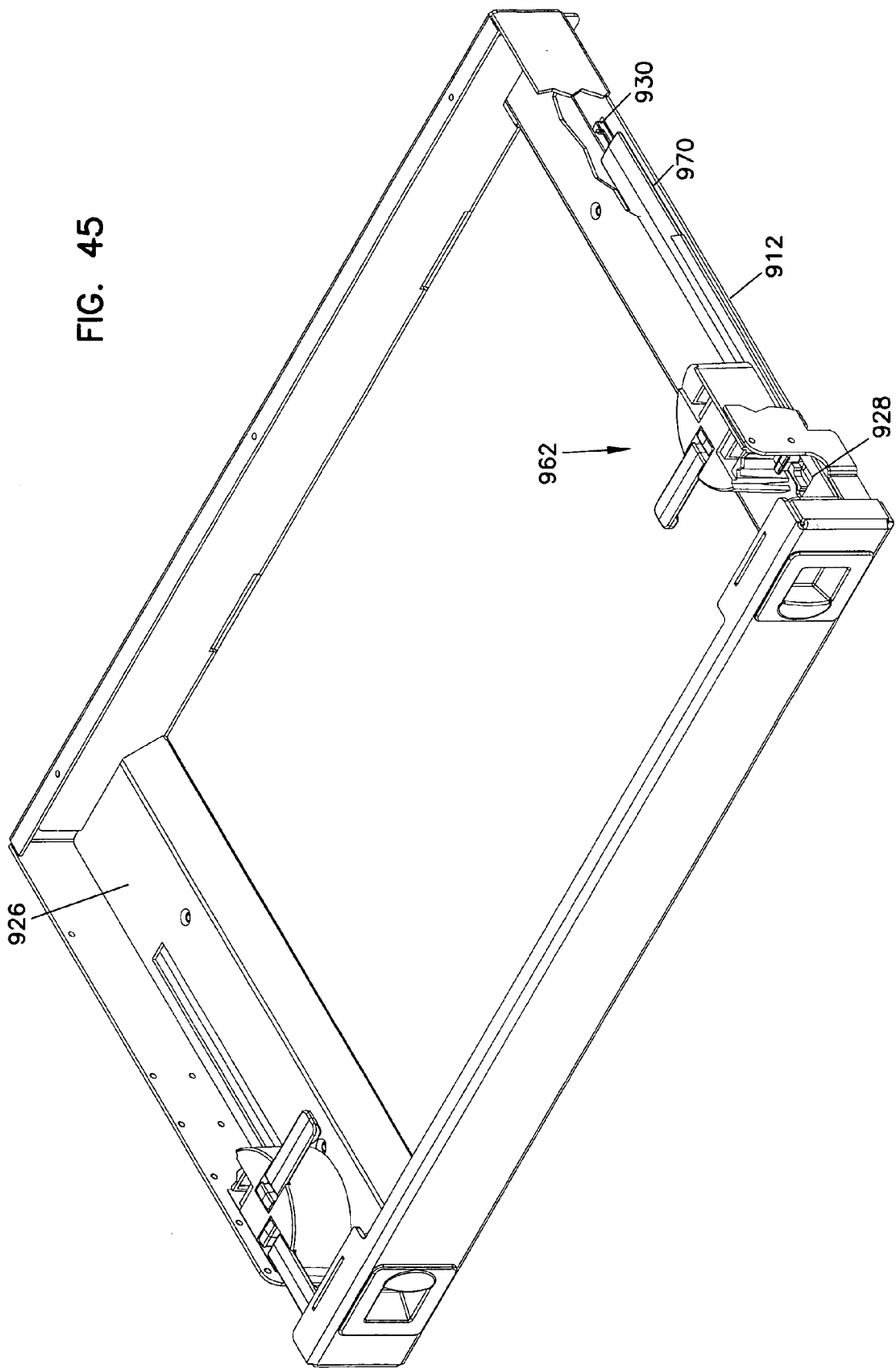
Figure 46:
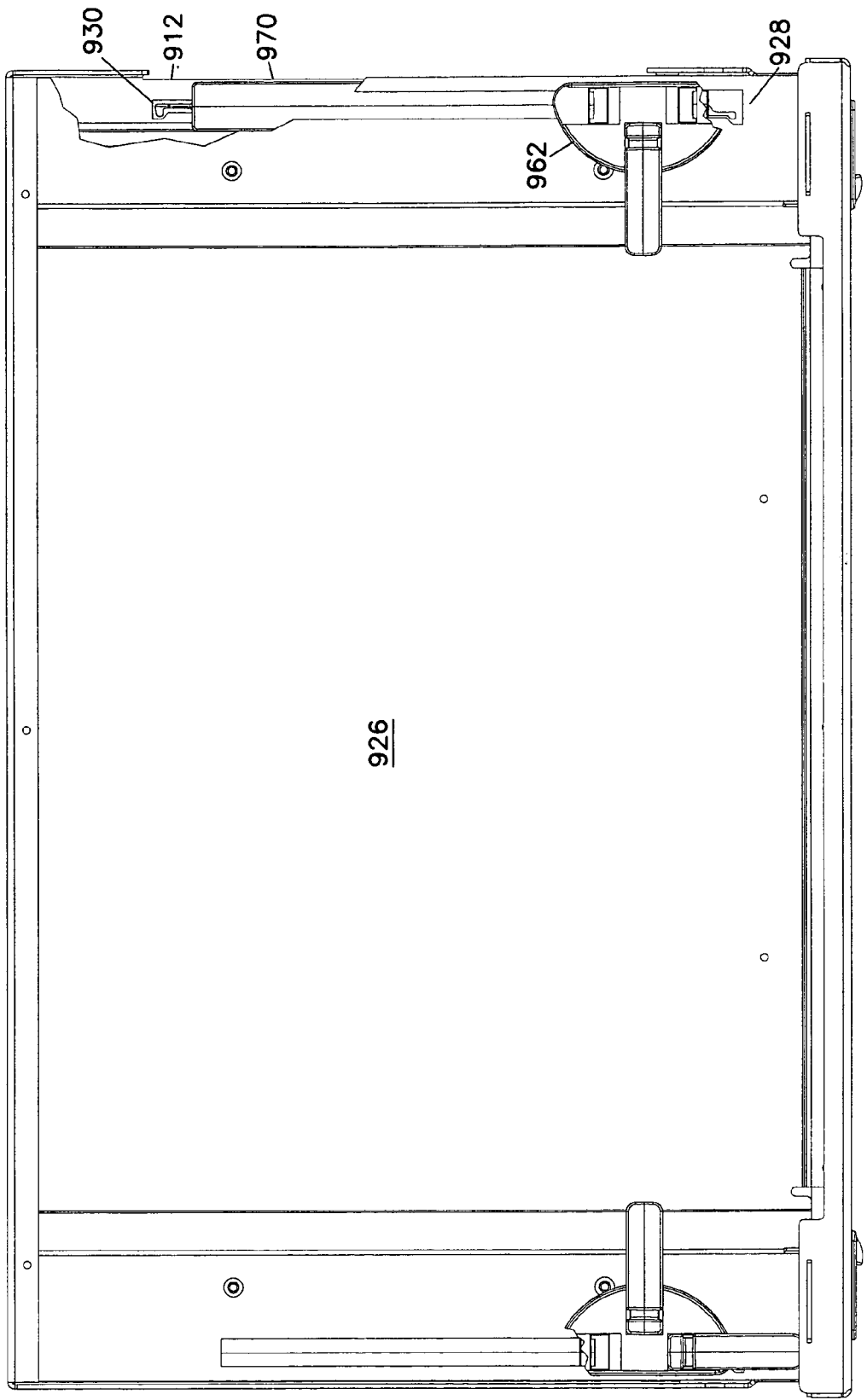
Figure 47:
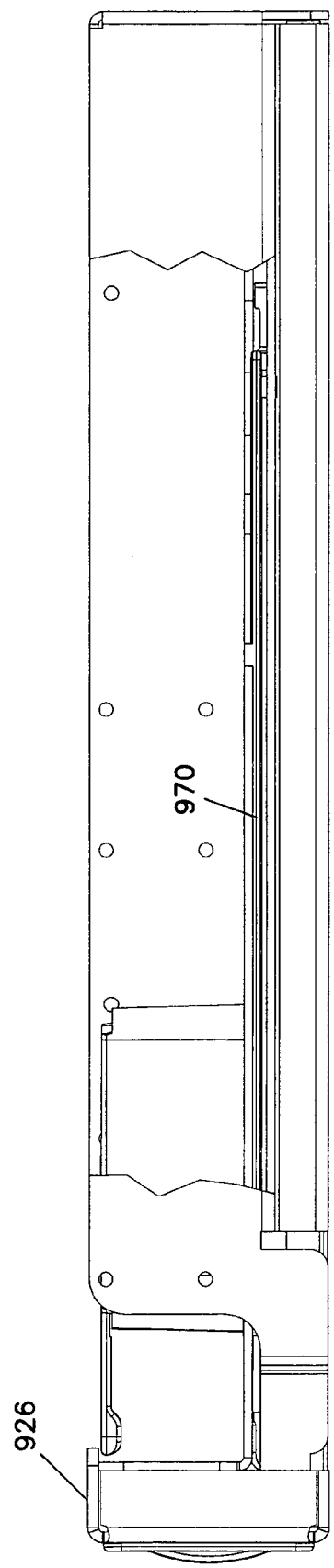
Figure 48:
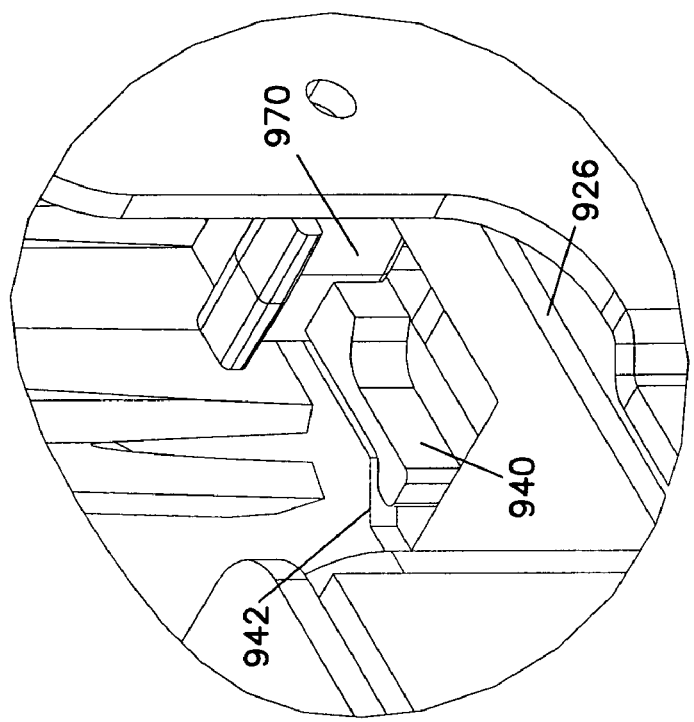
Figure 49:
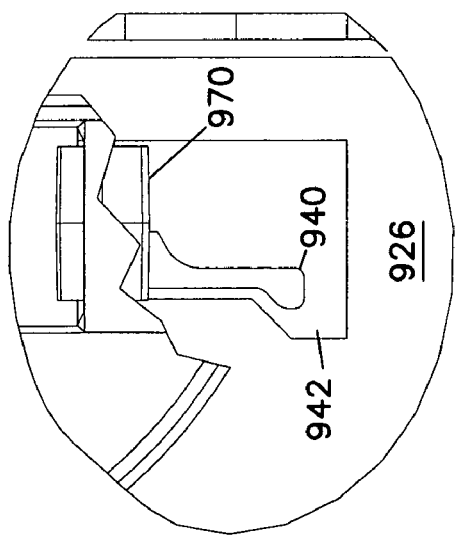
Figure 50:
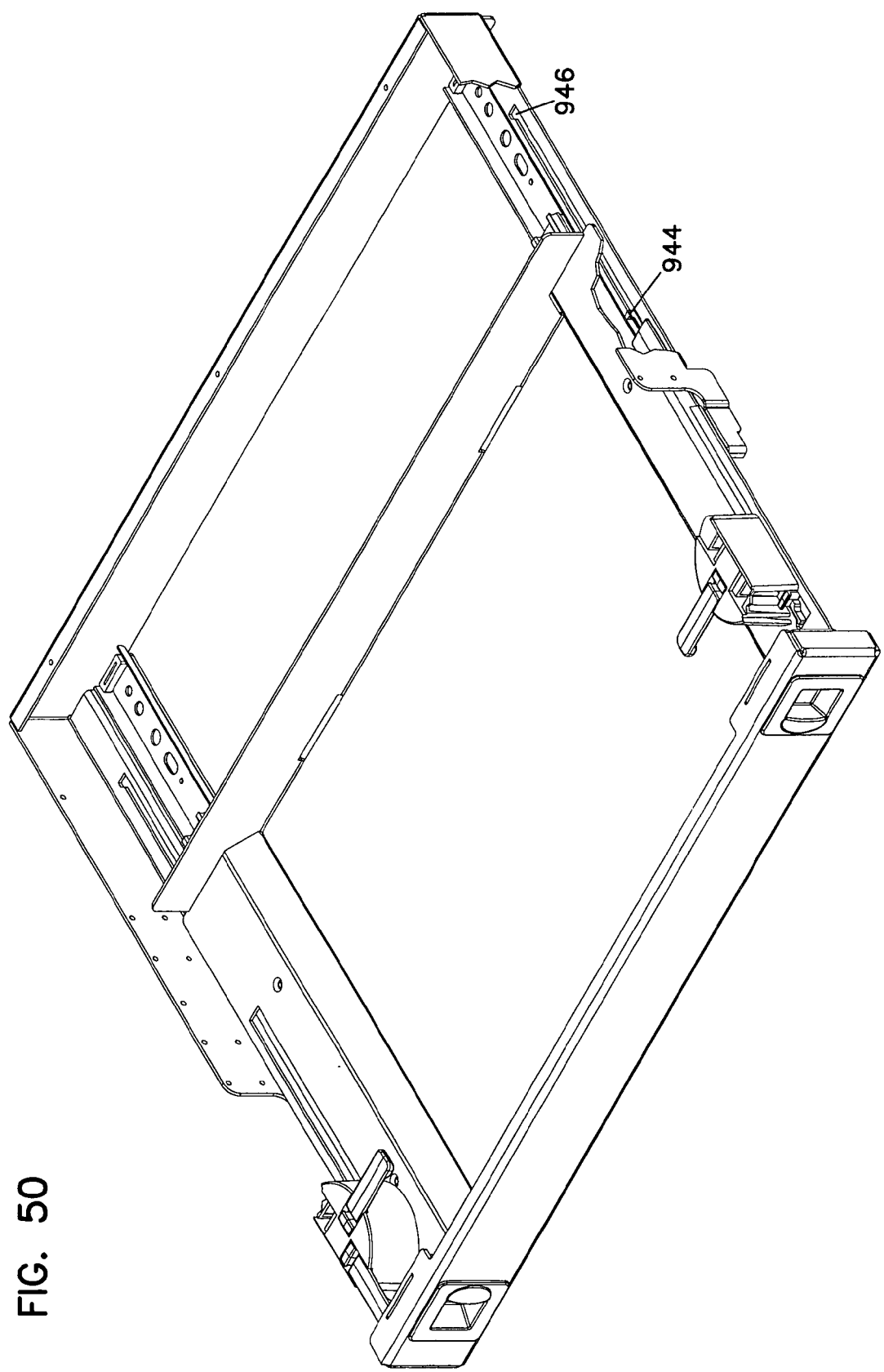
Figure 51:
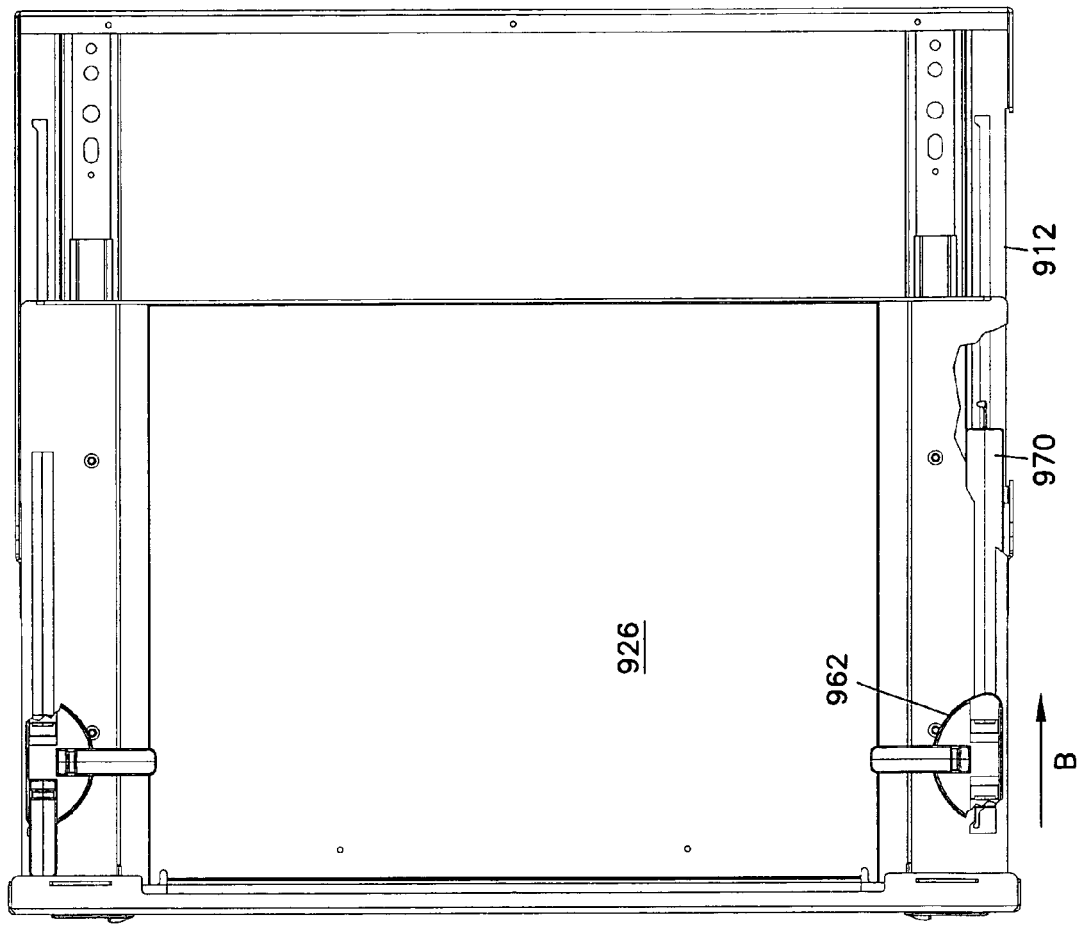
Figure 52:
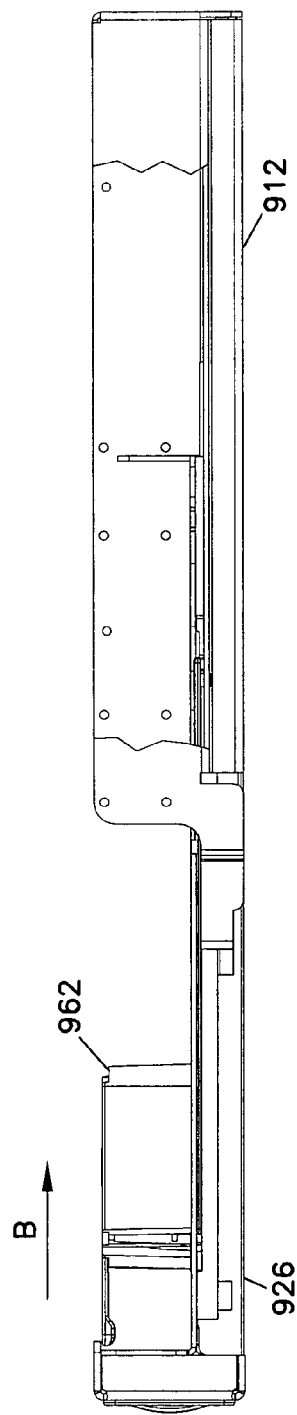
Figure 53:
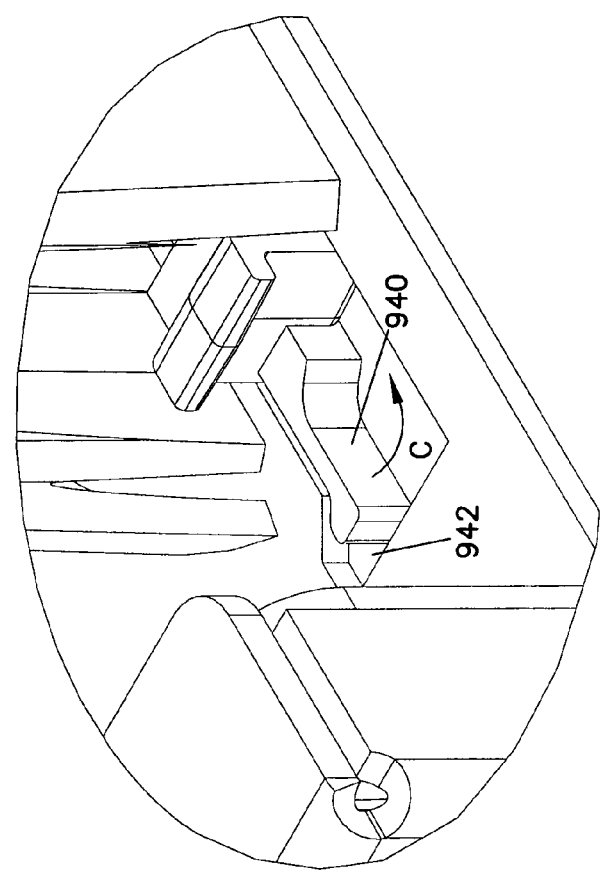
Figure 54:
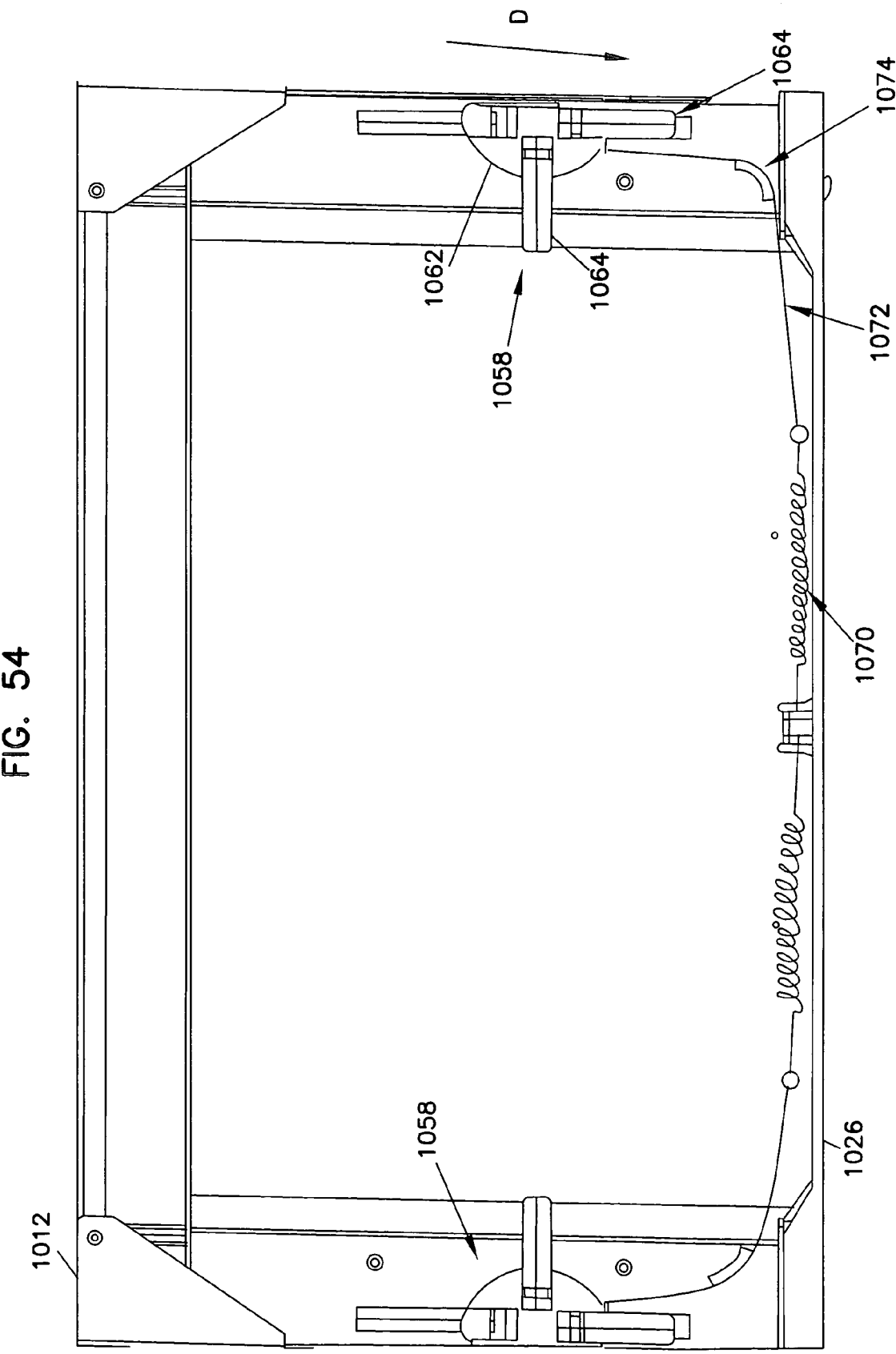
Figure 55:
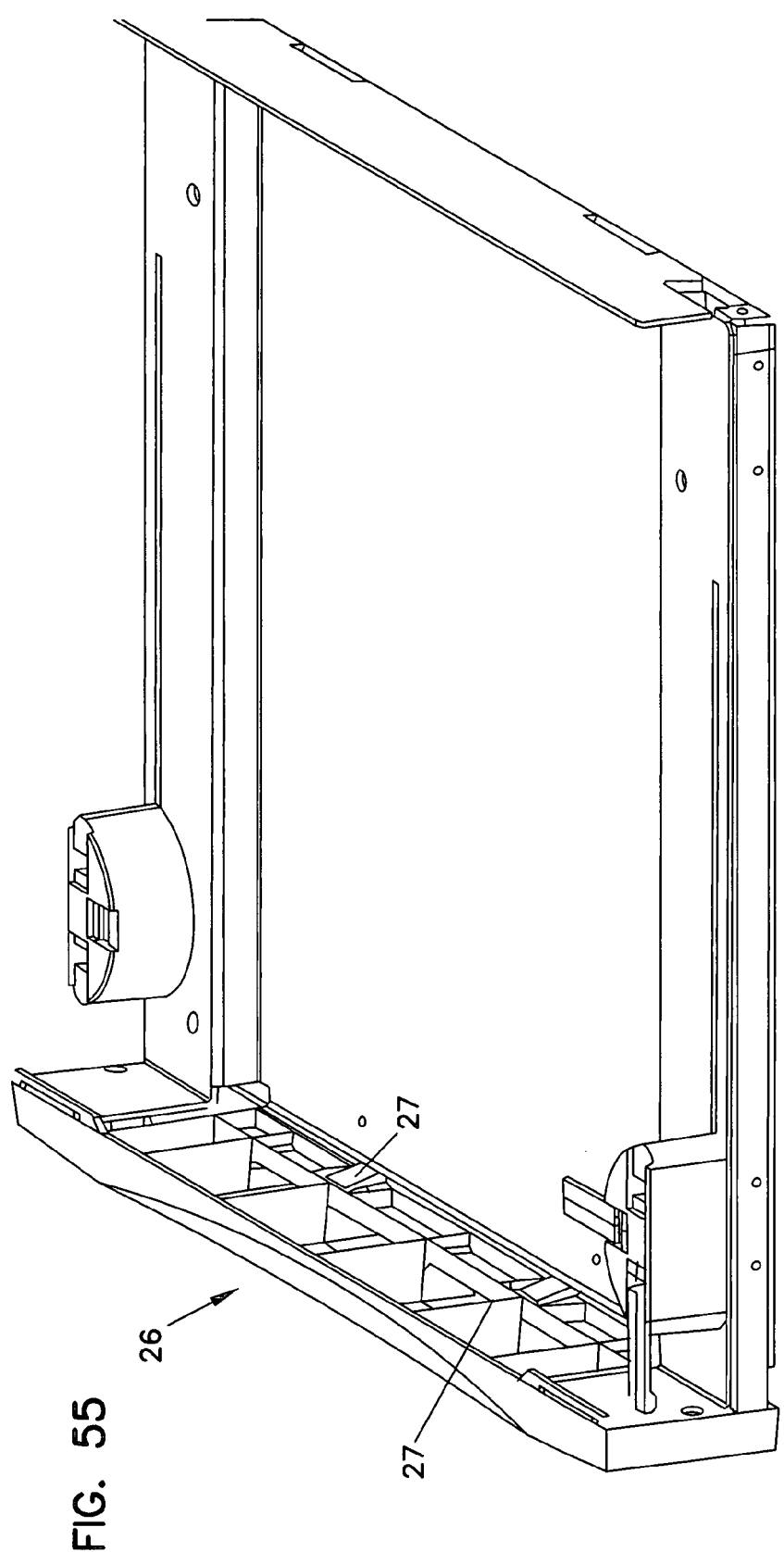

FIG. 20 is a perspective view of an alternative cable management panel including a drawer with a modified take-up mechanism including further cable retention members;

FIG. 21 shows the drawer of the cable management panel of FIG. 20 in the extended position, with the cable retention tabs extended upwardly to permit access to the cables in the trough section;

FIG. 22 is a perspective view of the push member of the take-up mechanism of FIGS. 20 and 21;

FIG. 23 shows the push member of FIG. 22 with the cable retention tabs lifted upwardly;

FIG. 24 is a cross-section along lines 24—24 of FIG. 22;

FIG. 25 is a cross-section along lines 25—25 of FIG. 23;

FIG. 26 shows the push member of FIG. 22 without the cable retention tabs;

FIG. 27 is a top view of the push member of FIG. 26;

FIG. 28 is a perspective view of a further modified take-up mechanism to the take-up mechanism shown in FIGS. 20–27;

FIGS. 29–31 show perspective, top, and side views of a further alternative cable management panel including a drawer with a modified take-up mechanism including a wheel, with portions of the panel removed for viewing;

FIG. 32 is an enlarged portion of the modified take-up mechanism of FIGS. 29–31;

FIGS. 33–35 show perspective, top, and side views of the cable management panel of FIGS. 29–32, with the drawer partially opened;

FIG. 36 is an enlarged portion of the take-up mechanism in the partially opened position of FIGS. 33–35;

FIGS. 37–39 show perspective, top, and side views of the cable management panel of FIGS. 29–32, with the drawer fully opened;

FIGS. 40 and 41 are enlarged perspective and side views of the take-up mechanism of the fully opened drawer of FIGS. 37–39;

FIG. 41A shows a perspective view of the extension of the take-up mechanism of FIGS. 29–41;

FIGS. 42–44 show exploded perspective, side, and top views of a further modified take-up mechanism including a rack and pinion instead of a wheel as shown in FIGS. 29–41;

FIGS. 45–53 show various views of a further alternative cable management panel including a drawer with a modified take-up mechanism including chassis and drawer detents for controlling movement of the push member;

FIG. 54 shows a top view of a further alternative cable management panel including a drawer with a modified take-up mechanism including a spring biased push member;

FIG. 55 shows a latch for latching the drop-in plate within the drawer; and

Figure 56:
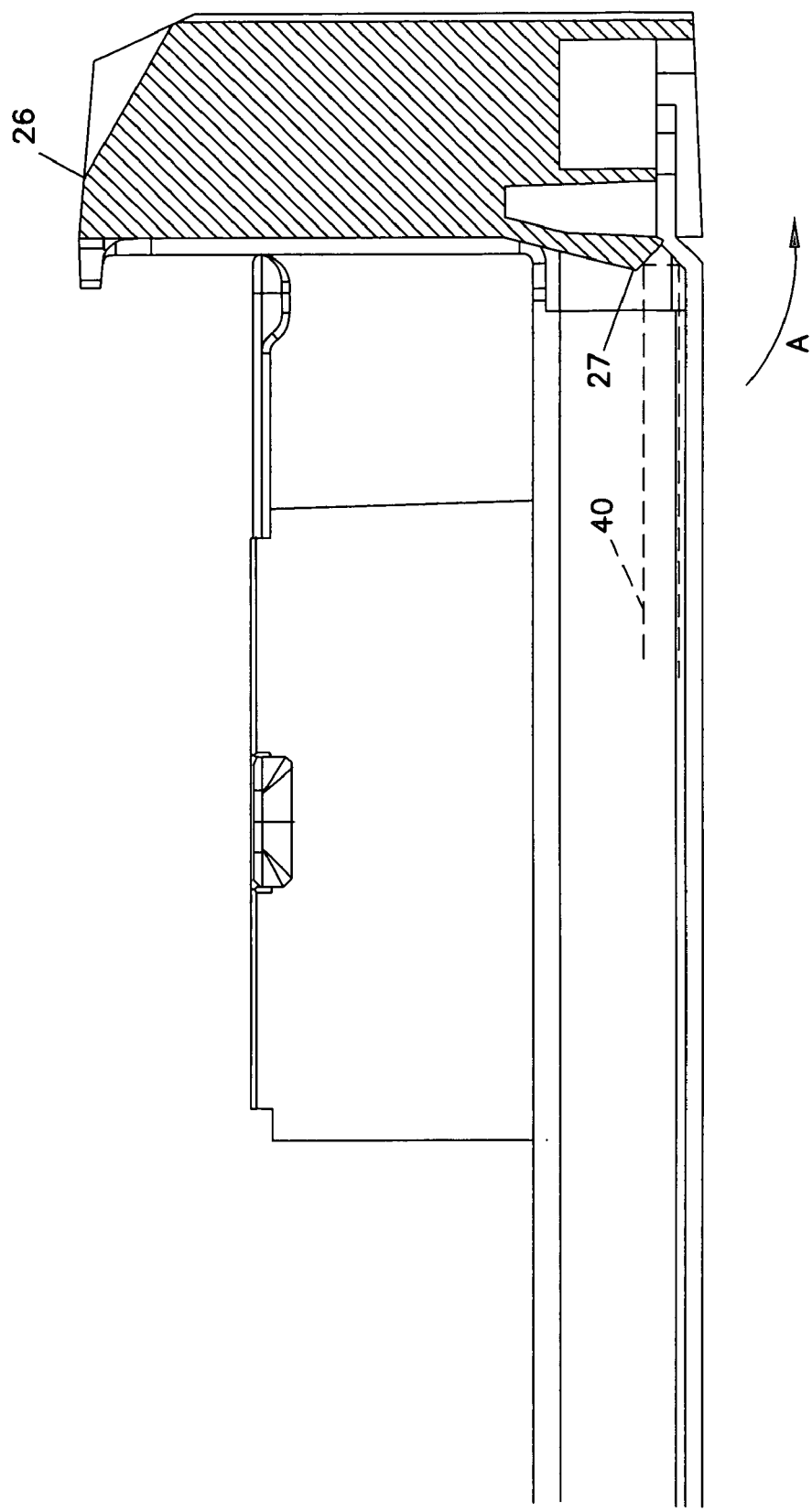

FIG. 56 is a cross-sectional view of the latch of FIG. 55.

DETAILED DESCRIPTION OF THE PREFERRED EMBODIMENTS

Referring now to the several drawing figures in which identical elements are numbered identically, a cable management panel or module 10 according to the present invention is shown. Panel 10 includes a frame or chassis 12 with side brackets 14 for mounting to a rack, cabinet, enclosure, or other mounting fixture. Chassis 12 includes a front 16, opposed sides 18, and a rear 20. Sides 18 each include cable access openings 22 for cables entering or exiting chassis 12. Chassis 12 further includes one or more drawers 26 which slide horizontally during use to access the interior of a selected drawer.

Each drawer 26 includes cable management structure, as will be described more fully below. Examples of cable management structure include devices for storing the cables or connecting the cables to other cables and/or fiber optic devices, such as attenuators, couplers, switches, wave divisions multiplexers (WDMs), splitters/combiners, or splices. Drawers 26 are slideable relative to chassis 12 via two drawer slides 28 on opposite sides of chassis 12. Each drawer 26 includes two latches 30 for latching the drawer 26 in the closed position. Each latch 30 engages a side hole 32 in side 18 of chassis 12. Each drawer 26 further includes a front 32, a rear 34, and a base 36. Open sides 37 allow for cable entry and exit and prevent cable damage during sliding movement of drawers 26 when accessing the cables and the connectors or other devices in the drawer. Take-up mechanisms are provided, as described below, for managing the cables during sliding movement of drawers 26. The cable guides and radius limiters described below are provided so as to protect the cables and limit bends from going below the minimum bend radius of the cable. The cable retention tabs also described below help keep the cables in place once positioned under the tabs by the user.

Figure 6:
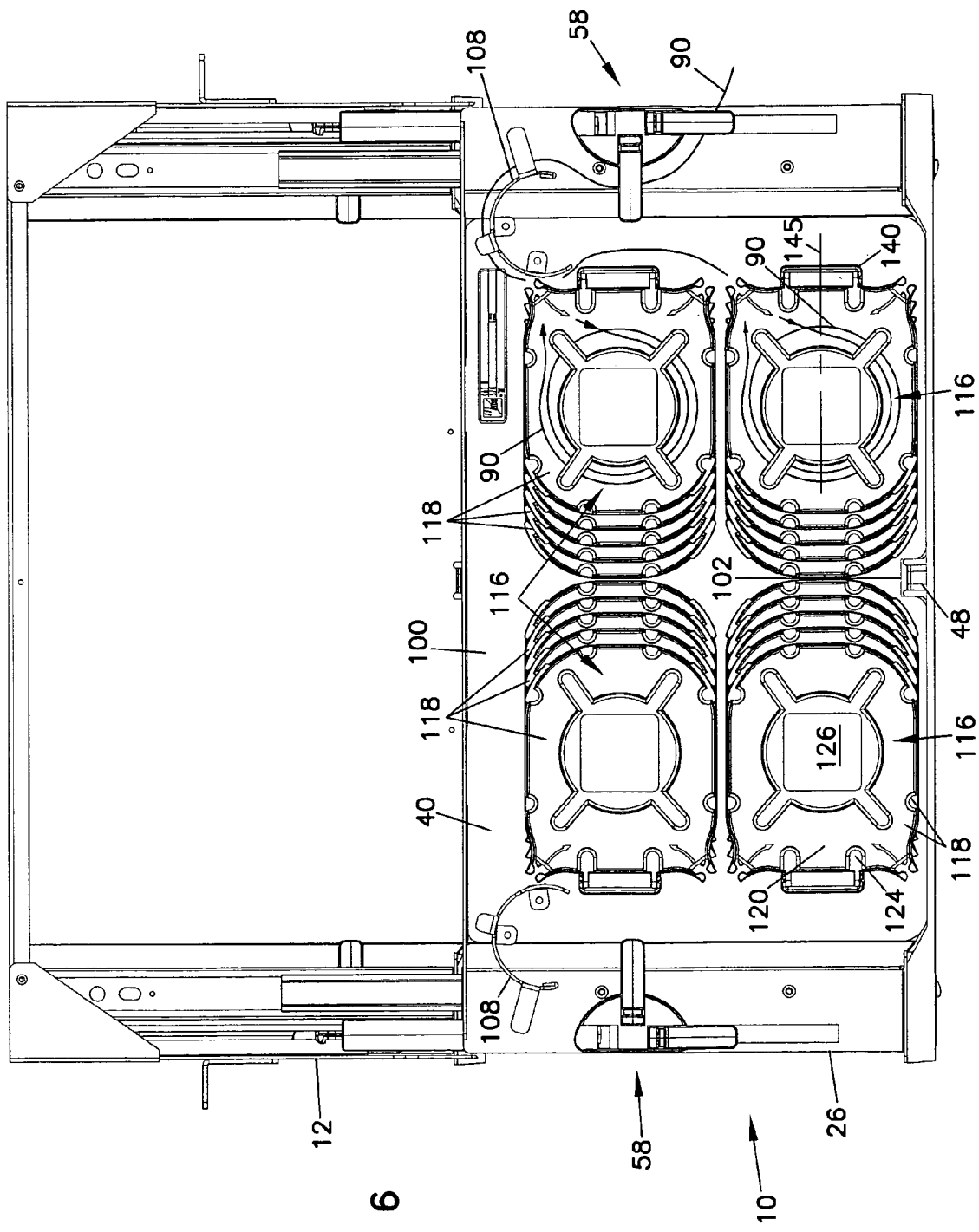
FIG. 6 is a top view of the cable management panel of FIG. 2 with a first tray insert positioned in the drawer.
Figure 7:
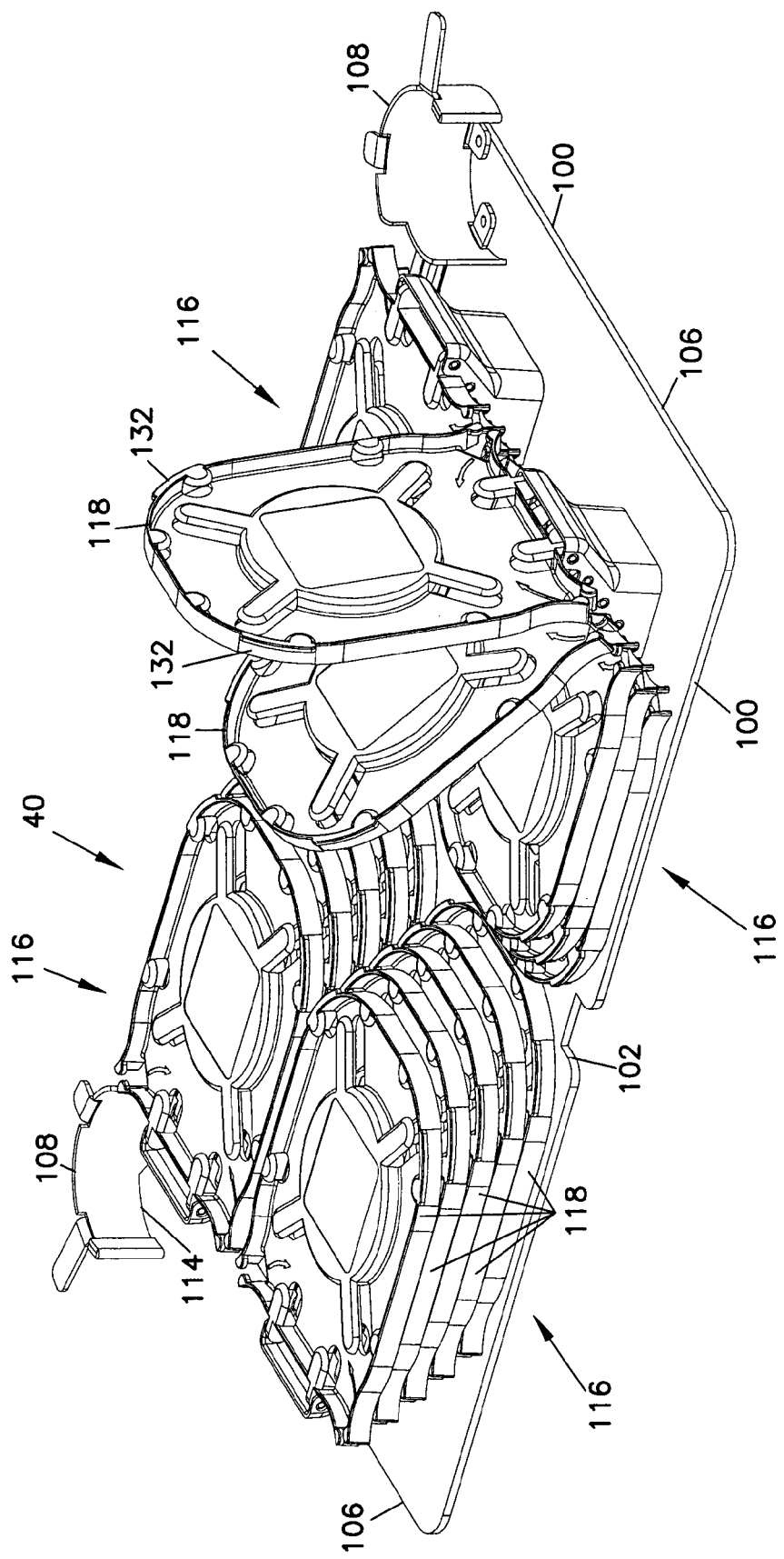
FIG. 7 is a perspective view of the tray insert of FIG. 6, with two of the storage trays in flipped positions.
Figure 8:
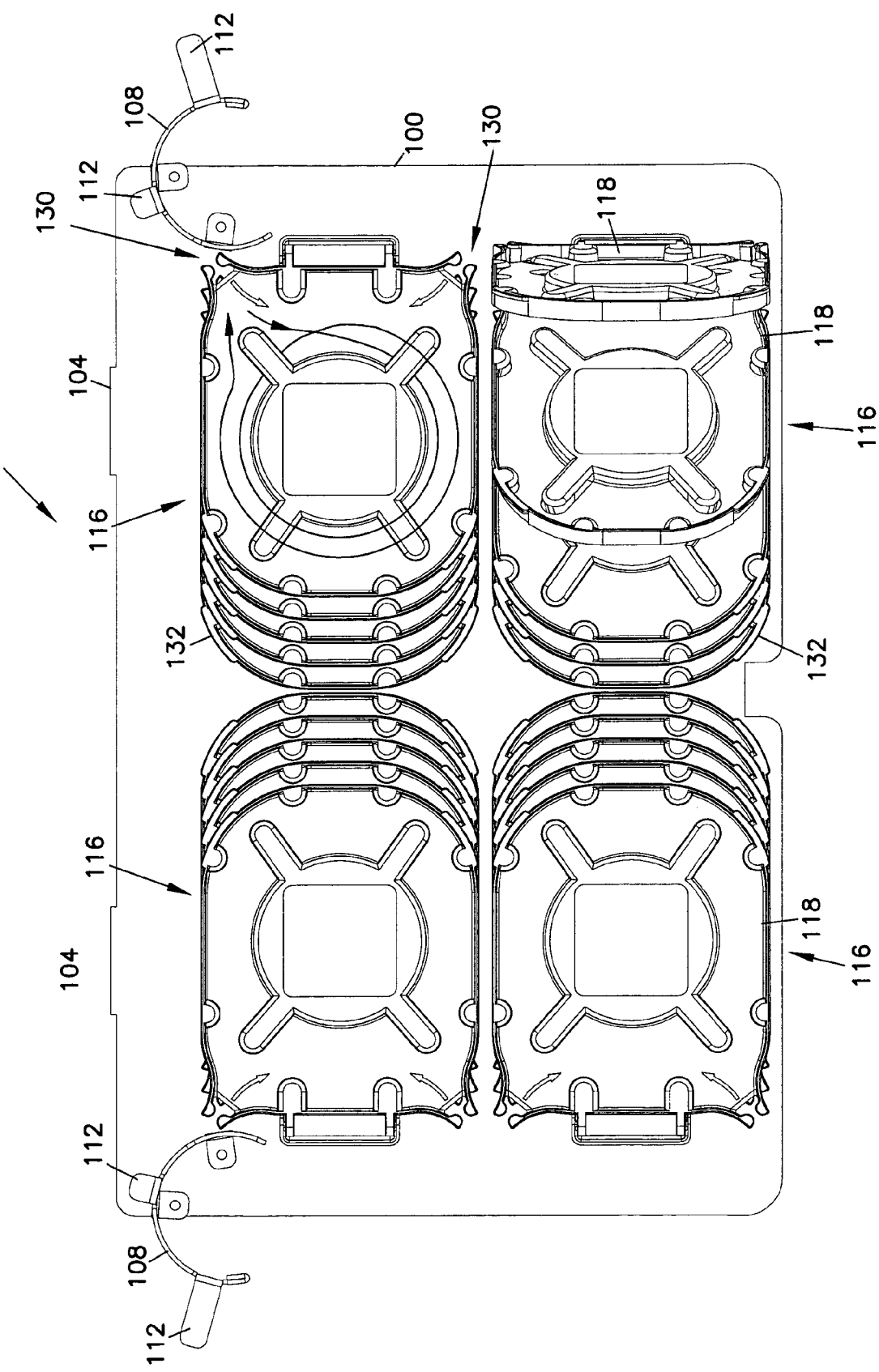
FIG. 8 is a top view of the tray insert of FIG. 7.

Each drawer interior is sized for receiving cable management and/or distribution structure. When the drawer is in the closed position, the cables and management or distribution structures in the interior are protected. In the preferred embodiments, the structure can be conveniently mounted on a tray insert which drops into the interior of drawer 26. This allows for convenient structuring of drawer 26 to serve one or more desired functions in module 10. FIG. 6 shows one preferred embodiment of a tray insert or drop-in plate 40 in accordance with the present invention. The tray inserts can be customized as the particular needs vary for panel 10. Alternatively, each drawer 26 can be assembled with the components mounted directly to the drawer bottom. Preferably, the individual drawers 26 are constructed as stackable and linkable sub-modules 10a, each with a sub-chassis 12a. Such modularity also allows for ease of use for a variety of different needs for the cable management system. Brackets 14 link the sub-chassis 12a together. FIG. 6 also shows one example cable pathway 90 into panel 10.

Referring again to FIGS. 1–5, base 36 of drawer 26 includes side plates 42, a central bottom 44, and an angled transition section 46 on each side of bottom 44 connecting to side plates. Base 36 further includes a key 48 adjacent to front 32. One or more slots 50 are positioned in rear 34. Key 48 and slots 50 are usable in mounting tray inserts 40 to drawer 26. Fasteners (screws) in holes 49 may also be used to secure tray inserts 40 to drawers 26. Alternatively, one or more latches 27 can be used to releasably mount each tray insert 40 to drawer 26, as shown in FIGS. 55 and 56. Each latch 27 is manually moveable to allow release of tray insert 40, by moving latch 27 in the direction of arrow A. To mount tray insert 40 to drawer 26, tray insert 40 automatically moves latch 27 in the direction of arrow A, thereby permitting convenient assembly.

Side plates 42 of base 36 of drawers 26 include longitudinal slots 52. Side plates 42 also mount to one end of each of slides 28 with fasteners through holes 43. Inwardly projecting side ledges 51 of chassis 12 each include longitudinal slots 53 and side notches 54, 56 which cooperate with a take-up mechanism 58 on each side of drawer 26 for managing optical fibers entering and exiting cable management panel 10. Side ledges 51 also mount to the opposite ends of drawer slides 28 with fasteners through holes 55. Side plates 42 are configured as raised surfaces or ledges which are positioned over drawer slides 28 and portions of take-up mechanism 58. Slots 52, 53 vertically overlap when drawer 26 is closed.

Take-up mechanism 58 includes a push member or radius limiter 62, preferably shaped as a half-moon or semi-circle, each with the curved portion 86 facing inwardly, and the planar portion 88 facing outwards. Radius limiter 62 includes a plurality of tabs 64 for cable retention. In one preferred embodiment, tabs 64 include snaps 66 which are received in slots 68 of radius limiter 62. Extending rearwardly and beneath radius limiter 62 is an extension 70 which includes a flexible rear tab 72, and a lower tab 73, both for receipt in slot 53. Tab 73 includes lips 75 to snap mount to slot 53. Extension 70 also snaps to an underside of radius limiter 62 with snaps 74 which are slideably positioned in slots 52. Radius limiter 62 is therefore moveably mounted relative to chassis 12 and drawer 26. Radius limiter 62 acts as a guide for cables passing through access opening 22 on each side of drawer 26.

Retention structure is provided with take-up mechanism 58 to limit movement of radius limiter 62 to selected times for better control and positioning of the cables. As will be described below, projection 72a of tab 72 resides in notch 56 to allow drawer 26 to slide rearwardly relative to radius limiter 62, during closing. Slot 52 eventually bottoms out and moves projection 72a out of notch 56, thereby causing radius limiter 62 to move rearwardly with drawer 26. Notch 54 also retains radius limiter 62 relative to chassis 12 during initial opening of drawer 26. Each notch 54, 56 includes a ramped surface 54a, 56a allowing release of radius limiter 62 as drawer 26 pulls or pushes on projection 72a during use.

Referring now to FIGS. 6–14, tray insert 40 includes a base 100 including a front notch 102, and rear projections 104. Front notch 102 receives key 48, and projections 104 are received by slots 50 in drawer 26. Side edges 106 are positioned adjacent transition sections 46 of base 36 of drawer 26. Base 100 also includes two upwardly extending rear radius limiters 108. Each radius limiter 108 includes a main arcuate section 110, a plurality of outwardly extending retention tabs 112, and a lower notch 114 which is positioned over transition section 46 and side plate 42 of base 36 of drawer 26. Cables entering drawer 26 extend from side access opening 22, to take-up mechanism 58 to rear radius limiter 108. FIG. 6 shows take-up mechanism 58 cooperating with radius limiter 108 for guiding cable 90 into drawer 26.

Figure 9:
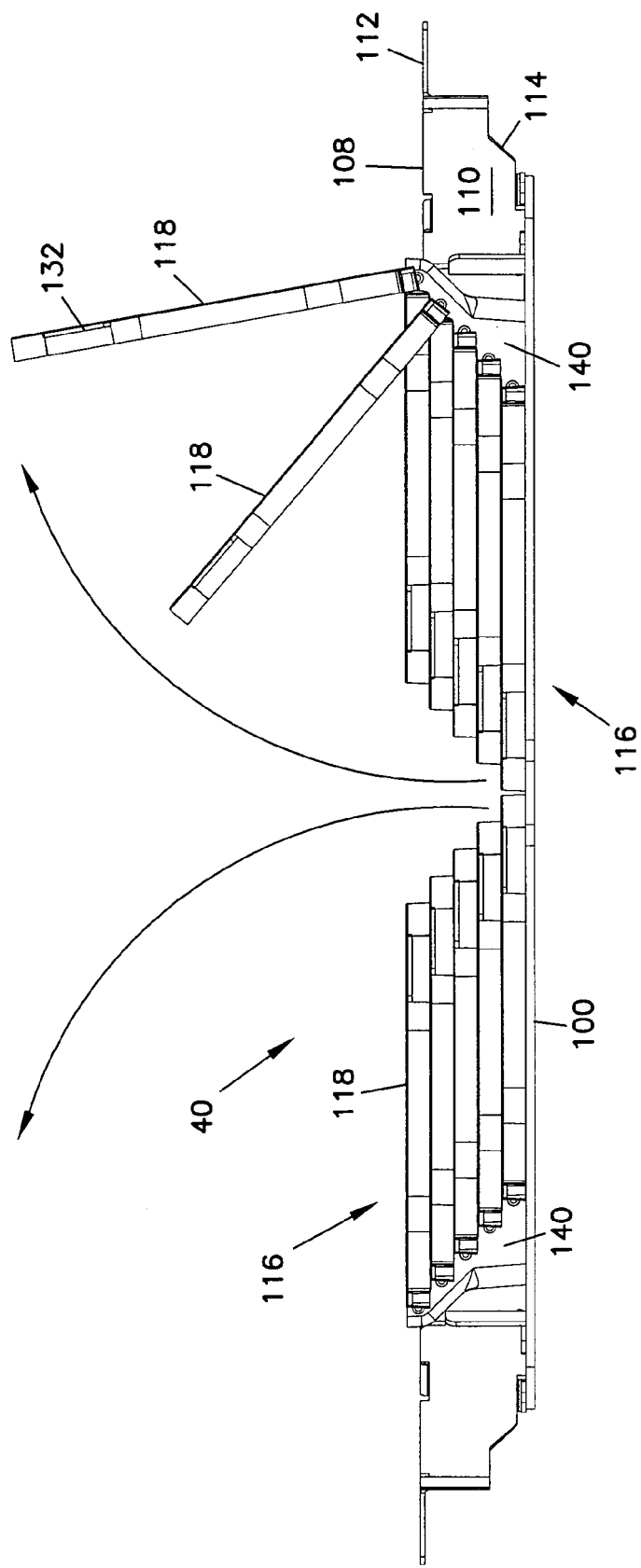
FIG. 9 is a front view of the tray insert of FIG. 7.
Figure 10:
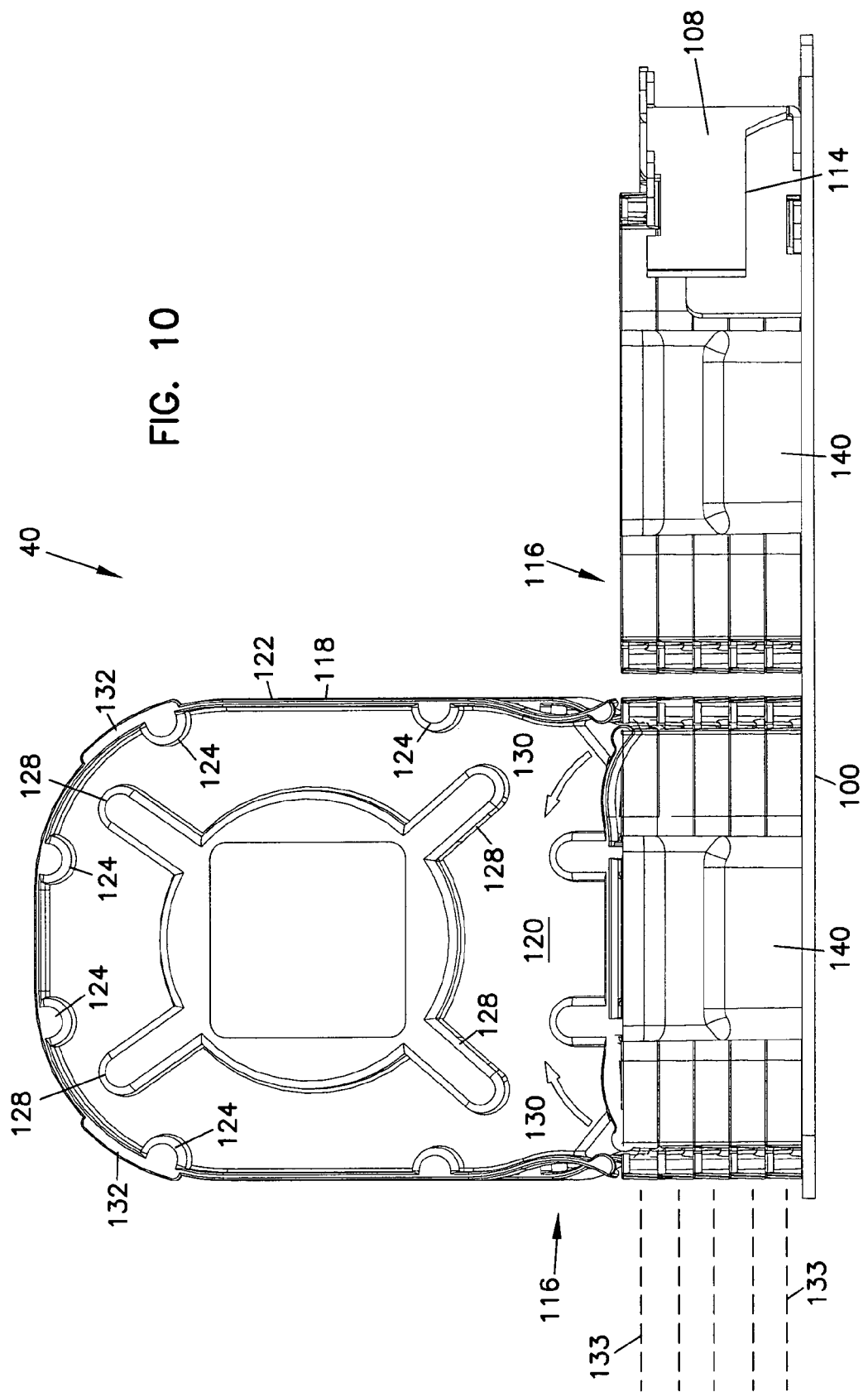
FIG. 10 is a side view of the tray insert of FIG. 7.
Figure 11:
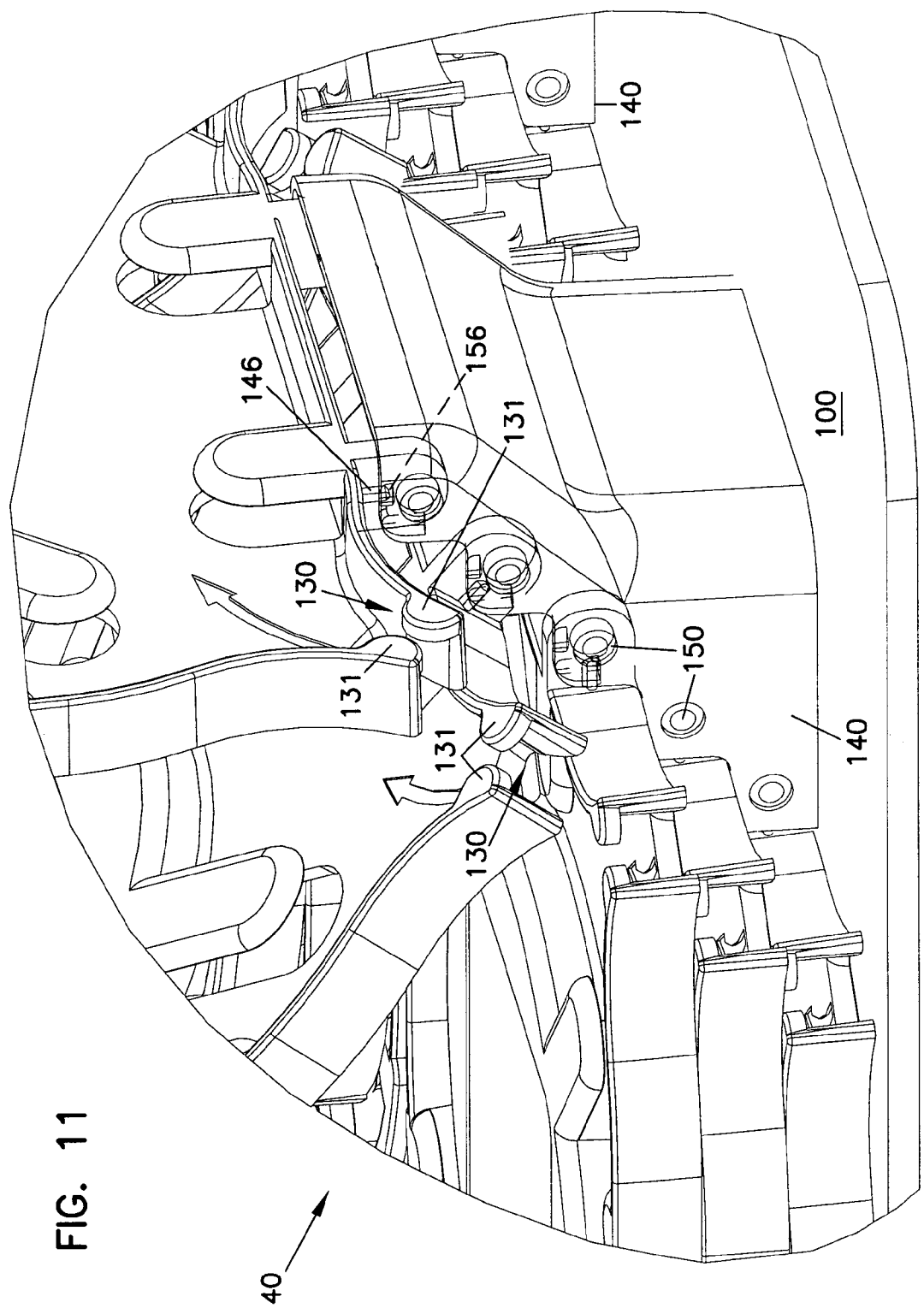
FIG. 11 is an enlarged perspective view of one of the stacks of storage trays.
Figure 12:
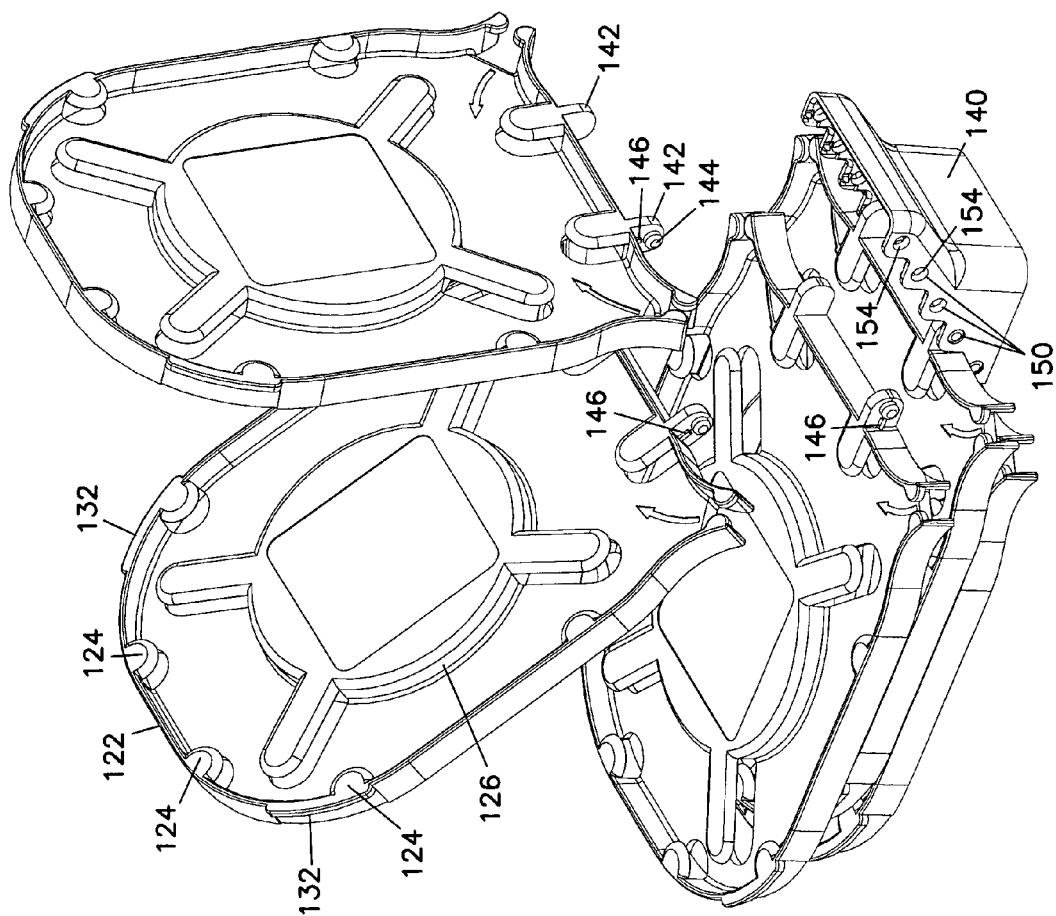
FIG. 12 is an exploded view of one of the stacks of storage trays with some of the trays removed for viewing.
Figure 13:
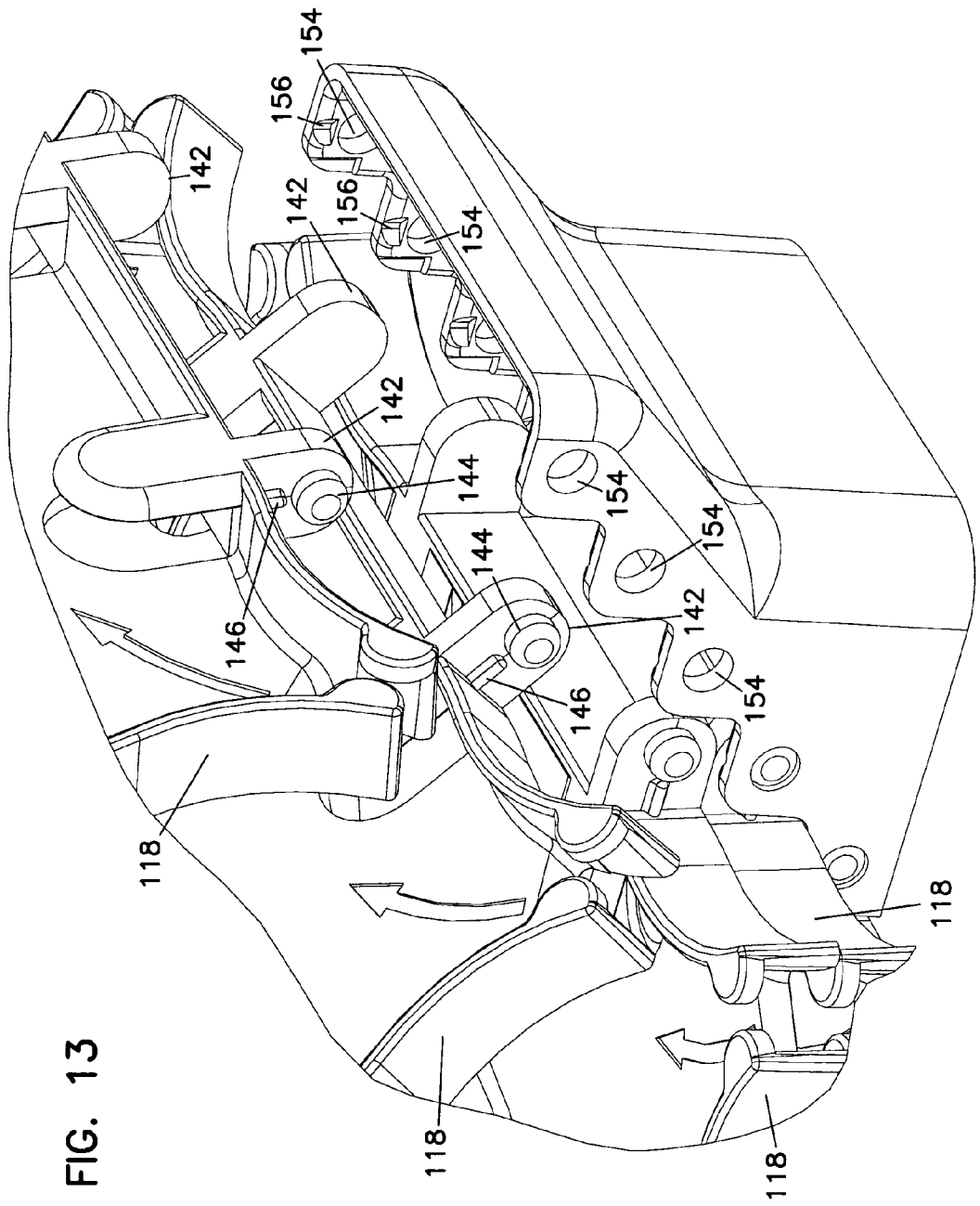
FIG. 13 is an enlarged exploded view of the storage trays of FIG. 12.

Base 100 of example tray insert 40 further includes one or more stacks 116 of rotatably mounted or flippable storage trays 118. Four stacks 116 are shown for insert 40. The trays 118 on the right and left sides flip in opposite directions as shown in FIG. 9. By flipping the trays 118, access to the underneath trays in each stack is provided.

Each tray 118 includes a planar base 120, surrounded by an outer peripheral edge 122. Inwardly extending tabs 124 are provided for cable management. A center spool 126 extends upwardly from base 118, and includes a plurality of cable retention tabs 128. Tray 118 further includes two entry/exit points 130. Cable retention tabs 131 are positioned at each entry/exit point 130. Finger tabs 132 can be grasped by a user's finger to rotate each tray 118 about its rotation axis 133. Each tray 118 in stack 116 is rotatably mounted to base 100 with a stepped tray mount 140. Tray 118 includes two projections 142, each having an outwardly projecting pivot post or pin 144 and an outwardly projecting retention tab or bump 146. Tray mount 140 includes opposed and staggered mounting plates or locations 150 each having holes 154 for receiving pins 144 of trays 118. The staggering, or stair-step, allows for identical trays to be flipped from a horizontal position upwardly so as to allow user access to each tray.

A detent arrangement is provided for holding the trays in the flipped positions. Mounting plates 150 each include a notch or groove 156 sized for receiving tab 146 of each projection 142 to maintain each tray in an upward pivoted position when placed there by the user. The trays 118 stay pivoted upwardly to allow easy and hands-free access to the tray underneath the flipped trays. Notches 156 and tabs 146 act parallel to the rotation axis of each tray 118. Preferably, trays 118 and tray mount 140 are made from plastic. Pins 144 preferably snap into holes 154 to mount trays 118 to tray mount 140. Cable enters tray 118 at one of points 130, and is wound around spool 126 an appropriate number of times. The cable then exits tray 118 at one of the points 130. In the example shown, one cable 90 is stored per tray 118 (See FIGS. 6 and 8).

Figure 14B:
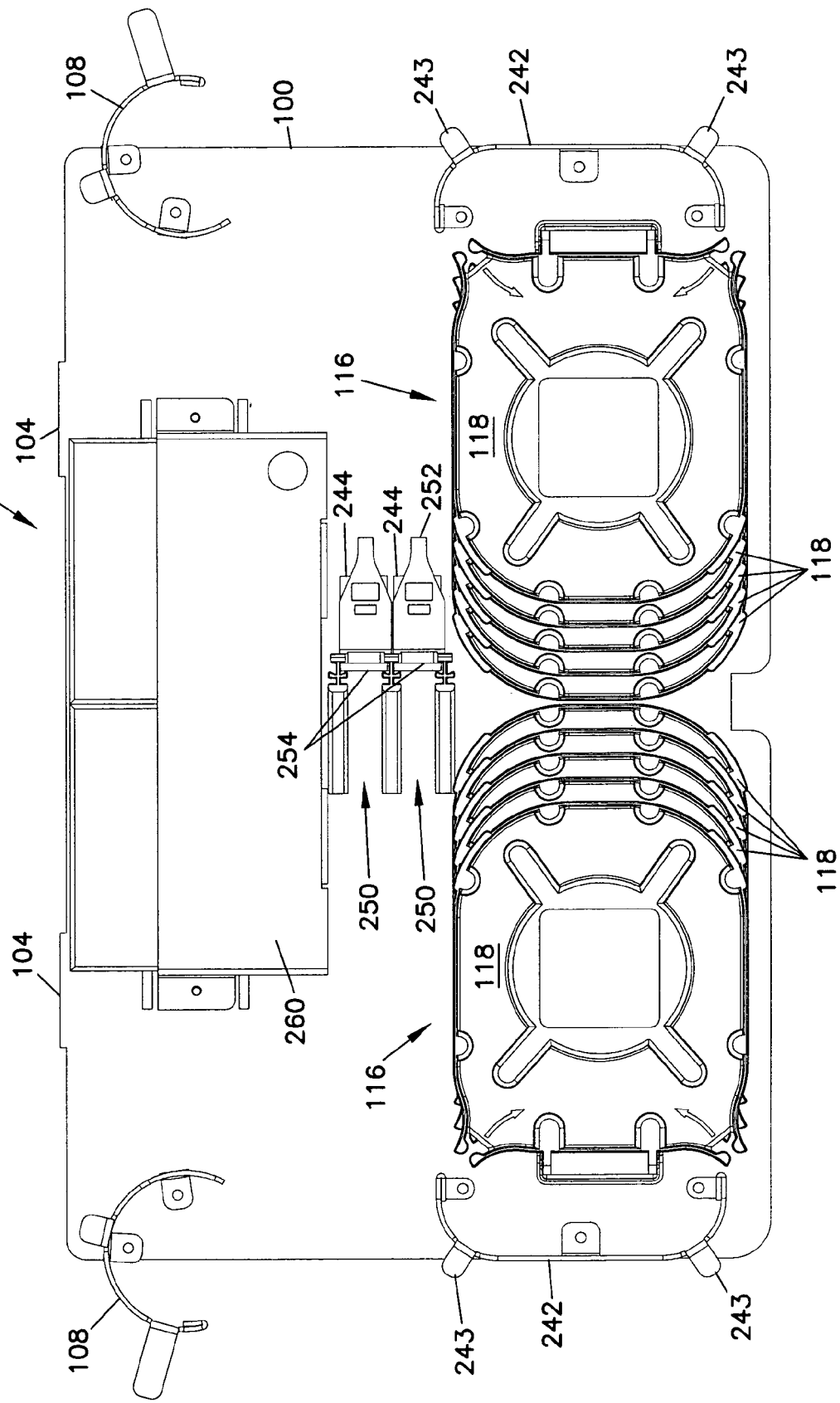
FIGS. 14A and B show a second embodiment of a tray insert usable in the cable management panel of FIG. 1.

Referring now to FIGS. 14A and B, a second preferred embodiment of a tray insert 240 is shown including some common parts as insert 40, and some different parts. Insert 240 includes a similar planar base 100 with front notch 102 and rear projections 104. Base 100 of tray insert 240 also includes rear radius limiters 108. Base 100 is similar in profile, but may have different structure, for example, holes, for mounting the various cable management devices to tray insert 240. Tray insert 240 also includes two front stacks 116 of trays 118. Insert 240 differs in that it also includes side radius limiters 242 and retention tabs 243 positioned on opposite sides of base 100 adjacent to stacks 116 of trays 118. Base 100 further includes adapters 244 for connection to fiber optic connectors. Adapters 244 are preferably movably mounted to base 100 in sliding adapter arrangement 250. Lever arm 252 allows a slide assembly 254 to be lifted upwardly to provide easier access to adapters 244. Each pair of adapters 244 is separately movable with each respective lever 252. Further details of an example of a sliding adapter arrangement like that shown is described in U.S. Pat. No. 5,497,444, the disclosure of which is hereby incorporated by reference. Other adapter arrangements are possible, including arrangements which do not include movable adapters. Tray insert 240 also includes a wave division multiplexer arrangement with wave division multiplexers (WDMs) 260 connectable to the cables in drawer 26. Cables enter tray insert 240 for connection to adapters 244, and further connection to WDMs 260. Excess cable lengths can be stored in trays 118 and/or wound past limiters 242.

Figure 15A:
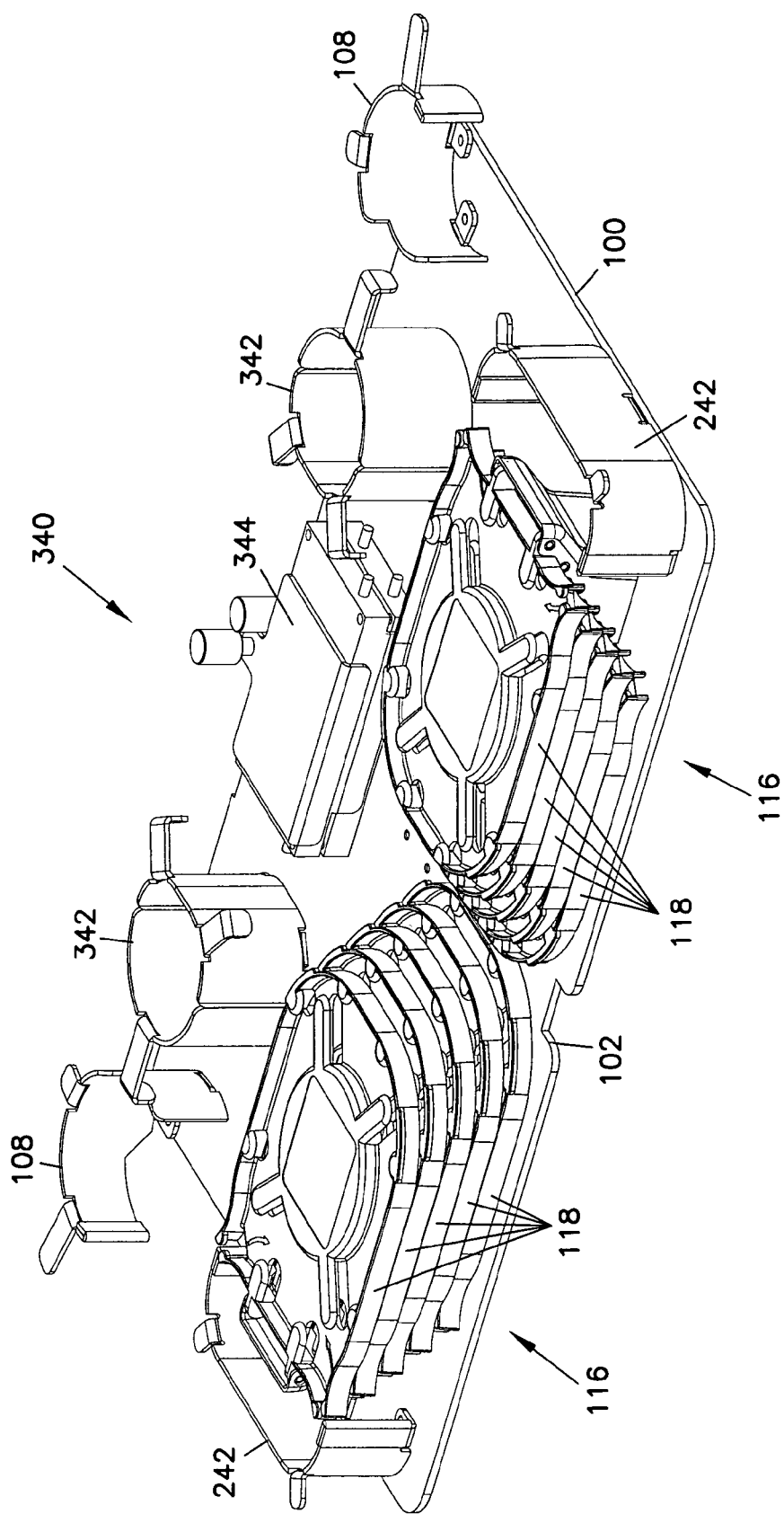
FIGS. 15A and B show a third embodiment of a tray insert usable in the cable management panel of FIG. 1.
Figure 15B:
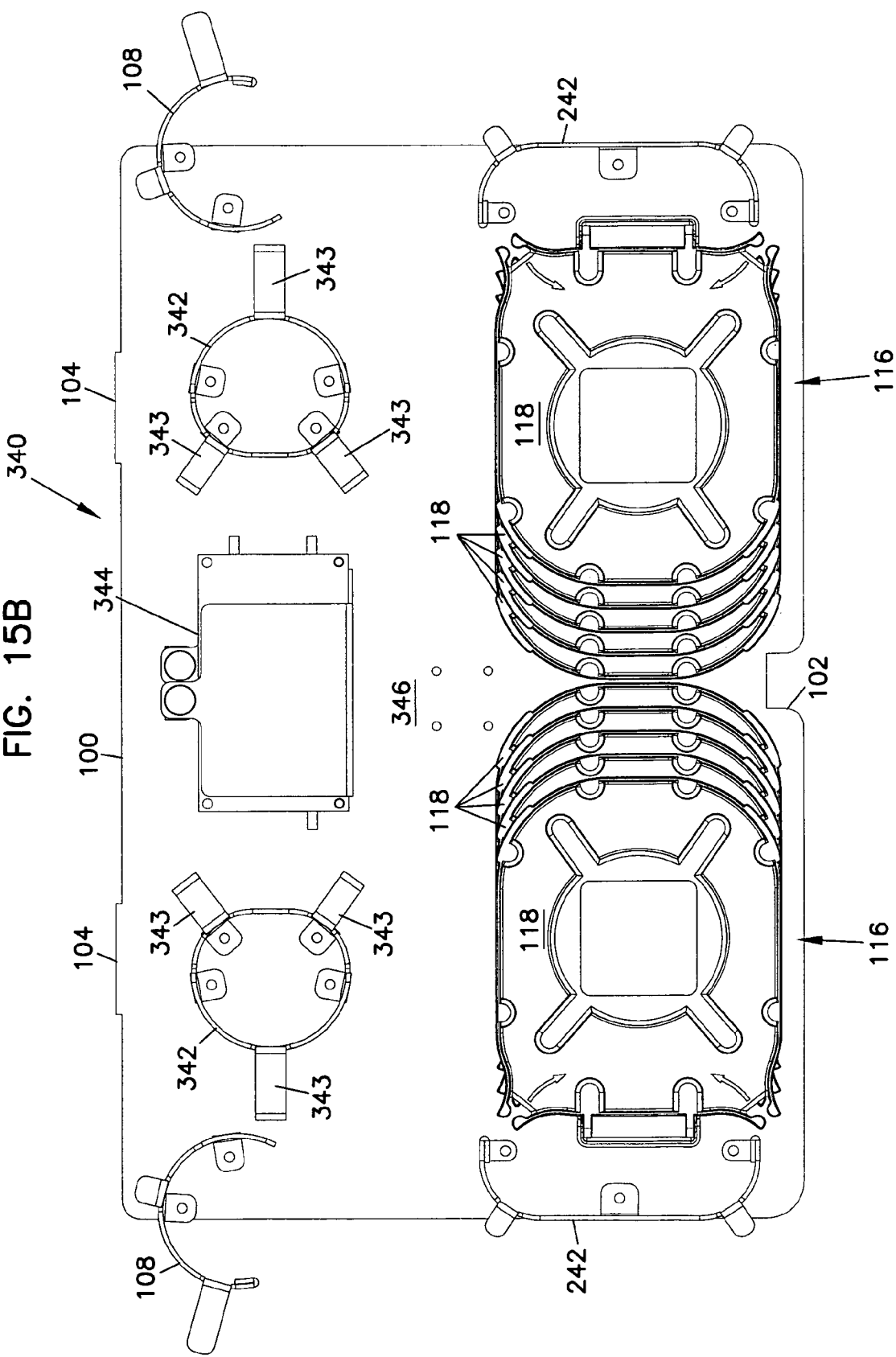

Referring now to FIGS. 15A and B, a third preferred embodiment of a tray insert 340 is shown including rear radius limiting spools 342 with tabs 343 and an optical service channel device (OSC) 344. Sliding adapter assemblies like assemblies 250 can be provided on base 100 at region 346. Cables enter tray insert 340 for connection to OSC 344, and adapters (if provided). Excess cable is stored in trays 118. Cable passes by spools 342 or limiters 242 to take up the excess and to prevent excessive bending or stress on the fibers.

Figure 16A:
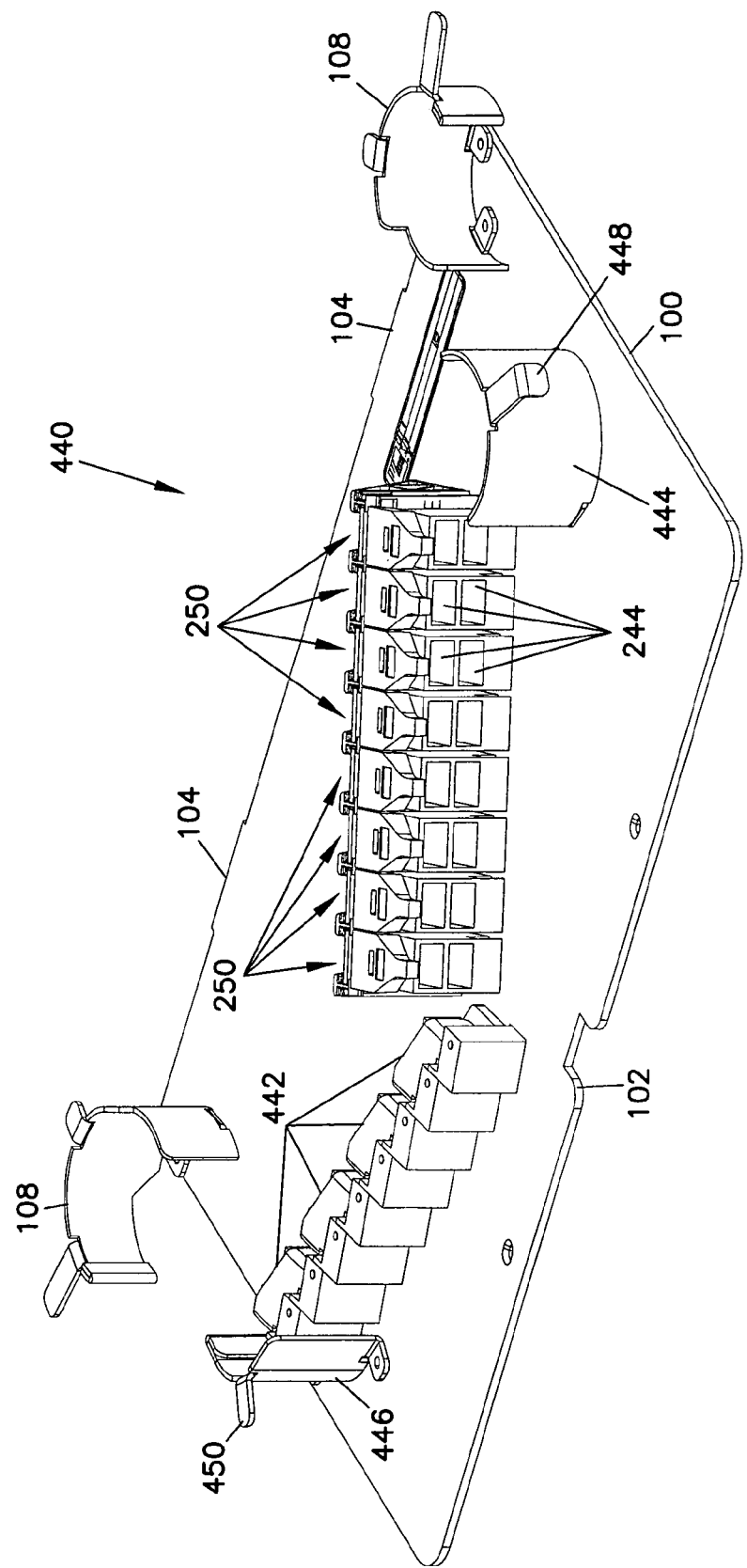
FIGS. 16A and B show a fourth embodiment of a tray insert usable in the cable management panel of FIG. 1.

Referring now to FIGS. 16A and B, a fourth preferred embodiment of a tray insert 440 is shown. A plurality of sliding adapter arrangements 250 are shown on one portion of base 100. Attenuators 442 are shown on a second portion of base 100. Fibers enter and exit tray insert 440 and are connected through adapters 244 and attenuators 442. Radius limiters 444, 446 with tabs 448, 450 are provided for assisting management of the cables.

Figure 17A:
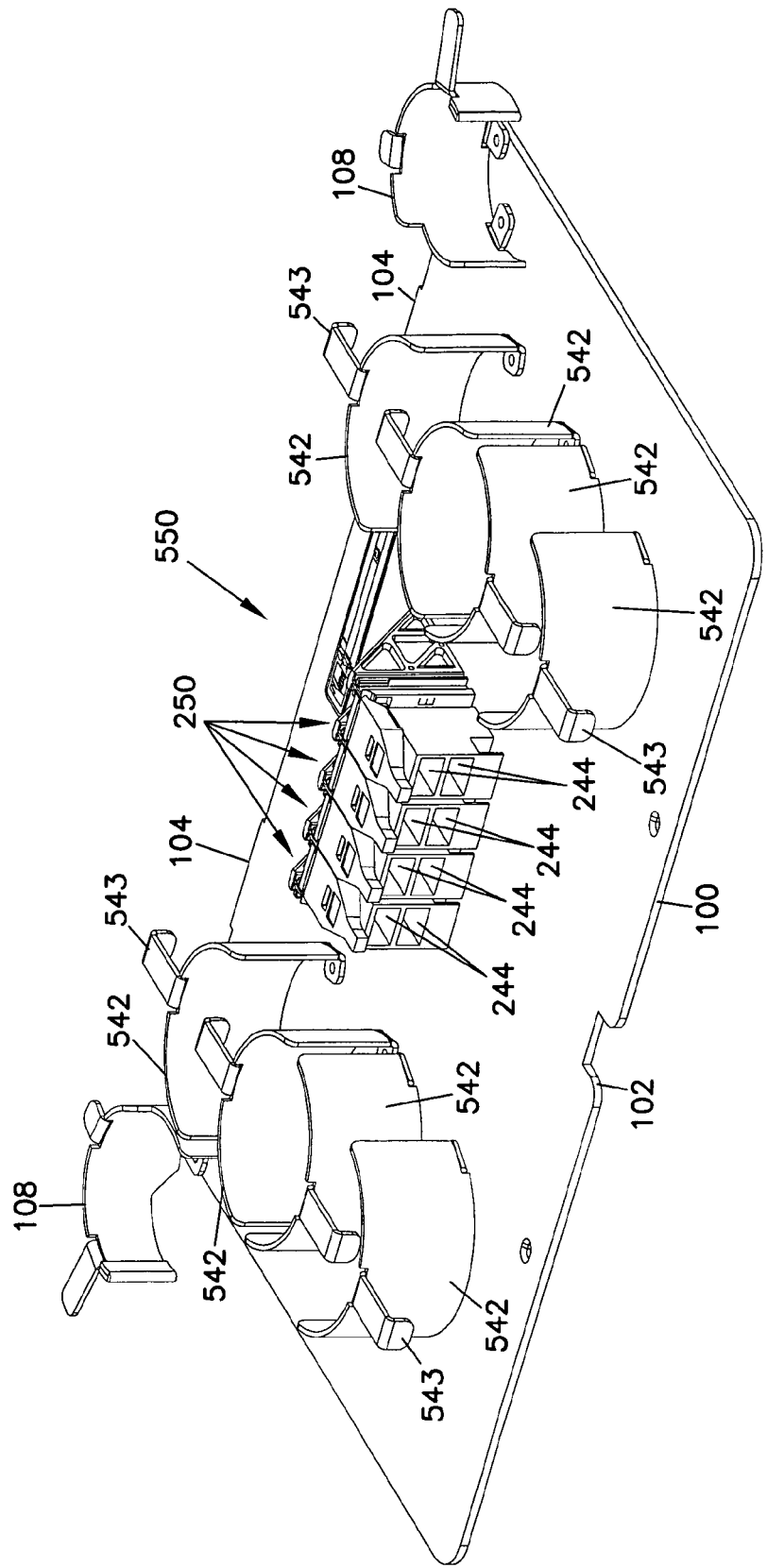
FIGS. 17A and B show a fifth embodiment of a tray insert usable in the cable management panel of FIG. 1.

Referring now to FIGS. 17A and B, a fifth preferred embodiment of a tray insert 550 is shown. Sliding adapter arrangements 250 are positioned in a central portion of base 100, and a plurality of radius limiters 542 with tabs 543 are positioned to provide variable and selectable pathways for storage of the cables on insert 550. Adapters 244 can each be provided with a built-in attenuator.

Figure 1:
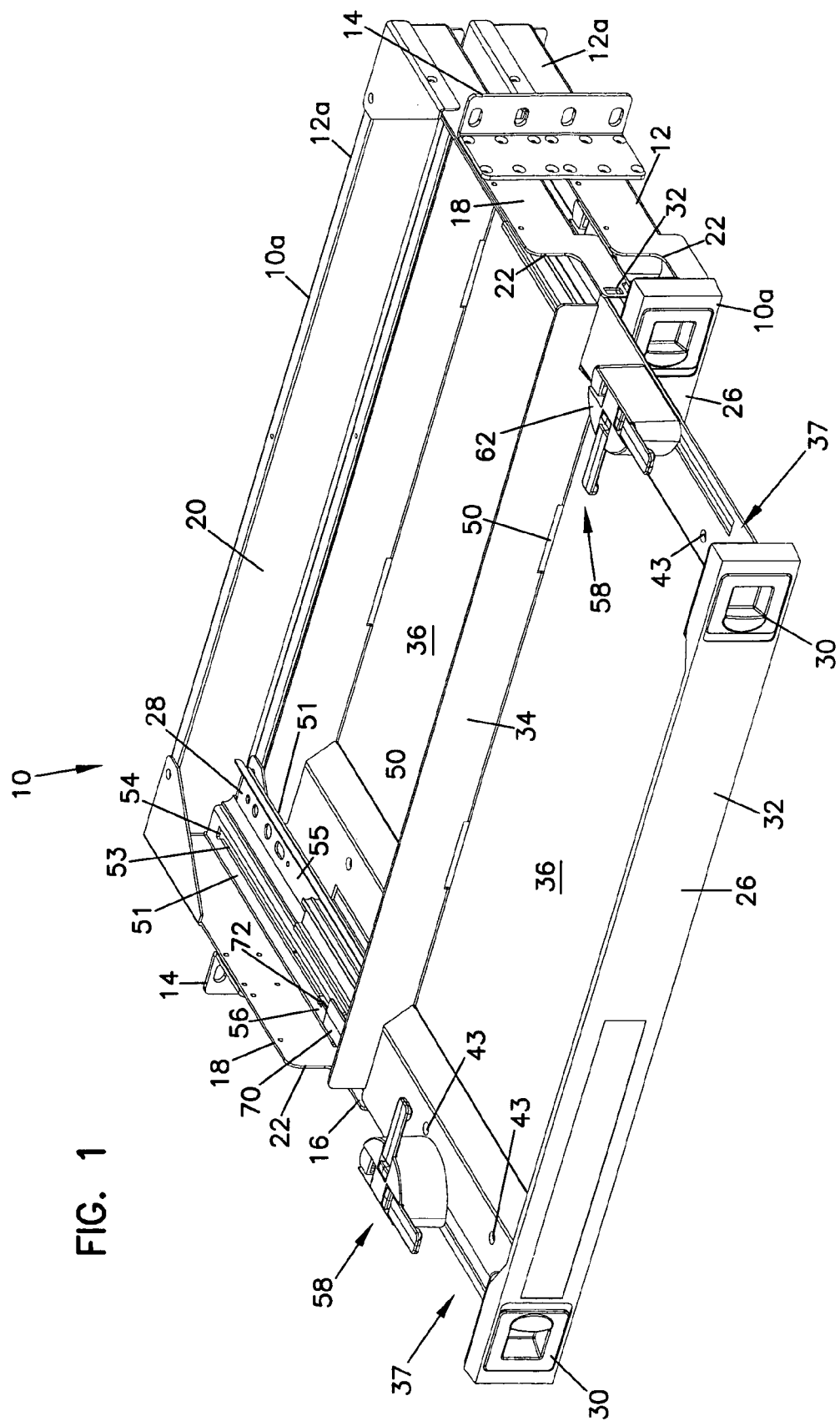
FIG. 1 is a perspective view of a cable management panel or module in accordance with the present invention, shown with one of the drawers in the open position, and shown without the tray insert.
Figure 2:
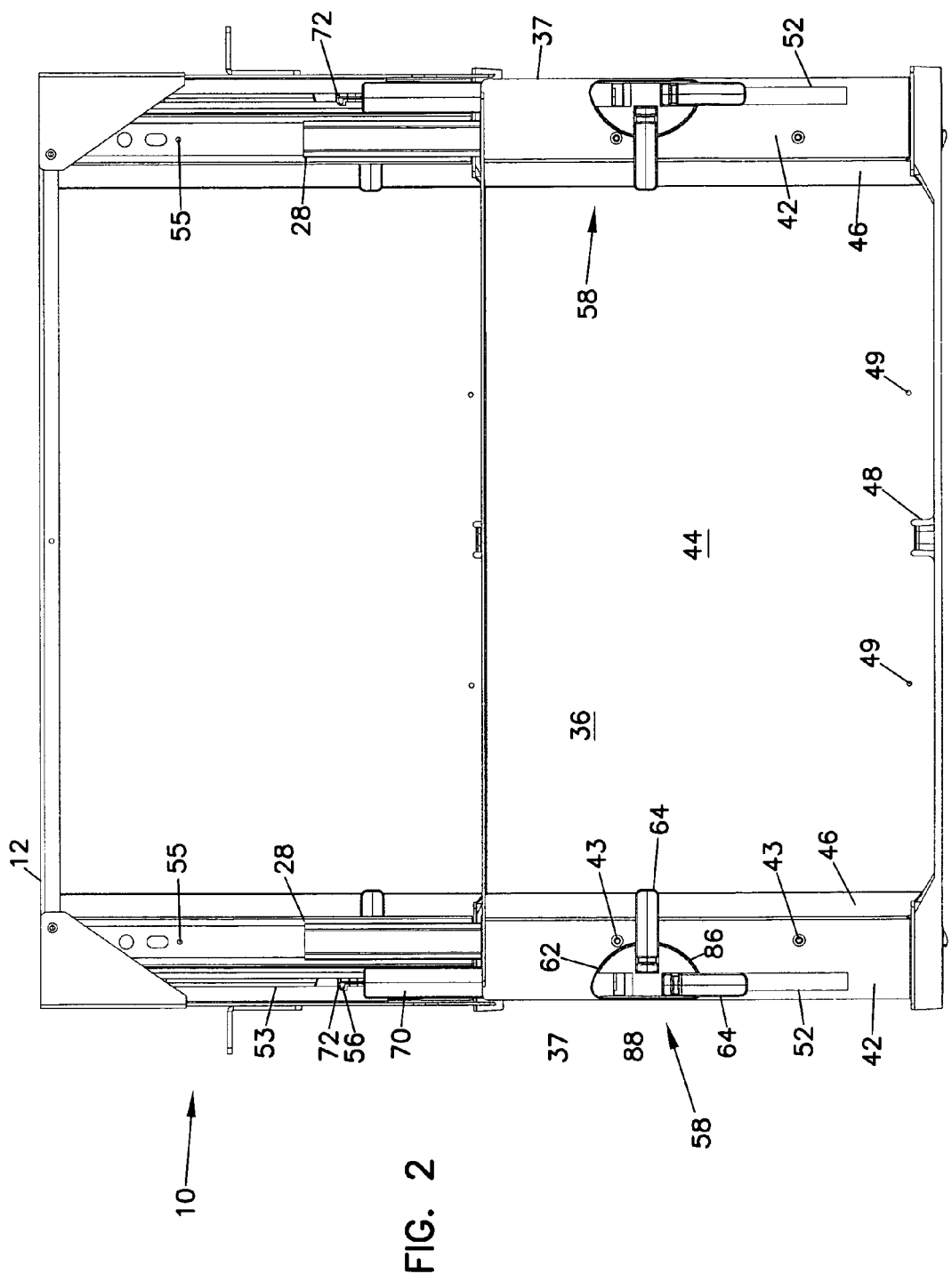
FIG. 2 is a top view of the cable management panel of FIG. 1.
Figure 3:
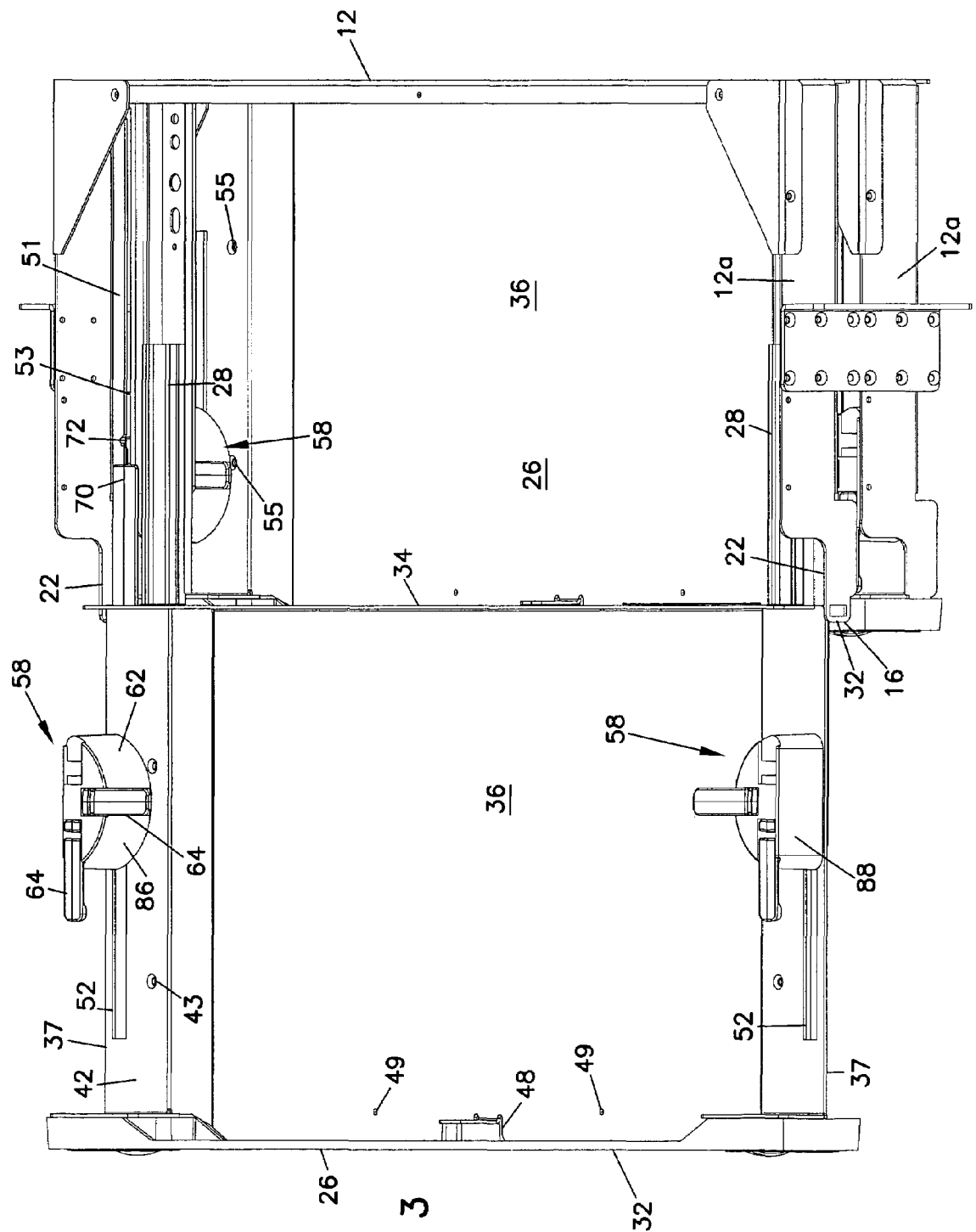
FIG. 3 is a side perspective view of the cable management panel of FIG. 1.
Figure 3B:
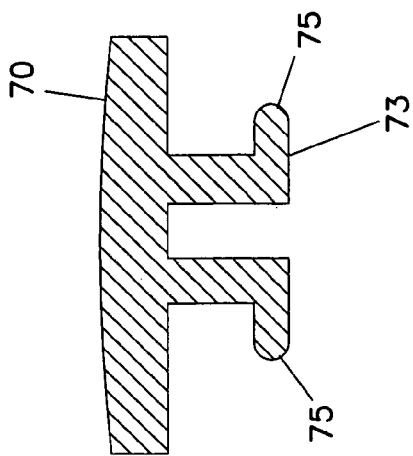
FIG. 3B is a further cross-sectional view of a portion of the take-up mechanism along lines 3B—3B of FIG. 3A.
Figure 3A:
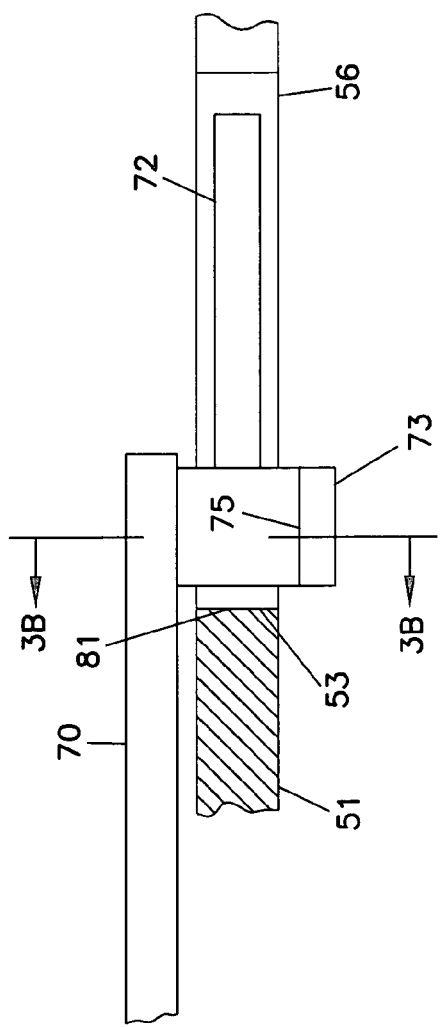
FIG. 3A is a cross-sectional side view through a portion of the chassis showing the retention system of the take-up mechanism.

FIGS. 18A–E and 19A–D illustrate in combination with FIG. 2 the positioning of take-up mechanism 58 during use to prevent undue stress, pulling or pushing on the cables (optical fibers) entering and exiting module 10 through side access openings 22. Radius limiter 62 and tab 72 are held in place relative to chassis 12 by rear notch 54 until drawer 26 has moved forward a sufficient amount, such as when a rear end 80 of slot 52 engages the connection between radius limiter 62 and extension 70 (compare FIGS. 18C and 18D). At that point, radius limiter 62 moves with drawer 26 toward the open position.

In the present example, drawer 26 and radius limiter 62 stop moving with respect to chassis 12 when lower tab 73 reaches a front end 81 of slot 53 and tab 72 is positioned in front notch 56. Alternatively, drawer slides 28 can limit the sliding extension of drawer 26. As shown in FIG. 2, drawer 26 is now in the completely open position.

Figure 4:
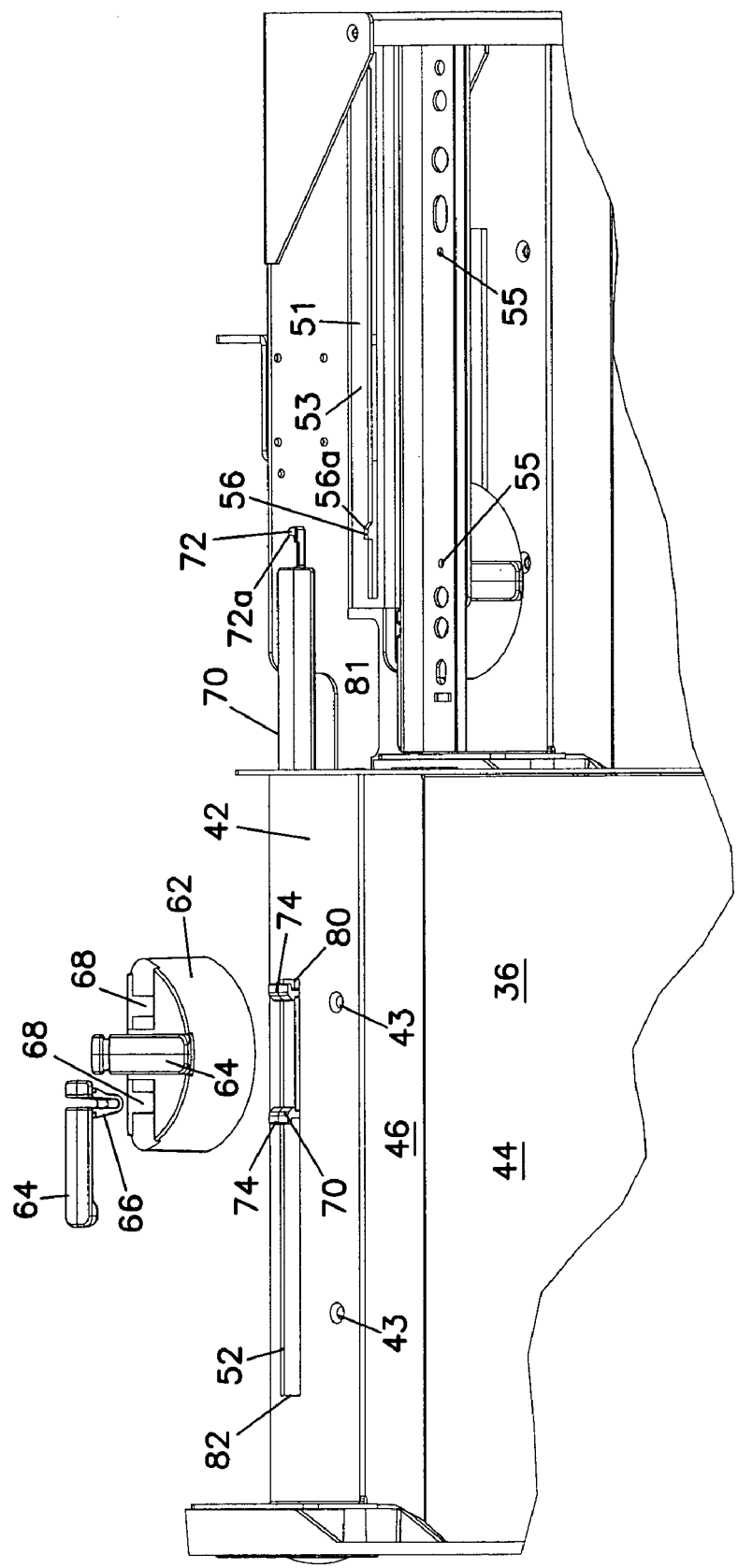
FIG. 4 is a partially exploded view of the left side of the cable management panel as shown in FIG. 3.
Figure 5:
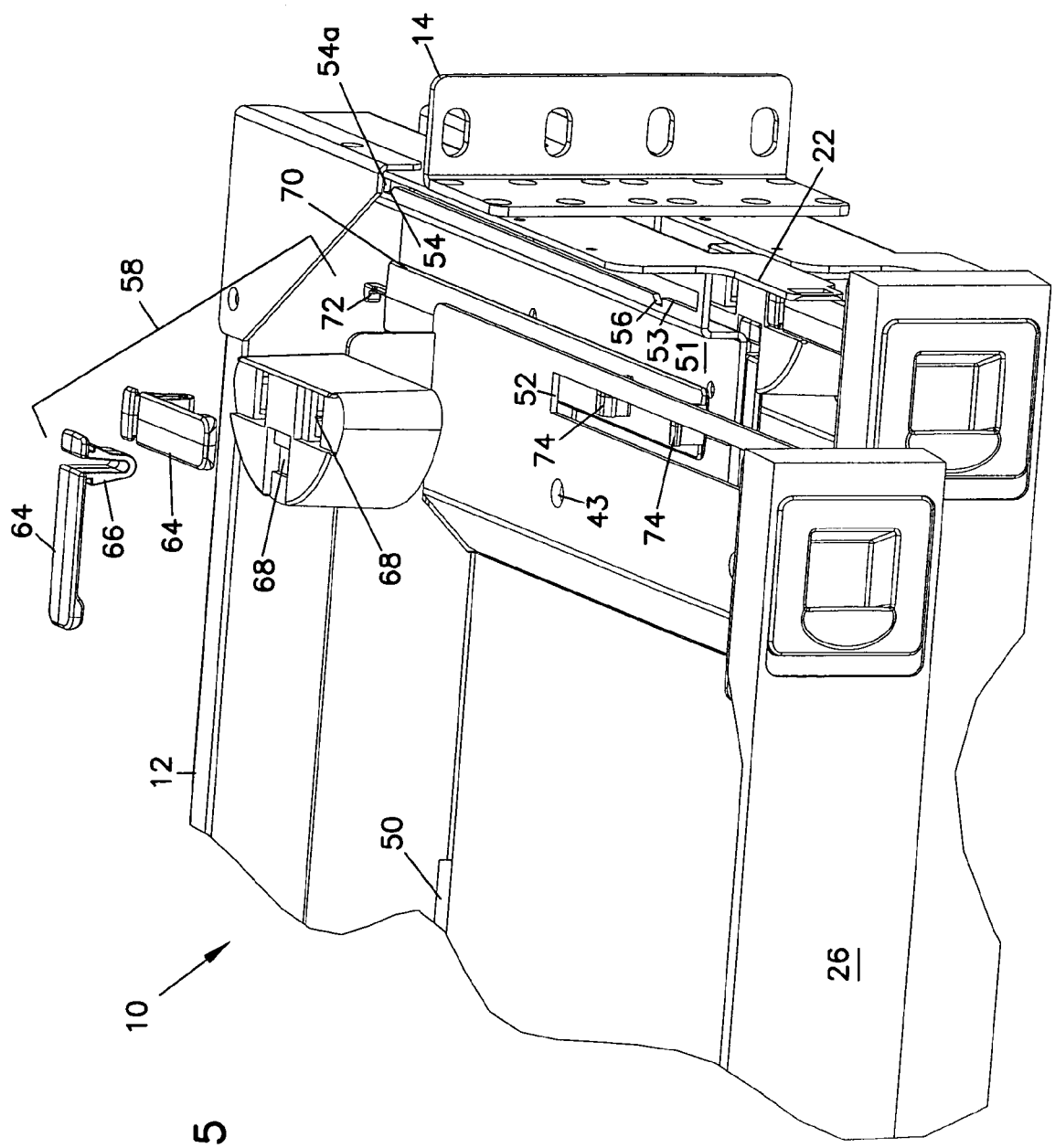
FIG. 5 is a partially exploded perspective view of the right side of the cable management panel of FIG. 1.

Referring now to FIGS. 19A–D, front notch 56 maintains radius limiter 62 in position relative to chassis 12 while drawer 26 begins rearward movement during closing of drawer 26. As shown in FIGS. 19B and 4, engagement of a front end 82 of slot 52 with the connection between radius limiter 62 and extension 70 causes rearward movement of radius limiter 62 with drawer 26 to the closed position shown in FIG. 18A.

In the example module 10, two take-up mechanisms 58 are provided, one for each side access opening 22. For ease of manufacturing, the same extension 70 and radius limiter 62 are used for each mechanism. Radius limiter 62 is flipped about a vertical axis when used to assemble the take-up mechanism on the opposite side of drawer 26. Tabs 64 are placed in the flipped radius limiter 62 to appropriately retain cables positioned around radius limiter 62. For a similar reason, trays 118 can be mounted on either side of drawer 26. Trays 118 are symmetrical about a center axis 145.

The configuration of the interior of drawer 26 can vary as the desired functions for panel 10 vary. The examples of FIGS. 6–17A and B are provided to show some of the variations possible.

FIGS. 20 and 21 show a modified panel 510 including a modified take-up mechanism 558. FIGS. 22–27 show further details of the modified take-up mechanism 558. Take-up mechanism 558 includes a push member or radius limiter 562 which functions in a similar manner as radius limiter 62 noted above. Radius limiter 562 includes a trough section 570 which cooperates with curved portion 586 of radius limiter 562 and tabs 564 to assist with cable retention during use. In a similar manner as for module 10, tabs 564 include snaps 566 which snap into slots 568. Radius limiter 562 mounts in a similar manner to drawer 512 and chassis 526 as noted above for take-up mechanism 58 including the push member 62 so as to assist with cable management for cables entering at opening 522 of chassis 526. A similar arrangement (not shown) is positioned on the left side of drawer 512.

Trough section 570 includes a base 572 and an outer wall 574. Outer wall 574 is curved in a similar manner as curved portion 586 of radius limiter 562. The curved shape directs cables from the side of module 510, toward a rear of drawer 512. Preferably, trough section 570 includes a trumpeted or flared end 576, along the U-shape to avoid exposing the cables to sharp edges which may cause damage to the cables if tension is applied to the cables and the cables are bent below the minimum bend radius. Push member 562 is configured for use on the right side of 512. A mirror image of push member 562 can be used on the left side of drawer 512.

Outer wall 574 includes upper notches 578 for ends 565 of tabs 564. Once tabs 564 are snapped with snaps 566 into slots 568, tabs 564 are retained with radius limiter 562. Tabs 564 form a cover over a portion of trough 570 to retain the cables. In the example embodiment of FIGS. 20–27, a cable area 580 has a generally closed perimeter at tabs 564, base 572 and outer wall 574 to define the cable retention area. While access openings can be provided for continuous cable access, the present embodiment is designed for selective access whereby tabs 564 can be partially lifted upwardly, as shown in FIGS. 21, 23, and 25. Tabs 564 are moved in a direction of arrow A for each tab 564 to release a portion of snap 566. Such movement allows for the pivoting upward movement of end 565 of tab 564, thereby allowing easy access for cable positioning within trough 570, or cable removal.

A modified radius limiter 662 is shown in FIG. 28. Instead of moveable tabs 564, radius limiter 662 includes fixed, opposed tabs 664, 665 which allow cables to be manually placed in cable area 680 by positioning the cables around the openings defined by opposed tabs 664, 665.

The embodiments above seek to control movement of the radius limiter through the detent and notch mechanisms. Referring now to FIGS. 29–41, a drawer 726 is slidably mounted to a chassis 712, in a similar manner as drawer 26 and chassis 12, described above. A base 736 of drawer 726 includes side plates 742, each including a slot 752. A take-up mechanism 758 includes a radius limiter 762, of the type described above. It is to be appreciated that radius limiter 762 could include the various cable management features of radius limiters 562, 662, described above. Movement of radius limiter 762 is controlled with synchronized movement with drawer 726 with a linear bearing arrangement. An extension 770 mounts to radius limiter 762 through slot 752. Extension 770 includes a rearward projection 772 including a rotatable wheel 774, and an upwardly projecting tab 776. Wheel 774 includes two rotating discs 775 covered by a resilient O-ring 777.

Chassis 712 includes side ledges 751. Rear projection 772 of extension 770 is positioned between one of side ledges 751 of chassis 712 and one of side plates 742 of drawer 726. During slideable movement of drawer 726, relative to chassis 712, side plate 742 and side ledge 751 are moving in opposite directions relative to one another, with wheel 774 positioned therebetween. Radius limiter 762 thereby moves relative to chassis 712 at a reduced speed relative to drawer 726. Because wheel 774 is in rolling engagement with both drawer 726 and chassis 712, radius limiter 762 moves at one-half the speed of drawer 726. The speed could be varied if a stepped wheel 774 was provided. In that case, drawer 726 would contact one diameter and chassis 712 would contact another diameter. Moving the limiter 762 at one-half the speed of drawer 726 is useful for cable protection.

Side ledges 751 each include a rear stop 753 and at least one forward ramp 754. Two ramps 754*a, b* are provided to assist with desired movement of radius limiter 762 when drawer 726 is opened. By referencing FIGS. 37–41, front ramp 754*a* prevents sliding of wheel 774 until wheel 774 is reengaged by side plate 742. Rear ramp 754*b* is positioned so that should drawer 726 not be fully opened wherein front ramp 754*a* is not engaged, rear ramp 754*b* holds wheel 774 until side plate 742 reengages. Side ledges 751 also include a front stop 756 to limit movement of radius limiter 762.

Slot 752 includes enlarged area 760 for receipt of snaps 780 of extension 770 to snap extension 770 to radius limiter 762. Once snaps 780 are positioned in enlarged areas 760, extension 770 can be slid rearwardly for sliding relative movement relative to drawer 726.

Referring now to FIGS. 42–44, a modified rear projection 872 is shown including two toothed wheels 874*a, b*. Each toothed wheel 874*a, b* includes opposed toothed discs 876 mounted for simultaneous rotation on opposite sides of extension member 873. The toothed wheels 874*a, b* are linked with bars 878 to maintain synchronization between toothed wheels 874*a, b*. During relative movement of drawer 826 and chassis 812, rear projection 872 moves at a reduced speed relative to drawer 826. Rear projection 872 and racks 879, 881 cause the radius limiter to move at one-half the speed of drawer 826. Different speeds can be achieved by using different sized discs 876 for engaging drawer 826 and chassis 812, respectively. The two toothed wheels 874*a, b* are provided to maintain synchronization when drawer 826 is pulled to the fully opened position wherein drawer 826 is not engaged with rear toothed wheel 874*a*.

Referring now to FIGS. 45–53, drawer 926 is provided with a front detent 928 which will overcome rear chassis detent 930 as drawer 926 is opened. This retains radius limiter 962 towards the front of drawer 926 as it is opened, keeping tension on the cables. The final rearward position of radius limiter 962 in the direction of arrow B will depend on the amount of slack in the cables. A front chassis detent (not visible) can be provided as in panel 10 for limiting the travel of radius limiter 962 forward relative to chassis 912. Further, the front chassis detent allows drawer 926 to move rearwardly before the radius limiter 962 moves rearwardly. Each detent includes a tab 940, 944, on extension 970 and a notch 942, 946.

Tension in the cables will pull tab 940 out of notch 942 in the direction of arrow C during opening. During closure of drawer 926, radius limiter 962 moves with drawer 926 (assuming no front chassis detent), thereby protecting the slack in the cables.

Referring now to FIG. 54, a further take-up mechanism 1058 is shown where radius limiter 1062 is slideably mounted to chassis 1012 and drawer 1026. A spring 1070 applies a bias to radius limiter 1062 to bias it toward a forward position in the direction of arrow D in drawer 1026. A cable 1072 extends from spring 1070 around tab 1074 to radius limiter 1062. When drawer 1026 is opened, radius limiter 1062 only moves forwardly enough to keep desired tension on the cables under tabs 1064.

The above specification, examples and data provide a complete description of the manufacture and use of the invention. Since many embodiments of the invention can be made without departing from the spirit and scope of the invention, the invention resides in the claims hereinafter appended.

What is claimed is:

1. A method of managing cables, the method comprising the steps of:
    (a) providing a chassis having a drawer;
    (b) routing an optical fiber cable into an interior of the chassis through an access opening of the chassis;
    (c) moving the drawer, relative to the chassis, from a closed position wherein the drawer is fully inserted within the chassis to a intermediate position wherein the drawer partially extends outward from the chassis, and further to an open position wherein the drawer fully extends outward from the chassis;
    (d) moving a radius limiter, in a synchronized manner relative to the drawer, from a first position on the drawer toward a second position on the drawer when the drawer moves from the intermediate position to the open position.

2. The method of claim 1, wherein the radius limiter remains stationary relative to the drawer when the drawer moves from the closed position to the intermediate position.

3. The method of claim 1, further including moving the drawer, relative to the chassis, from the open position, to the intermediate position, and further to the closed position.

4. The method of claim 3, further including moving the radius limiter, in a synchronized manner relative to the drawer, from the second position toward the first position when the drawer moves from the intermediate position to the closed position.

5. The method of claim 4, wherein the radius limiter remains stationary relative to the drawer when the drawer moves from the open position to the intermediate position.

6. The method of claim 1, wherein the radius limiter includes a trough section, the method further including placing the optical fiber cable into the trough section of the radius limiter.

7. The method of claim 6, wherein the radius limiter includes a tab located adjacent to the trough section, the method further including pivoting the tab to cover a portion of the trough section to retain the optical fiber cable within the trough section.

8. The method of claim 7, further including snapping the tab into slots formed in the radius limiter to secure the tab relative to the trough section.

9. The method of claim 1, further including moving the radius limiter at half-speed relative to a moving speed of the drawer.

10. The method of claim 9, wherein moving the radius limiter at half-speed is provided by a linear bearing arrangement including a wheel interconnected to the radius limiter, the wheel being in contact with both the drawer and the chassis.

11. The method of claim 1, wherein the step of routing the optical fiber cable through the access opening includes routing the optical fiber cable through the access opening located in a side of the chassis.

* * * * *

UNITED STATES PATENT AND TRADEMARK OFFICE
CERTIFICATE OF CORRECTION

PATENT NO. : 7,120,348 B2
APPLICATION NO. : 10/894898
DATED : October 10, 2006
INVENTOR(S) : Trebesch et al.

Page 1 of 1

It is certified that error appears in the above-identified patent and that said Letters Patent is hereby corrected as shown below:

Col, 3, line 31: "FIGS. 29 32 with" should read --FIGS. 29-32 with--

Col. 3, line 34: "FIGS. 33 35;" should read --FIGS. 33-35;--

Col. 10, line 10, claim 1: "to a intermediate" should read --to an intermediate--

Col. 10, lines 17-18, claim 1: "from the intermediate position to the open position." should read --from the closed position to the intermediate position.--

Col, 10. lines 20-21, claim 2: "to the drawer when the drawer moves from the closed position to the intermediate position." should read --to the chassis when the drawer moves from the intermediate position to the open position.--

Col. 10, line 32, claim 5: "to the drawer when" should read --to the chassis when--

Signed and Sealed this

Seventh Day of August, 2007

JON W. DUDAS
*Director of the United States Patent and Trademark Office*